A1

United States Patent
Nakatsugawa et al.

(10) Patent No.: US 7,113,509 B2
(45) Date of Patent: Sep. 26, 2006

(54) NODE DEVICE

(75) Inventors: Keiichi Nakatsugawa, Kawasaki (JP);
Tsuguo Kato, Kawasaki (JP); Ryuichi Takechi, Kawasaki (JP); Hideaki Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 910 days.

(21) Appl. No.: 09/809,495

(22) Filed: Mar. 15, 2001

(65) Prior Publication Data

US 2001/0055306 A1    Dec. 27, 2001

(30) Foreign Application Priority Data

Apr. 14, 2000   (JP)   ............... 2000-113997

(51) Int. Cl.
  *H04L 12/28*   (2006.01)
  *H04Q 7/20*    (2006.01)
(52) U.S. Cl. .................. 370/392; 370/401; 455/433
(58) Field of Classification Search ........... 455/433, 455/436–440; 370/331, 338, 339, 392, 401
See application file for complete search history.

(56) References Cited

U.S. PATENT DOCUMENTS

| | | | |
|---|---|---|---|
| 5,325,362 A | | 6/1994 | Aziz |
| 5,583,996 A | | 12/1996 | Tsuchiya |
| 5,841,769 A | * | 11/1998 | Okanoue et al. ............ 370/338 |
| 6,160,804 A | * | 12/2000 | Ahmed et al. ............. 370/349 |
| 6,212,175 B1 | * | 4/2001 | Harsch ..................... 370/338 |
| 6,473,411 B1 | * | 10/2002 | Kumaki et al. ............ 370/331 |
| 6,654,359 B1 | * | 11/2003 | La Porta et al. ........... 370/328 |
| 6,754,492 B1 | * | 6/2004 | Stammers et al. ........ 455/435.1 |
| 2002/0057657 A1 | * | 5/2002 | La Porta et al. ........... 370/331 |
| 2002/0191562 A1 | * | 12/2002 | Kumaki et al. ............ 370/331 |
| 2005/0058119 A1 | * | 3/2005 | Inouchi et al. ............. 370/351 |

FOREIGN PATENT DOCUMENTS

| | | |
|---|---|---|
| EP | 0 918 417 | 5/1999 |
| JP | 08-172669 | 7/1996 |
| JP | 11103320 | 4/1999 |
| WO | 98/32304 | 7/1998 |

OTHER PUBLICATIONS

Perkins, et al., "Route Optimization in Mobile IP" Internet Publication; XP00215196: Feb. 15, 2000, pp. 1-26.
Perkins, et al., "Optimization Smooth Handoffs in Mobile IP" Jul. 6, 1999: XP 010555054: ISBN: 0-7695-0250-4 pp. 340-346.
Tsuguo Kato, et al. A Mobile Telecommunication Network Architecture for the Multimedia Age. IEEE International Conference, 1999.

* cited by examiner

*Primary Examiner*—John Pezzlo
*Assistant Examiner*—Hong Sol Cho
(74) *Attorney, Agent, or Firm*—Katten Muchin Rosenman LLP

(57) ABSTRACT

In a node device which is part of a communication system with a terminal and a location registering server, a node device on a receiving side transfers, to a destination node device, a received inter-node packet, based on destination terminal location information stored in its storage portion or based on a location registering server, directly or through other devices, or the destination node device notifies a former node device (on the receiving side) of an address of its own device and the destination terminal directly or through other devices. Also, the node device on the receiving side or the destination node device notify a source node device of the address of the destination node device and the destination terminal directly or through other devices, based on a predetermined address stored in the storage portion of the terminal, the node device, or the location registering server.

53 Claims, 34 Drawing Sheets

NODE DEVICE

BACKGROUND OF THE INVENTION

1. Field of the Invention

The present invention relates to a node device, and in particular to a node device which composes a communication system with a terminal, or with a terminal and a location registering server.

Recently, a next generation mobile communication system has been studied in research institutions, standardization groups, and the like all over the world. The next generation mobile communication system aims at offering multi-media services including a high-speed data communication to the extent of 2 Mbps.

Particularly, it is expected that packet communication services including the Internet will become the core services of the next generation of mobile communications in lieu of present services mainly using voice.

Furthermore, the study of the communication system has started where a mobile and a fixed station are integrated. In such an integrated communication system, it is important to reliably transmit a packet from a source terminal to a destination terminal.

2. Description of the Related Art

Current concept diagrams and problems of a mobile communication packet system realized by a cellular communication network in Japan and Europe are mentioned in a mobile packet communication system of the U.S. patent application Ser. No. 09/482,712 (filed on Jan. 13, 2000). This entire application is hereby incorporated by reference.

FIG. 32 shows an arrangement of the mobile packet communication system in the above-mentioned application. This communication system is composed of location registering servers 30_1 and 30_2, and node devices 20_1–20_4, each node device having a respective area 21_1–21_4 of communication.

Addresses [ADR1]–[ADR6] are assigned to the location registering servers 30_1, 30_2, and the node devices 20_1–20_4.

Furthermore, the communication system includes mobile terminals (hereinafter simply referred to as terminals) 10_3, 10_4, 10_1, and 10_2, which are respectively located in the areas 21_1–21_3, and addresses [1.1.1], [1.1.2], [2.1.1], and [2.2.1] are respectively assigned to each of the terminals 10_1–10_4.

It is to be noted that in FIG. 32 a subscriber node and a gate node in the above-mentioned application are not distinguished therebetween and simply referred to as a node device. In addition, reference numerals or characters of a terminal, a node device, and the like are used in modified forms.

The location registering servers 30_1 and 30_2 are established corresponding to an upper figure of a destination address (e.g. IPv4 and IPv6) of the packet, and are respectively provided with location registering tables 31_1 and 31_2 which register the address of the terminal corresponding to the address of the node device having the area where the terminal is located.

For instance, the addresses [1.1.1] and [1.1.2] of the terminals 10_1 and 10_2, the address of which is represented by [1.X.X ("X": don't care)], are made corresponding to the address [ADR5] of the node device 20_3 having the area where the terminals 10_1 and 10_2 are located to be registered in the location registering table 31_1.

Similarly, the addresses [2.1.1] and [2.2.1] of terminals 10_3 and 10_4, the address of which is represented by [2.X.X], and the addresses [ADR3] and [ADR4] of the node devices 20_1 and 20_2, are registered in the location registering table 31_2.

Also, the servers 30_1 and 30_2 are provided with a function of transferring the packet based on the information of the location registering tables.

The node devices 20_1–20_4 have location information tables 22_1–22_4 (only 22_2 is shown) for storing the addresses of the terminal and the destination node device, and a server retrieval table 40 for retrieving the address of the corresponding location registering server from the upper figure of the destination address of the packet.

FIG. 33 shows an operation example of the packet transfer in the mobile packet communication system shown in FIG. 32. Hereinafter, the operation when a user packet 71 is transmitted from the terminal 10_4 to the terminal 10_1 will be described in the order of processing steps.

Step S1: The terminal 10_4 transmits the user packet 71 including the address [1.1.1] indicating "addressed to the terminal 10_1" to the node device 20_2.

Step S2: The node device 20_2 retrieves the address [ADR1] of the server 30_1 corresponding to the address [1.1.1] of the terminal 10_1 from the server retrieval table 40.

Step S3: The node device 20_2 adds the address [ADR1] of the server 30_1 to the received user packet 71 to be transferred to the server 30_1 as an inter-node packet 81.

Step S4: The server 30_1 retrieves the address [ADR5] of the node device 20_3 having the area where the terminal 10_1 is located from the location registering table 31_1.

Step S5: The server 30_1 transfers an inter-node packet 82, in which the destination address of the received packet 81 is rewritten to [ADR5], to the node device 20_3.

Step S6: The server 30_1 notifies the node device 20_2 of the address [ADR5] of the node device 20_3 having the area where the terminal 10_1 is located based on a source address [ADR4] of the packet 81.

Step S7: The node device 20_3 transmits the packet 71, that is the packet 82 from which the address [ADR5] of its own device is removed, to the terminal 10_1, so that the terminal 10_1 receives the same.

Step S8: The node device 20_2 updates the address of the node device having the area where the terminal 10_1 is located in the location information table 22_2 to [ADR5] or adds [ADR5] to the node device address.

Step S9: The next user packet 71 addressed to the terminal 10_1 arrives at the node device 20_2.

Step S10: The node device 20_2 retrieves the location information table 22_2 to obtain the address [ADR5] of the node device 20_3 having the area where the terminal 10_1 is located.

Step S11: The node device 20_2 directly transfers to the node device 20_3 an inter-node packet 83, that is the received packet 71, addressed to the terminal 10_1 and added with the address [ADR5] of the node device 20_3.

Step S12: The node device 20_3 transmits the user packet 71, that is the packet 83 of the node device 20_3 from which the address [ADR5] is removed, to the terminal 10_1.

Thus, the packets 71 which the terminal 10_4 subsequently transmits are received by the terminal 10_1.

In such a communication system composed of such a node device, a packet loss occurs when the terminal 10_1 moves to an area of another node device.

This will be described by referring to FIG. 34 which shows an operation after a packet transfer operation of FIG. 33.

Step S1: The terminal 10_1 moves to the area 21_4 of the node device 20_4.

Step S2: The terminal 10_1 makes a location registration to the communication system.

Step S3: The node device 20_4 retrieves the address [ADR1] of the location registering server 30_1 corresponding to the address [1.1.1] of the terminal 10_1 from the server retrieval table 40.

Step S4: The node device 20_4 transmits location registering information to the location registering server 30_1.

Step S5: The location registering server 30_1 updates the address of the node device having the area where the terminal 10_1 is located in the location registering table 31_1 to [ADR6].

Step S6: The user packet 71 addressed to the terminal 10_1 arrives at the node device 20_2.

Step S7: The node device 20_2 retrieves the address [ADR5] of the node device 20_3 having the area where the terminal 10_1 is located from the location information table 22_2.

Step S8: The node device 20_2 transfers to the node device 20_3 the inter-node packet 81, that is the received packet 71, addressed to the terminal 10_1 and added with the address [ADR5].

Step S9: Since the node device 20_3 does not have the area where the destination terminal 10_1 is located, the user packet 71 cannot be transmitted to the terminal 10_1.

Hereafter, every time the terminal 10_4 transmits the user packet 71 to the terminal 10_1, steps S6–S9 are repeated, so that the user packet 71 is discarded.

As mentioned above, when the destination terminal moves to a different destination node device in such a mobile packet communication system, the user packet received at a former node device cannot be delivered to the destination terminal, so that a communication quality deteriorates due to the occurrence of packet loss.

Also, since the location information of the destination terminal cached in the location information table of a source node device is not updated, there has been a problem that the packet transfer to the former node device is inevitably continued although the destination terminal has already moved.

SUMMARY OF THE INVENTION

Accordingly, the present invention has the following two objects in a node device that composes a communication system with a terminal, or with a terminal and a location registering server:

Object 1: To reduce packet loss which occurs when a destination terminal moves to an area of another node device.

Object 2: To reduce the occurrence of continuous packet transmission to a former node device having an area where the destination terminal was located because stored location information of the destination terminal is not being updated in a source node device.

The node device according to the present invention offers the following two main methods respectively for achieving the above-mentioned two objects:

Method 1 for achieving object 1: The node device on a receiving side transfers the packet to a destination node device directly or through other devices, when the destination terminal of a received packet is not located in its own area.

Method 2 for achieving object 1: The destination node device having the area where a terminal is now located notifies the former node device, having the area where the destination terminal was located before moving, of the address of its own device directly or through other devices, when the destination terminal has moved to its own area.

Method 1 for achieving object 2: The node device on the receiving side notifies the source node device of the address of the destination node device, directly or through other devices, when the destination terminal of the received packet is not located in its own area.

Method 2 for achieving object 2: The destination node device notifies the source node device having the area where a source terminal is located, of the address of its own device directly or through other devices, when the destination terminal has moved to its own area.

Hereinafter, the methods for achieving these objects will be described.

It is to be noted that the node device according to the present invention can be connected to either a mobile network or a fixed network.

Also, the terminal capable of making a location registration can move between the node devices of the fixed network, the node devices of the mobile network, and between the node devices of the fixed network and the mobile network.

These movements of the terminal are described as "the terminal moves from the area of the node device to an area of another node device".

First of all, Method 1 for achieving the Object 1 will be described.

In order to achieve the above-mentioned Object 1, a node device on a receiving side of the present invention composes a communication system with a terminal and a location registering server, the location registering server comprises a location registering table, and the node device transfers a received packet to a destination node device having an area where a destination terminal to which the packet is to be transferred is located when knowing an address of the destination node device, while otherwise transfers the packet to the destination node device by referring to the location registering table, both when the destination terminal is not located in its own area.

FIG. 1 shows an operation principle of a node device according to the present invention which composes the communication system with the terminal and the location registering server. The arrangement of the communication system is the same as that shown in FIG. 32.

This operation principle particularly relates to the node device on the receiving side which is a destination node device of an inter-node packet.

In this principle, schematically, when the destination terminal 10_1 of the received packet 81 is not located in the area 21_3 and the address of the node device 20_4 having the area where the destination terminal 10_1 is located is known, the node device 20_3 on the receiving side transfers the packet 81 to the destination node device 20_4.

When not knowing the address, the node device 20_3 on the receiving side transfers the packet 81 to the destination node device 20_4 directly or indirectly through other devices such as a source node device and a location registering server, based on the location registering table 31_1.

The detailed operation will be described.

In FIG. 1, as to the state before a packet transfer operation, the terminal 10_1 is located in the area 21_3 of the node device 20_3, and the source node device 20_2 stores the address [ADR5] of the node device 20_3 having the area where the terminal 10_1 is located in the location information table 22_2.

Step S1: The terminal 10_1 moves to the area 21_4 of the node device 20_4.

Step S2: The terminal 10_1 makes the location registration to the communication system.

Step S3: The node device 20_4 retrieves the server retrieval table 40 to obtain the address [ADR1] of the location registering server 30_1 corresponding to the address [1.1.1]=[1.X.X] of the terminal 10_1.

Step S4: The node device 20_4 transmits the location registering information to the location registering server 30_1.

Step S5: The location registering server 30_1 updates the address of the node device having the area where the terminal 10_1 is located in the location registering table 31_1 to [ADR6].

Namely, the location registering server 30_1 stores, in the location registering table 31_1, the address [1.1.1] of the terminal 10_1 and the address [ADR6] of the node device 20_4 having the area where the terminal 10_1 is located made corresponding to each other.

Step S6: The terminal 10_4 transmits the user packet 71 addressed to the terminal 10_1 to the node device 20_2.

Step S7: The node device 20_2 retrieves the location information table 22_2 to obtain the address [ADR5] of the node device 20_3 having the area where the terminal 10_1 is located.

Step S8: The node device 20_2 adds the address [ADR5] of the node device 20_3 to the packet 71 to transfer the packet as the inter-node packet 81.

Step S9: The node device 20_3 receives the packet 81.

When the destination terminal 10_1 is not located in the area 21_3 and the address [ADR6] of the node device 20_4 having the area where the destination terminal 10_1 is located is known at this time, the node device 20_3 directly transfers the packet 81 to the node device 20_4.

When not knowing the address [ADR6] of the node device 20_4, the node device 20_3 transfers the packet 71 addressed to the terminal 10_1 included in the packet 81 to the node device 20_4 having the area where the terminal 10_1 is located directly or indirectly through other devices, thus the packet is transferred based on the location information (correspondence between the address [1.1.1] of the terminal 10_1 and the address of the node device having the area where the terminal 10_1 is located) registered in the location registering table 31_1.

The above-mentioned operation enables the user packet 81, received at the former node device 20_3 before the destination terminal 10_1 has moved, to be transferred to the destination node device 20_4 after the movement, thereby preventing the deterioration of the communication quality caused by the packet loss.

It is to be noted that although the user packet 71 is transferred between the node devices included in the inter-node packet 81 or the like, hereinafter, the transfer between the node devices is occasionally referred to simply as "the user packet 71 is transferred between the node devices".

Further, the received packet may be transferred to the destination node device through the location registering server by referring to the location registering table.

Namely, in FIG. 1, the node device 20_3 on the receiving side transfers the packet 71 included in the inter-node packet to the location registering server 30_1.

The location registering server 30_1 obtains the address [ADR6] of the node device 20_4 having the area where the destination terminal 10_1 of the packet 71 is located by referring to the location registering table 31_1 to transfer the packet 71 included in the inter-node packet to the node device 20_4.

In addition, the packet may be once sent back to a source node device, which obtains the new address of the destination node device from the location registering server to transfer the packet to the destination node device.

Namely, in FIG. 1, when the destination terminal 10_1 of the received packet 81 (packet 71) is not located in the area of the device 20_3, the node device 20_3 on the receiving side sends back the packet 71 to the source node device 20_2.

The source node device 20_2 which has received the packet 71 knows that the destination terminal 10_1 of the packet 71 is not located in the area of the node device on the receiving side, and obtains the new address [ADR6] of the node device 20_4 having the area where the destination terminal 10_1 is located from the location registering server 30_1 to directly transfer the packet 71 to the node device 20_4.

Also, according to the present invention, the packet may be once sent back to a source node device, which transfers the packet to the location registering server, which further transfers the received packet to the destination node device by referring to the location registering table.

Namely, different from the above invention, when the packet 71 is sent back, the source node device 20_2 determines that the destination terminal 10_1 is not located in the area of the node device 20_3 on the receiving side to transfer the packet 71 to the location registering server 30_1.

Thus, the source node device 20_2 leaves the transfer of the packet 71 to the location registering server 30_1 in the same way as the node device 20_3 on the receiving side as described above.

Also, when the packet is being transferred back to the source node device, the packet may be transferred back through the location registering server.

Namely, in FIG. 1, when the destination terminal 10_1 is not located in the area 21_3, the node device 20_3 on the receiving side requests the location registering server 30_2 to transfer the received packet back to the source node device 20_2.

The location registering server 30_2 transfers the packet 71 to the source node device 20_2 having the area where the source terminal 10_4 is located by referring to the location registering table.

Thus, it is possible for the node device 20_3 on the receiving side to send back the packet 71 to the source node device.

The source node device may also transfer the packet 71 to the destination node device directly or through the location registering server.

Also in the present invention, the address of the destination node device may be obtained from the location registering server so that the packet is transferred to the node device of the address obtained.

Namely, in FIG. 1, when the destination terminal 10_1 of the received packet 81 (packet 71) is not located in the area 21_3, the node device 20_3 on the receiving side inquires of the location registering server 30_1 about the address [ADR6] of the node device 20_4 having the area where the destination terminal 10_1 is located, so that the packet 71 is transferred to the node device 20_4 of the address [ADR6] obtained, i.e. the destination node address.

This enables the node device on the receiving side to directly transfer the packet to the destination node device even when the destination terminal is not located in its own area.

The node device on the receiving side may further comprise a storage portion for storing an address of the destination terminal and the address of the destination node device made corresponding to each other, and the node device on the receiving side may transfer the received packet to the destination node device when the destination terminal of the packet is not located in its own area.

Namely, the node device on the receiving side has the storage portion for storing the address of the destination terminal and the address of the destination node device made corresponding to each other.

The node device on the receiving side transfers the packet to the destination node device of the (known) address stored in the storage portion, when receiving the inter-node packet addressed to the destination terminal from the source node device and the destination terminal is not located in its own area.

This enables the node device on the receiving side to directly transfer the packet (inter-node packet) to the destination node device even when the destination terminal is not located in its own area.

Also, in the present invention a transfer of the packet may be continued after receiving the packet until a predetermined time elapses or a finish of the packet transfer is instructed.

This enables the node device 20_3 on the receiving side to perform the packet transfer until the transfer of the packet which belongs to a predetermined packet communication is finished.

Furthermore, after the packet transfer is finished, the address of the node device stored in the storage portion can be deleted, so that a storage capacity in the storage portion can be reduced.

Hereinafter, Method 2 for achieving Object 1 will be described.

In order to achieve the above-mentioned Object 1, a node device of the present invention composes a communication system with a terminal, and the destination node device obtains an address of a former node device having an area where the destination terminal was located when the destination terminal has moved to its own area to notify the former node device of addresses of its own device and the destination terminal.

FIG. 2 shows an operation principle of the node device according to the present invention which composes the communication system with the terminal and the location registering server. The arrangement of the communication system is the same as that shown in FIG. 1.

It is to be noted that the location registering server is not related to the methods according to the next embodiment of the present invention.

In this operation principle, schematically, upon the movement of the terminal 10_1 to the area 21_4 of the node device 20_4 as a trigger, the destination node device 20_4 notifies the former node device 20_3 of its own device address [ADR6] directly or indirectly through other devices, so that based on the address [ADR6], the node device 20_3 can transfer the received packet 82 (packet 71) to the node device 20_4.

The detailed operation will be described.

In FIG. 2, as the state before the packet transfer operation, the terminal 10_1 is located in the area 21_3 of the node device 20_3, and the source node device 20_2 stores the address [ADR5] of the node device 20_3 having the area where the terminal 10_1 is located in the location information table 22_2.

Step S1: The terminal 10_1 moves to the area 21_4 of the node device 20_4.

Step S2: At this time, the address [ADR5] of the former node device 20_3 having the area where the destination terminal 10_1 was located is stored in the communication system (either the terminal or the node device).

Step S3: The terminal 10_1 makes the location registration to the communication system.

Step S4: The node device 20_4 notifies the former node device 20_3 directly or indirectly of its own device address [ADR6] by using the address [ADR5] of the former node device 20_3.

Step S5: The former node device 20_3 adds the address [1.1.1] of the terminal 10_1 and the address [ADR6] of the destination node device to the location information table 22_3 e.g. "for inter-node packet transfer".

By the above-mentioned operation, the node device 20_3 having the area where the destination terminal 10_1 was located before the movement will know the address [ADR6] of the node device 20_4 having the area where the destination terminal 10_1 of the received user packet 71 is located.

This enables the former node device 20_3 to transfer the packet 71 to the node device having the area where the destination terminal 10_1 is located without discarding the packet 71, thereby preventing the deterioration of the communication quality caused by the packet loss.

Hereafter, the former node device 20_3 performs the packet transfer to the node device having the area where the destination terminal 10_1 is located, by performing the operation of the following steps S6–S10 as the node device on the receiving side as in the previous embodiments of the present invention.

Steps S6–S8: In the same way as steps S6–S8 in FIG. 1, the terminal 10_4 transmits the packet 71 addressed to the terminal 10_1, and this packet 71 reaches the node device 20_3 as the packet 81.

Step S9: The node device 20_3 retrieves the location information table 22_3 to obtain the address [ADR6] of the node device 20_4 having the area where the terminal 10_1 is located, or to know the destination node device.

Step S10: The node device 20_3 transfers, to the node device 20_4, the packet 82 (packet 71) in which the destination address [ADR5] of the received packet 81 is rewritten to [ADR6].

Also, every time the destination terminal 10_1 moves to an area of another node device, the operation of this embodiment is performed, and the destination node device (latest or new destination node device) notifies the former or old node device of the address of its own device whereby each of the former node devices transfers the received packet addressed to the destination terminal 10_1 to the node device having the area where the destination terminal 10_1 is located next.

Thus, the packet addressed to the terminal received by all of the former node devices is to be transferred to the latest destination node device.

Also, this embodiment may be further characterized in that the destination terminal may comprise a storage portion for storing the address of the former node device, and the destination node device may receive the address stored in the storage portion to notify the former node device of the received address of the address of its own device.

Namely, in FIG. 2, the destination terminal 10_1 has a storage portion 11_1, which stores the address [ADR5] of the node device 20_3 having the area where the terminal was located.

When the destination terminal 10_1 has moved to the area 21_4, the destination node device 20_4 receives the address [ADR5] by a notification (e.g. location registration request) from the destination terminal 10_1 or an inquiry from its own device.

The node device 20_4 notifies the address [ADR6] of its own device and the address of the destination terminal to the former node device 20_3 of the received address [ADR5].

This enables the former node device 20_3 to know the address [ADR6] of the node device 20_4 having the area where the destination terminal 10_1, which has moved outside of its own area 21_3, is located.

Further, the storage portion may store the address of the node device with which the destination terminal has started a communication during the communication.

Namely, the storage portion 11_1 of the destination terminal 10_1 stores the address [ADR5] of the node device (hereinafter referred to as communication start node device) 20_3 with which the destination terminal has started the communication. The destination node device 20_4 notifies the communication start node device 20_3 of the address [ADR6] of its own device and the address of the destination terminal.

Furthermore, when the destination terminal 10_1 has moved to another node device 20_5 (not shown; its address is [ADR7]) during the communication, the other node device 20_5 notifies the communication start node device 20_3 of the address [ADR5] stored in the storage portion 11_1 of its own device address [ADR7].

Thus, every time the destination terminal 10_1 moves to an area of a latest node device, the latest node device notifies the communication start node device 20_3 of the addresses of its own device and the destination terminal. Even if the destination terminal 10_1 subsequently moves to another area during the communication for instance, it is possible for the communication start node device 20_3 to know the address of the node device having the area where the destination terminal 10_1 is located at present.

Also, in the present embodiment, the storage portion may store all of addresses of former node devices having areas where the destination terminal has been located from a communication start to a present time, and the destination node device may receive the addresses to notify all of the former node devices of the addresses of its own device and the destination terminal.

Namely, in FIG. 2, the storage portion 11_1 stores all of the addresses of the node devices having the areas where the destination terminal 10_1 has been located from the communication start at the node device 20_3 to the present time. For instance, the storage portion 11_1 stores all of the addresses of the node devices 20_3 and 20_6-20_8 (not shown), which the destination terminal 10_1 has passed when moving from the node device 20_3 to the node device 20_4.

The destination node device 20_4 notifies all of the former node devices 20_3 and 20_6-20_8 of the address [ADR6] of its own device and the address of the destination terminal.

Thus, during the communication, all of the former node devices 20_3 and 20_6-20_8 having the areas where the destination terminal 10_1 was previously located know the address [ADR6] of the node device 20_4 having the area where the destination terminal 10_1 is located at present, and it becomes possible to transfer the received packet addressed to the destination terminal 10_1 without being discarded.

In the present embodiment the destination node device may further comprise a storage portion for storing the address of the former node device stored in the storage portion of the destination terminal and the address of the destination terminal made corresponding to each other, and the destination node device may notify the former node device of the address stored in the storage portion of the addresses of its own device and the destination terminal when the destination terminal has moved from its own area to an area of a latest node device having the area where the destination terminal is located at present and the latest node device has notified the address of its own device.

Namely, the destination node device 20_4 stores the address [ADR5] of the former node device 20_3, which is stored in the storage portion 11_1 of the destination terminal 10_1, and the address of the destination terminal 10_1 in the storage portion (not shown) of its own device.

The destination terminal 10_1 moves to the area (not shown) of the latest node device, and the destination node device 20_4 receives the notification of the addresses of the latest node device and the destination terminal from the latest node device.

The destination node device 20_4 (the destination terminal 10_1 is not located at present in its area) notifies the former node device 20_3 of the address [ADR5] stored in the storage portion of the addresses of the latest node device and the destination terminal.

This enables the former node device 20_3 to know the address of the latest node device having the area where the destination terminal 10_1 is located.

Also in the present embodiment, the communication system may further comprise a location registering server for notifying the former node device of an address of the destination node device and the destination terminal based on the address of the former node device registered in a location registering table from a previous location registration when receiving a location registration request from the destination terminal.

Namely, when the destination terminal 10_1 has moved to the area 21_4, the destination node device 20_4 makes the location registration request of the destination terminal 10_1 to the location registering server 30_1.

The location registering server 30_1 knows the address of the former node device 20_3 having the area where the destination terminal 10_1 was located from the location registering table 31_1 before making the location registration in response to the location registration request, and notifies the former node device 20_3 of the address [ADR6] of the destination node device and the address of the destination terminal.

This enables the former node device 20_3 to know the address [ADR6] of the destination node device 20_4 even when the destination terminal 10_1 moves outside of its own area 21_3.

Also in the present embodiment, when receiving the location registration request of the destination terminal during a communication, the location registering server may make no location registration and will notify the node device with which the destination terminal originally started the communication, of the addresses of both the current node device and the destination terminal.

Namely, when receiving the location registration request of the destination terminal 10_1 from the destination node device 20_4 while the destination terminal 10_1 is communicating, the location registering server 30_1 neither makes the location registration nor updates the address of the former node device 20_3 to the address of the destination node device 20_4.

Thus, even when the destination terminal 10_1 moves to the areas of equal to or more than two node devices during the communication, the location registering server 30_1 notifies the node device 20_3, with which the destination terminal 10_1 has started the communication, of the address [ADR6].

Thus, the communication start node device 20_3 knows the address [ADR6] of the destination node device 20_4.

Also in the present embodiment, the communication system may further comprise a location registering server, and the destination node device may obtain, from the location registering server, the address of the former node device having the area where the destination terminal was located before making a location registration of the destination terminal when the destination terminal has moved to its own area and to notify the former node device of the addresses of its own device and the destination terminal.

Namely, when the destination terminal 10_1 has moved to the area 21_4, the destination node device 20_4 obtains the address of the destination node device from the location registering server 30_1 before the location registration of the destination terminal 10_1. Since it is the node device before the location registration, the address is [ADR5] of the former node device 20_3.

The destination node device 20_4 notifies the address [ADR6] of its own device and the address of the destination terminal to the former node device 20_3 at address [ADR5].

Thus, it becomes possible for the former node device 20_3 to know the address [ADR6] of the destination node device 20_4, even when the destination terminal 10_1 has moved outside of its own area.

Also in the present embodiment, the communication system may comprise a location registering server which comprises a storage portion for storing the address of the former node device and notifies the former node device of the addresses of a new node device and the destination terminal to which location registrations are made when receiving a location registration request from the destination terminal.

Namely, the location registering server 30_1 stores, in the storage portion (not shown), the address [ADR5] of the former node device 20_3 having the area where the destination terminal 10_1 was located.

When the destination terminal 10_1 has moved to the area 21_4, the destination node device 20_4 makes the location registration of the destination terminal 10_1 to the location registering server 30_1.

The location registering server 30_1 notifies the former node device 20_3 having the stored address [ADR5] of the address [ADR6] of the new node device (destination node device 20_4) and the address of the destination terminal.

Thus, the destination node device 20_4 has notified the former node device 20_3 of the address [ADR6] of the new node device and the address of the destination terminal through the location registering server 30_1.

Also in the present embodiment, the communication system may comprise a location registering server which comprises a storage portion for storing the address of the former node device, and the destination node device may receive the address of the former node device from the location registering server when the destination terminal has moved to the area of the destination node device, such that the destination node may notify the former node device of the addresses of its own device and the destination terminal.

Namely, the location registering server 30_1 stores, in the storage portion (not shown), the address [ADR5] of the former node device 20_3 having the area where the destination terminal 10_1 was located.

When the destination terminal 10_1 has moved to the area 21_4, the destination node device 20_4 obtains the address [ADR5] of the former node device stored in the storage portion by inquiring to location registering server 30_1 or by notification from the location registering server 30_1 in response to the location registration.

The node device 20_4 directly notifies the node device 20_3 of the address [ADR6] of its own device and the address of the destination terminal. Thus, the node device 20_3 knows the address [ADR6] of the node device having the area where the destination terminal 10_1 is located.

Further, while the destination terminal continues a communication the storage portion may store the address of the original node device where the destination terminal started communication, and the destination node device may notify the original node device where communication started of the addresses of its own device and the destination terminal.

Namely, the storage portion of the location registering server 30_1 stores the address [ADR5] of the node device (communication start node device) 20_3 where the destination terminal 10_1 started communication.

Thus, the address [ADR6] of the node device 20_4 and the address of the destination terminal are notified to the node device 20_3 through either the location registering server 30_1 or directly from the node device 20_4.

Thus, even when the destination terminal sequentially moves to other areas during communication, the communication start node device 20_3 knows the address of the node device having the area where the destination terminal is located at present.

Further in the present embodiment, the storage portion may store all of the addresses of the node devices having the areas where the destination terminal has been located from a communication start of the destination terminal to a present time, and the destination node device may notify all of the former node devices of the addresses of the destination node device and the destination terminal.

Namely, the location registering server 30_1 stores, in the storage portion, the addresses (including the address of the communication start node device) of all of the former node devices having the areas where the destination terminal 10_1 has been located from the start of the communication to the present time.

The address of the node device having the area where the destination terminal is located at present and the address of the destination terminal are notified to all of the former node devices through either the location registering server or directly from the node device where the destination terminal is located at present.

Thus, all of the former node devices having the areas to which the destination terminal has moved during the communication know the address of the node device having the area where the destination terminal is located at present.

Hereinafter, Method 1 for achieving Object 2 will be described.

In order to achieve the above-mentioned Object 2, a node device on a receiving side of the present invention composes a communication system with a terminal and a location registering server, the node device notifies a source node device of a received packet of an address of a destination node device having an area where a destination terminal is located when knowing the address of the destination node device, while otherwise notifies the location registering server whereby the address of the destination node device registered in the location registering server is provided to the source node device, both when the destination terminal of the packet is not located in its own area.

FIG. 3 shows an operation principle of Method 1 for achieving Object 2 which composes the communication system with the terminal and the location registering server. The arrangement of the communication system is the same as that of the communication system of FIG. 1.

In this operation principle, schematically, upon the reception of the inter-node packet 81 as a trigger, the node device 20_3 on the receiving side notifies the source node device 20_2 of the address [ADR6], which is known to its own device 20_3 or which is registered in the location registering server 30_1, of the node device 20_4, having the area where the destination terminal 10_1 is located.

Hereinafter, the detailed operation will be described.

In FIG. 3, as the state before the transfer operation of the packet 71, the source node device 20_2 stores the address [ADR5] of the node device 20_3 having the area where the destination terminal 10_1 is located in the location information table 22_2. The terminal 10_1 moves from the area 21_3 of the node device 20_3 to the area 21_4 of the node device 20_4 and makes the location registration. The address [ADR6] of the node device 20_4 is registered in the location registering table 31_1 of the location registering server 30_1 made corresponding to the address [1.1.1] of the terminal 10_1.

Step S1: The user packet 71 addressed to the terminal 10_1 arrives at the node device 20_2.

Step S2: The node device 20_2 retrieves the location information table 22_2 to obtain the address [ADR5] of the node device 20_3 having the area where the terminal 10_1 is located.

Step S3: The node device 20_2 transmits the inter-node packet 81 which is the received user packet 71, addressed to the terminal 10_1 and added with the address [ADR5] of the node device 20_3.

Step S4: Since the terminal 10_1 that is the destination of the received packet 81 (packet 71) is not located in the area 21_3, the node device 20_3 notifies the source node device 20_2 of the address [ADR6] of the node device 20_4 having the area where the terminal 10_1 is located when the address [ADR6] is known.

When the address [ADR6] of the destination node device 20_4 is not known, the node device 20_3 directly or indirectly notifies the node device 20_2 of the address [ADR6], registered in the location registering server 30_1, of the node device 20_4 having the area where the terminal 10_1 is located.

Thus, the source node device knows the destination node device, and even when the destination terminal has moved, it becomes possible to transfer the packet to the destination node device.

Also, in the present invention the node device on the receiving side may further comprise a storage portion for storing the address of the destination node device, the node device on the receiving side may notify the source node device of the addresses of the destination node device and the destination terminal by referring to the storage portion when the destination terminal of the received packet is not located in its own area.

Namely, in FIG. 3, the node device 20_3 on the receiving side stores, in the storage portion (not shown), the address [ADR6] of the destination node device obtained by receiving the address [ADR6] from other devices.

The node device 20_3 on the receiving side notifies the source node device of the address [ADR6] and the address of the destination terminal, when the destination terminal of the received inter-node packet is not located in its own area.

Thus, the source node device 20_2 knows the address of the node device having the area where the destination terminal 10_1 is located at present, and even when the destination terminal 10_1 has moved, it is possible to transfer the packet to the destination node device.

It is to be noted that the node device 20_3 can use the Method described in "Method 2 for achieving Object 1" as the Method for storing the address of the destination node device.

Also, in the present invention the communication system may further comprise a location registering server, and the node device on the receiving side may transfer the received packet to the location registering server and request the location registering server to notify the source node device of the address of the destination node device and the destination terminal.

Namely, in FIG. 3, by transferring the packet 81 to the location registering server 30_1, the node device 20_3 on the receiving side requests the location registering server to notify the source node device 20_2 of the address [ADR6] of the destination node device 20_4 and the address of the destination terminal.

The location registering server 30_1 notifies the source node device 20_2 of the address [ADR6] of the destination node device 20_4 and the address of the destination terminal.

Also, in the present invention the communication system may further comprise a location registering server, and the node device on the receiving side may transmit, to the location registering server, a message for requesting to notify the source node device of the address of the destination node device and the destination terminal.

Namely, when the destination terminal 10_1 of the packet 81 is not located in the area 21_3, the message for requesting to notify the source node device 20_2 of the address [ADR6] of the destination node device and the address of the destination terminal is transmitted to the location registering server 30_1.

The location registering server 30_1 notifies the source node device 20_2 of the address [ADR6] and the address of the destination terminal.

Thus the source node device 20_2 knows the address [ADR6] of the node device 20_4 having the area where the destination terminal 10_1 is located.

In further alternative embodiment the communication system may further comprise a location registering server, and the node device on the receiving side may obtain the address of the destination node device from the location registering server to notify the source node device of the address of the destination node device and the destination terminal.

Namely, in FIG. 3, the node device 20_3 on the receiving side inquires of the location registering server 30_1 about the address [ADR6] of the node device having the area where the destination terminal 10_1 is located, and notifies the source node device 20_2 of the obtained address [ADR6] and the address of the destination terminal.

Thus, the source node device 20_2 knows the address [ADR6] of the node device 20_4 having the area where the destination terminal 10_1 is located at present.

Furthermore, Method 2 for achieving Object 2 will be described.

In order to achieve the above-mentioned Object 2, an embodiment of a node device composes a communication system with a terminal, and the destination node device notifies a source node device of addresses of its own device and the destination terminal based on an address stored in a storage portion provided in at least one of the terminal and the node device when the destination terminal has moved to another area.

FIG. 4 shows an operation principle of the node device according to the present invention which composes the communication system with the terminal and the location registering server. The arrangement of the communication system is the same as that of FIG. 1.

The detailed operation will be described.

It is to be noted that the terminal may generally perform the packet communication with a plurality of terminals simultaneously. In the following description, the case where the destination terminal 10_1 receives the packets from two source terminals 10_3 and 10_4 will be described. However, in this Method 2, the source terminal may be single.

Also in alternative embodiments of Method 2 the location registering server may not be needed. However, the location registering server will be included in the description.

The state before the packet addressed to the destination terminal 10_1 is transferred is as follows:

The terminal 10_1 is located in the area 21_3 of the node device 20_3.

The source node devices (the node device having the area where the source terminal is located) 20_1 and 20_2 respectively store, in the location information tables 22_1 and 22_2, the address [ADR5] of the node device 20_3 having the area where the destination terminal 10_1 is located.

Step S1: The terminal 10_1 moves to the area 21_4 of the node device 20_4.

Step S2: The node device 20_4 knows that the terminal 10_1 has moved to the area 21_4 by the location registration or the like from the destination terminal 10_1.

Step S3: The destination node device 20_4 notifies the source node devices 20_1 and 20_2 of the address [ADR6] of its own device and the address of the destination terminal directly or indirectly through other devices based on a predetermined address (e.g. the address of the source terminal 10_4, the source node device 10_4, or the like) stored in the storage portion (e.g. the storage portion 11_1, 23_3, 32_1, or the like) of the device (e.g. the terminal, the node device, the location registering server, or the like) in the communication system.

Step S4: The source node devices 20_1 and 20_2 know the address of the node device 20_4 having the area where the destination terminal 10_1 is located at present.

This enables the source node devices 20_1 and 20_2 to directly transfer the packet addressed to the terminal 10_1 to the node device 20_4 having the area where the terminal 10_1 is located.

Also, in the present invention the destination terminal may comprise a storage portion for storing an address of the source node device(s), and the destination node device may receive the address from the destination terminal to notify the source node device(s) of the address of its own device.

Namely, in FIG. 4, the storage portion 11_1 of the destination terminal 10_1 stores the addresses [ADR3] and [ADR4] of the source node devices 20_1 and 20_2 having the areas where the source terminals 10_3 and 10_4 are located.

When the destination terminal 10_1 has moved to the area 21_4, the addresses of the source node devices stored in the storage portion 11_1 are notified from the destination terminal 10_1 (or received after an inquiry by the destination terminal), so that the destination node device 20_4 transmits the addresses of its own device and the destination terminal to the source node devices 20_1 and 20_2 of the addresses.

Thus, the source node devices 20_1 and 20_2 know the address of the destination node device 20_4 and stop continuing to transmit the packet to the former node device 20_3 having the area where the destination terminal 10_1 is not located.

Also, in the present invention the communication system may further comprise a location registering server, the destination terminal may comprise a storage portion for storing an address of a source terminal, and the destination node device may transmit, to the location registering server, a message including the address received from the destination terminal as well as the addresses of its own device and the destination terminal, and may notify the source node(s) device of the address of its own device.

Namely, in FIG. 4, the storage portion 11_1 of the destination terminal 10_1 stores the addresses [2.1.1] and [2.2.1] of the source terminals 10_3 and 10_4. When the destination terminal 10_1 has moved to the area 21_4, the node device 20_4 receives the addresses.

The node device 20_4 transmits the message including the addresses and the address [ADR6] of its own device to the location registering server 30_2, and requests to notify the source node devices 20_1 and 20_2 of the address [ADR6] of its own device and the address of the destination terminal.

The location registering server 30_2 notifies the source node devices 20_1 and 20_2 of the address [ADR6] of the destination node device and the address of the destination terminal.

Thus, it becomes possible for the source node devices 20_1 and 20_2 to know the address [ADR6] of the destination node device.

It is to be noted that the Method by which the node device 20_4 selects the location registering server 30_2 between the location registering servers 30_1 and 30_2 will be described later.

Also, in the present invention the communication system may further comprise a location registering server, and the destination node device may comprise a storage portion for storing an address of the source node device, and may receive, from a new destination node device having an area to which the destination terminal has moved, addresses of the new destination node device and the destination terminal through the location registering server to notify the source node device of the address of the new destination node device when the destination terminal has moved to an area outside the area of the destination node device.

Namely, in FIG. 4, before the destination terminal moves, the destination node device 20_3 stores the addresses [ADR3] and [ADR4] of the node devices 20_1 and 20_2 (hereinafter occasionally referred to as source node device) having the area where the source destination terminal is located in the storage portion 23_3.

When the destination terminal 10_1 has moved from the area 21_3 to the area 21_4 of the node device 20_4, the new destination node device 20_4 transmits the address [ADR6] of its own device and the address of the destination terminal to the node device 20_3 through the location registering server 30_1.

The now former destination node device 20_3 (at this time, the destination terminal 10_1 has already moved, and is not located in the area of the node device 20_3) notifies the source node devices 20_1 and 20_2 of the addresses stored in the storage portion 23_3 of the received address [ADR6] and the address of the destination terminal.

Thus, the source node devices 20_1 and 20_2 know the address [ADR6] of the destination node device 20_4 having the area to which the destination terminal 10_1 has moved.

Also, in the present invention the destination terminal may comprise a storage portion for storing an address of the node device having the area where the destination terminal was located, and the node device may further comprise a storage portion for storing an address of the source node device, and may receive, from a destination node device of the destination terminal, addresses of the destination node device and the destination terminal to notify the source node device of the address of the destination node device when the destination terminal has moved to an area outside that of the node device.

Namely, in FIG. 4, before the destination terminal moves, the destination node device 20_3 stores the addresses [ADR3] and [ADR4] of the source node devices 20_1 and 20_2 in the storage portion 23_3.

When the destination terminal 10_1 has moved from the area 21_3 to the area 21_4 of the node device 20_4, the destination node device 20_4 directly transmits the address [ADR6] of its own device and the address of the destination terminal to the node device 20_3 based on the address of the former destination node device of the storage portion 11_1.

The node device 20_3 notifies the source node devices 20_1 and 20_2 of the addresses [ADR3] and [ADR4] stored in the storage portion 23_3 of the received address [ADR6] of the node device 20_4 and the address of the destination terminal.

Thus, the source node devices 20_1 and 20_2 know the address [ADR6] of the destination node device 20_4 of the destination terminal 10_1.

Also, in the present invention the communication system may further comprise a location registering server, the destination terminal may comprise a storage portion for storing an address of the node device having the area where the destination terminal was located, and the node device may further comprise a storage portion for storing an address of a source terminal, the node device may transmit a message to the location registering server when the destination terminal has moved outside its area. The message including (1) an address of a destination node device, the address being received from the destination node device of the destination terminal and is based on the address stored by the storage portion of the destination terminal; (2) the address of the destination terminal; and (3) the address of the stored source terminal and the node device may request the location registering server to notify the source node device of the addresses of the destination node device and the destination terminal.

Namely, in FIG. 4, before moving, the destination terminal 10_1 stores the address of the node device having the area where the destination terminal 10_1 is located in the storage portion 11_1; while the destination node device 20_3 stores the address of the source terminal in the storage portion 23_3.

When the destination terminal 10_1 has moved outside of the area 21_3 of the node device 20_3, the new destination node device 20_4 notifies the former node device 20_3, whose address is stored in the storage portion 11_1 of the destination terminal 10_1 before the destination terminal moves, of the address [ADR6] of its own device and the address of the destination terminal.

The former node device (former destination node device) 20_3 sends a message including the source terminal address stored in the storage portion 23_3, the received address [ADR6] of the new destination node device, and the destination terminal address to the location registering server 30_2 to request the location registering server 30_2 to notify the source node devices 20_1 and 20_2 of the address [ADR6] of the destination node device and the address of the destination terminal.

Thus, the source node devices 20_1 and 20_2 know the address [ADR6] of the destination node device 20_4.

Also, in the present invention the communication system may further comprise a location registering server, the location registering server may further comprise a storage portion for storing an address of the source node device, the destination node device may transmit, to the location registering server, a message including the addresses of its own device and the destination terminal when the destination terminal has moved to its own area, and may request the location registering server to notify the source node device of the addresses of its own device and the destination terminal.

Namely, the storage portion 32_1 of the location registering server 30_1 stores the addresses [ADR3] and [ADR4] of the source node devices.

When the destination terminal 10_1 has moved to the area 21_4 of the destination node device 20_4, the device 20_4 sends the message (e.g. location registration request) including the address [ADR6] of its own device and the address of the destination terminal to the location registering server 30_1, and requests the location registering server to notify the source node devices 20_1 and 20_2 of the address [ADR6] of its own device and the address of the destination terminal by using this message.

The location registering server 30_1 notifies the source node devices 20_1 and 20_2 of the address [ADR6] of the destination node device and the address of the destination terminal based on the addresses stored in the storage portion 32_1.

Thus, the source node devices 20_1 and 20_2 know the address [ADR6] of the destination node device, and hereafter the packet addressed to the destination terminal 10_1 is directly transferred to the destination node device 20_4.

Also, in the present invention the communication system may further comprise a location registering server, the location registering server may comprise a storage portion for storing an address of the source node device, and the destination node device may inquire of the location registering server about the address of the source node device when the destination terminal has moved to its own area, and may directly notify the source node device of the addresses of its own device and the destination terminal based on its inquiry to the location registering server.

Namely, in FIG. 4, the location registering server 30_1 stores the addresses [ADR3] and [ADR4] of the source node devices 20_1 and 20_2 in the storage portion 32_1.

When the destination terminal 10_1 has moved to the area 21_4, the destination node device 20_4 inquires about the addresses of the node devices (source node devices) having the areas where the source terminals 10_3 and 10_4, which are transmitting the packets to the destination terminal, are located.

The location registering server 30_1 retrieves from the storage portion 32_1 to send back the addresses [ADR3] and [ADR4] of the source node devices. The node device 20_4 directly transmits the address [ADR6] of its own device and the address of the destination terminal to the source node devices 20_1 and 20_2.

Thus, the source node devices 20_1 and 20_2 know the address [ADR6] of the node device having the area where the destination terminal 10_1 is located.

Also, in the present invention the communication system may further comprise a location registering server, the location registering server may further comprise a storage portion for storing an address of a source terminal corresponding to the destination terminal, and the destination node device may transmit, to the location registering server, a message including the addresses of its own device and the destination terminal when the destination terminal has moved to its own area, and may request the location registering server to notify the source node device of the addresses of its own device and the destination terminal.

Namely, in FIG. 4, the storage portion 32_1 of the location registering server 30_1 stores the addresses of the source terminals 10_3 and 10_4.

When the destination terminal 10_1 has moved to the area 21_4, the destination node device 20_4 sends the message (e.g. location registration request) including the address [ADR6] of its own device and the address of the destination terminal to the location registering server 30_1, and requests the location registering server to notify the source node devices 20_1 and 20_2 of the address [ADR6] of its own device and the address of the destination terminal by using this message.

The location registering server 30_1 notifies the source node devices 20_1 and 20_2 of the address [ADR6] of the destination node device and the address of the destination terminal based on the address stored in the storage portion 32_1.

Thus, the source node devices 20_1 and 20_2 know the address [ADR6] of the destination node device and hereafter the packet addressed to the destination terminal 10_1 is directly transferred to its destination node device 20_4.

Also, in the present invention the communication system may further comprise a location registering server which comprises a storage portion for storing an address of a source terminal corresponding to the destination terminal, and when the destination terminal has moved to an area of the destination node device, the destination node device may receive from the location registering server both the address of the source terminal and an address of a source node device having the area where the source terminal of the address is located, and directly transmit, to the source node device, the addresses of its own device and the destination terminal.

Namely, in FIG. 4, the storage portion 32_1 of the location registering server 30_1 stores the addresses of the source terminals 10_3 and 10_4 corresponding to the destination terminal 10_1.

When the destination terminal 10_1 has moved to the area 21_4, the node device 20_4 inquires of the location registering server 30_1 about the addresses of the source terminals 10_3 and 10_4.

The location registering server 30_1 sends back the addresses stored in the storage portion 32_1 to the node device 20_4.

The node device 20_4 inquires of the location registering server 30_2 about the addresses of the source node devices having the areas where the source terminals of the received addresses are located. The location registering server 30_2 sends back the addresses [ADR3] and [ADR4] of the source node devices to the node device 20_4.

Based on the addresses [ADR3] and [ADR4], the node device 20_4 directly transmits the address [ADR6] of its own device and the address of the destination terminal to the source node devices 20_1 and 20_2.

Thus, the source node devices 20_1 and 20_2 know the address [ADR6] of the destination node device and hereafter the packet addressed to the destination terminal 10_1 is directly transferred to the destination node device 20_4.

Also, in the present invention when a location registering table of a location registering server does not contain a location registration of a source terminal stored in its storage portion, the location registering server may request another location registering server in which the source terminal is registered to notify the source node device of the addresses of the destination node device and the destination terminal.

Namely, in FIG. 4, when the location registration of the source terminals 10_3 and 10_4 of the addresses stored in the storage portion 32_1 is not made to the location registering table 31_1 of its own device, the location registering server 30_1 requests another location registering server 30_2, where the location registration is made, to notify the address [ADR6] of the destination node device and the address of the destination terminal.

The location registering server 30_2 notifies the node devices 20_1 and 20_2 having the areas where the source terminals are located of the address [ADR6] of the destination node device and the address of the destination terminal.

Thus, the node devices 20_1 and 20_2 know the address [ADR6] of the destination node address and hereafter the packet addressed to the destination terminal 10_1 is directly transferred to the destination node device 20_4.

Also, in the present invention a storage portion of the terminal may be included in an adapter connected to the terminal.

Namely, the adapter connected to the terminal can be provided with the storage portion. This enables the storage portion to be separated from the terminal when it is not required, thereby reducing the cost and weight of the terminal.

Also, in the present invention a packet transmitted/received between the devices may designate to a destination device at least one of a necessity of transferring its own packet, a transfer destination, a necessity of a response message, and a response destination.

Namely, in the communication system, the packet transmitted/received between the node devices and the location registering servers (when the communication system has the location registering servers) can designate, to the destination device, at least one of the followings;

① Designation of whether or not to transfer the received packet,

② Designation of a transfer destination device in case of "transfer" in the above ①, ③ Designation of whether or not the response message is necessary, ④ Designation of the destination of the response message in case of "necessary" in the above ③.

Also, in the present invention a message transmitted/received between the devices may designate, to a destination device, at least a necessity of a response message and a response destination.

Namely, in the communication system, the message transmitted/received between the node devices and the location registering servers (when he communication system has the location registering servers) can designate to the destination device, ① designation of whether or not the response message is necessary and ② designation of the destination of the response message in case of "necessary".

Also, in the present invention the communication system may comprise a plurality of location registering servers, and the node device may comprise a server retrieval table which makes the destination terminal corresponding to an address of the location registering server where a location registration is made to the destination terminal.

Thus, even when the communication system is provided with a plurality of location registering servers, it becomes possible for the node device to know the location registering server to which the location registration should be made for the terminal located in the area, and the location registering server of which the address of the node device having the area where the source or the destination terminal is located is inquired.

Also, in the present invention the device may be connected with a router to compose the communication system.

Also, in the present invention the device may be connected with an ATM-SW to compose the communication system.

Also, in the present invention at least one of the terminals may comprise a fixed terminal, and at least one of the node devices may comprise a node device for a fixed communication network.

Namely, at least one of the node devices may be the node device for the fixed communication network connected to the fixed terminal.

BRIEF DESCRIPTION OF THE DRAWINGS

Throughout the figures, like reference numerals indicate like or corresponding components.

DESCRIPTION OF THE EMBODIMENTS

Figure 1:
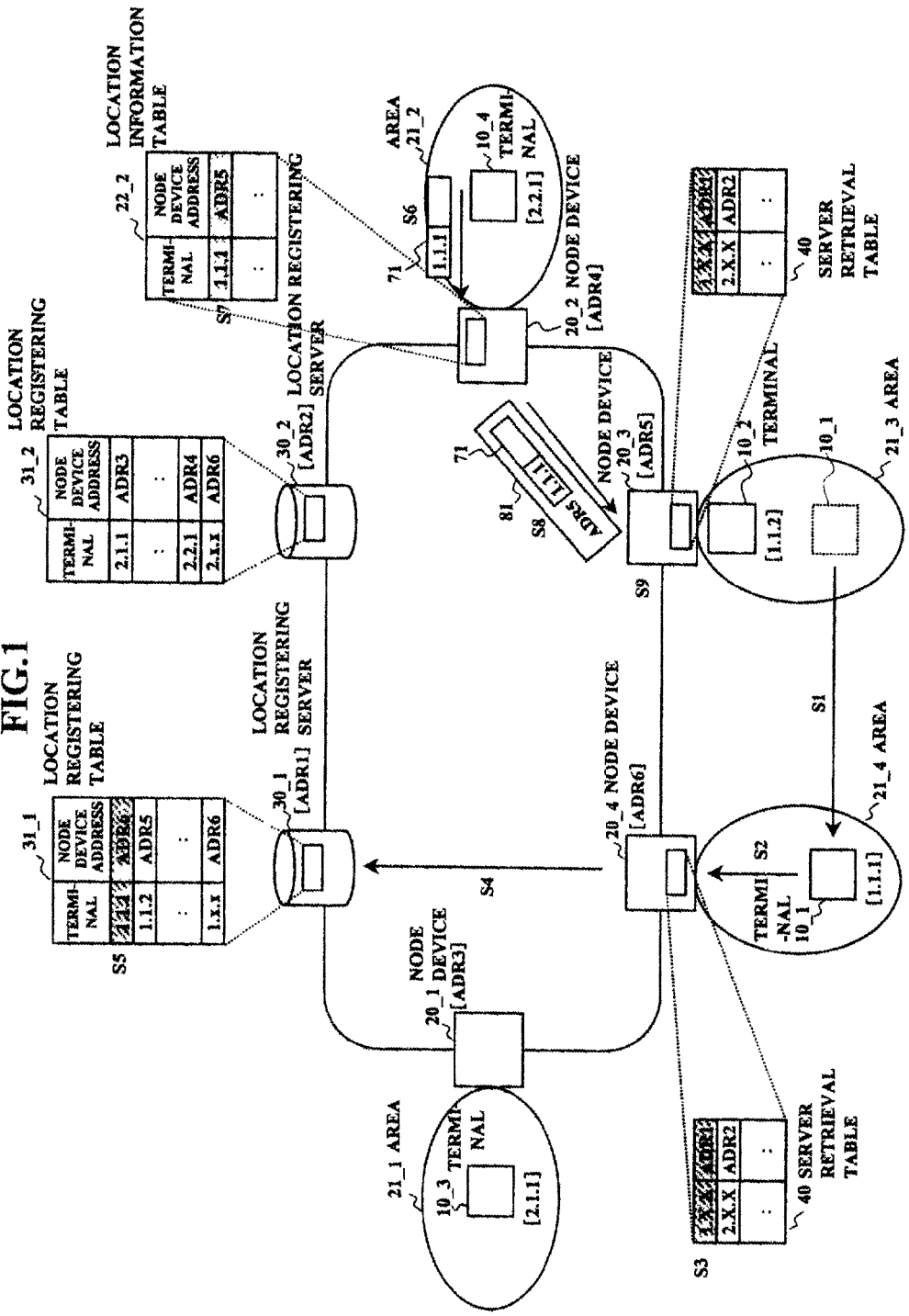
FIG. 1 is a block diagram showing an operation principle (1) of a node device according to the present invention.
Figure 2:
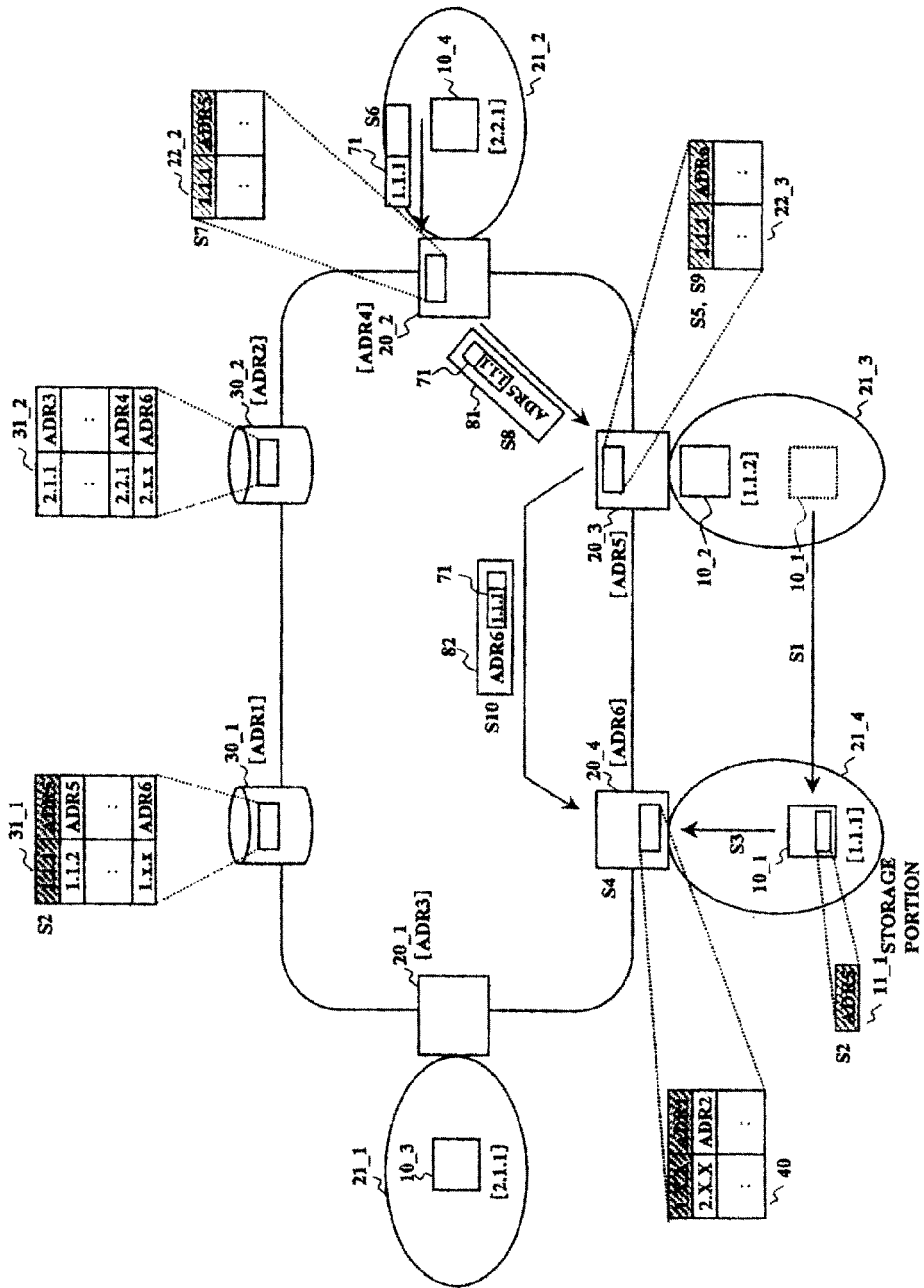
FIG. 2 is a block diagram showing an operation principle (2) of a node device according to the present invention.
Figure 3:
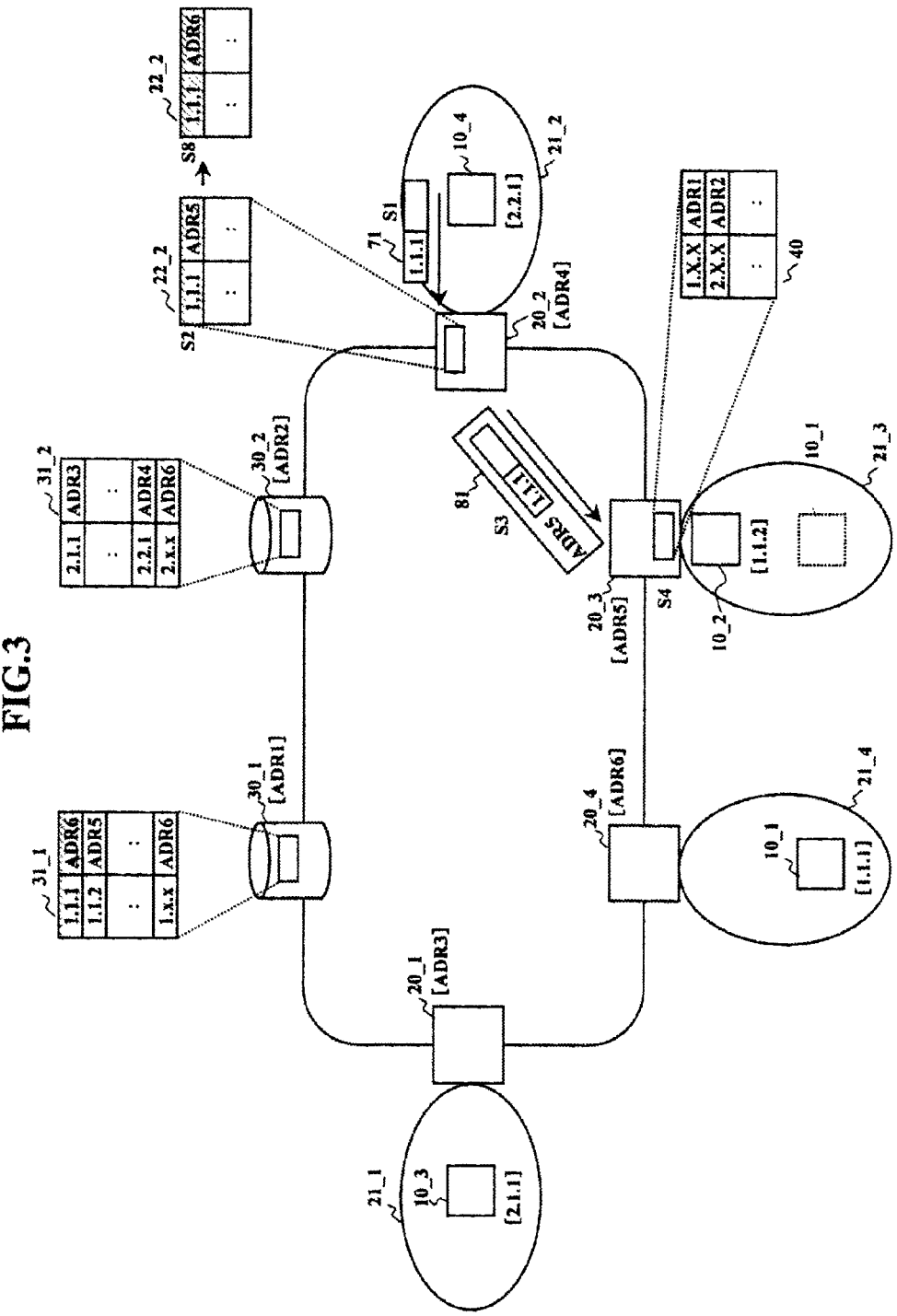
FIG. 3 is a block diagram showing an operation principle (3) of a node device according to the present invention.
Figure 4:
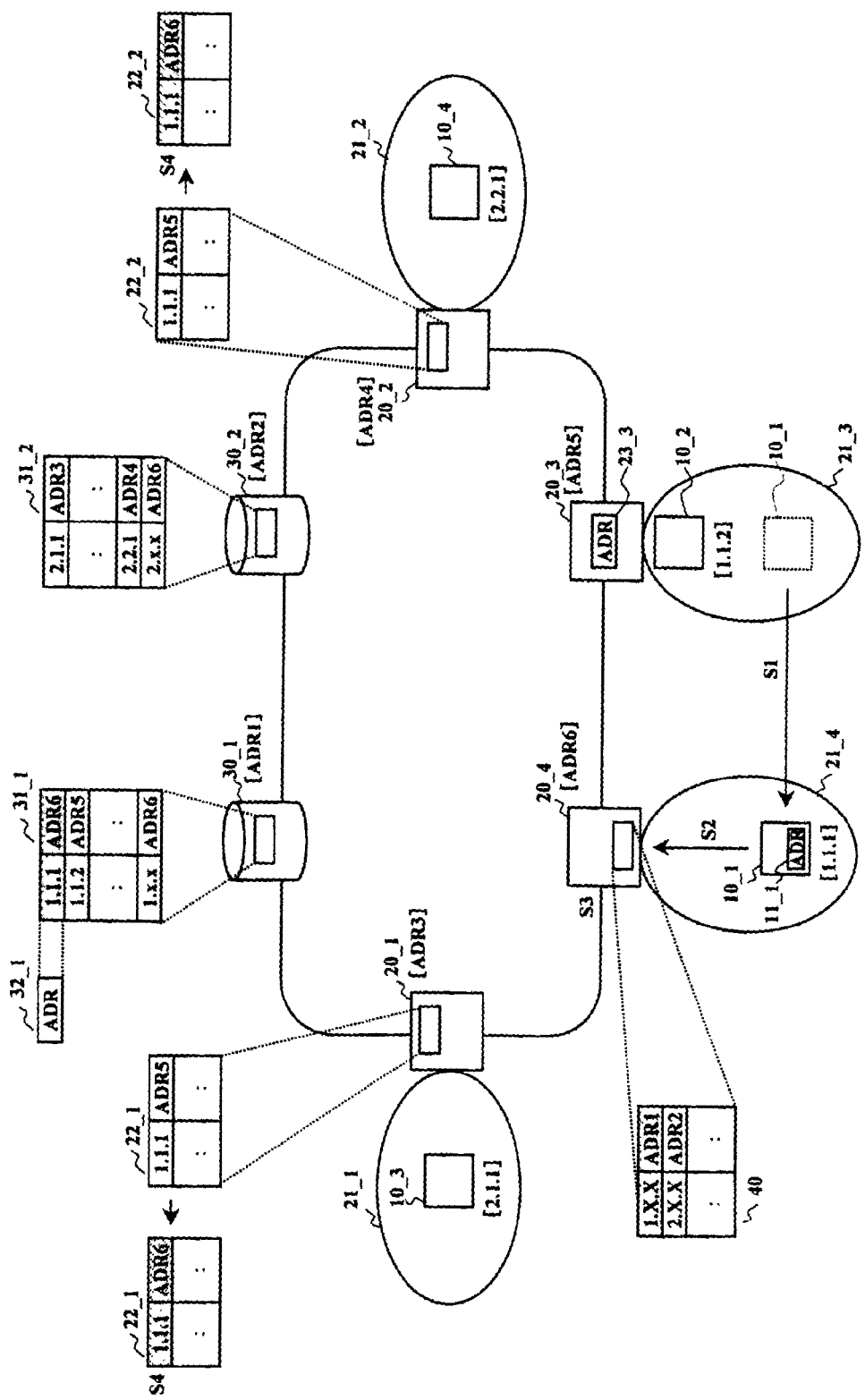
FIG. 4 is a block diagram showing an operation principle (4) of a node device according to the present invention.

Hereinafter, embodiments (1)–(24) of a communication system composed of node devices according to the present invention will be described. In the embodiments (1)–(23), the node devices compose sub-communication systems with terminals and location registering servers. These sub-communication systems are connected with routers to compose a general IP (Internet Protocol) communication system, or a router network.

In the embodiment (24), an arrangement of a communication system applied to an ATM network is shown. It is to be noted that only required devices are illustrated in each of the sub-communication systems while other devices are omitted. It is further noted that the network architecture as shown in the drawings is not a requirement. For example a shown ring type network is only for example purposes.

Usually, when a terminal moves to an area of a node device, a location registration to a location registering server is made, but this usual location registration is not illustrated. However, depending on the embodiments, there are cases where this usual location registration is illustrated. In such cases, the location registration is shown by an arrow with a dotted line.

It is to be noted that the node devices of the embodiments (1)–(24) of the present invention can be connected with either a mobile network (a wireless network or the like) or a fixed network (a cable network or the like).

The movement of a terminal leads to a connection change of a fixed terminal (station device) connected to a fixed network node device to another fixed network node device, or to a movement from an area of a mobile network node device to an area of another mobile network node device.

Moreover, it is also possible for a terminal, for example, which has a function of being connectable to both a mobile network and a fixed network to move between the mobile network node device and the fixed network node device. Further a node device may maintain a periodic communication between the node device and the terminal. If the node device discovers the terminal is no longer communicating it may consider the terminal to have "disappeared".

In the embodiments (1)–(24), these movements are merely described as "a destination terminal moves from an area of a node device to an area of another node device".

(i) Embodiments of Method 1 for Achieving Object 1

Figure 5:
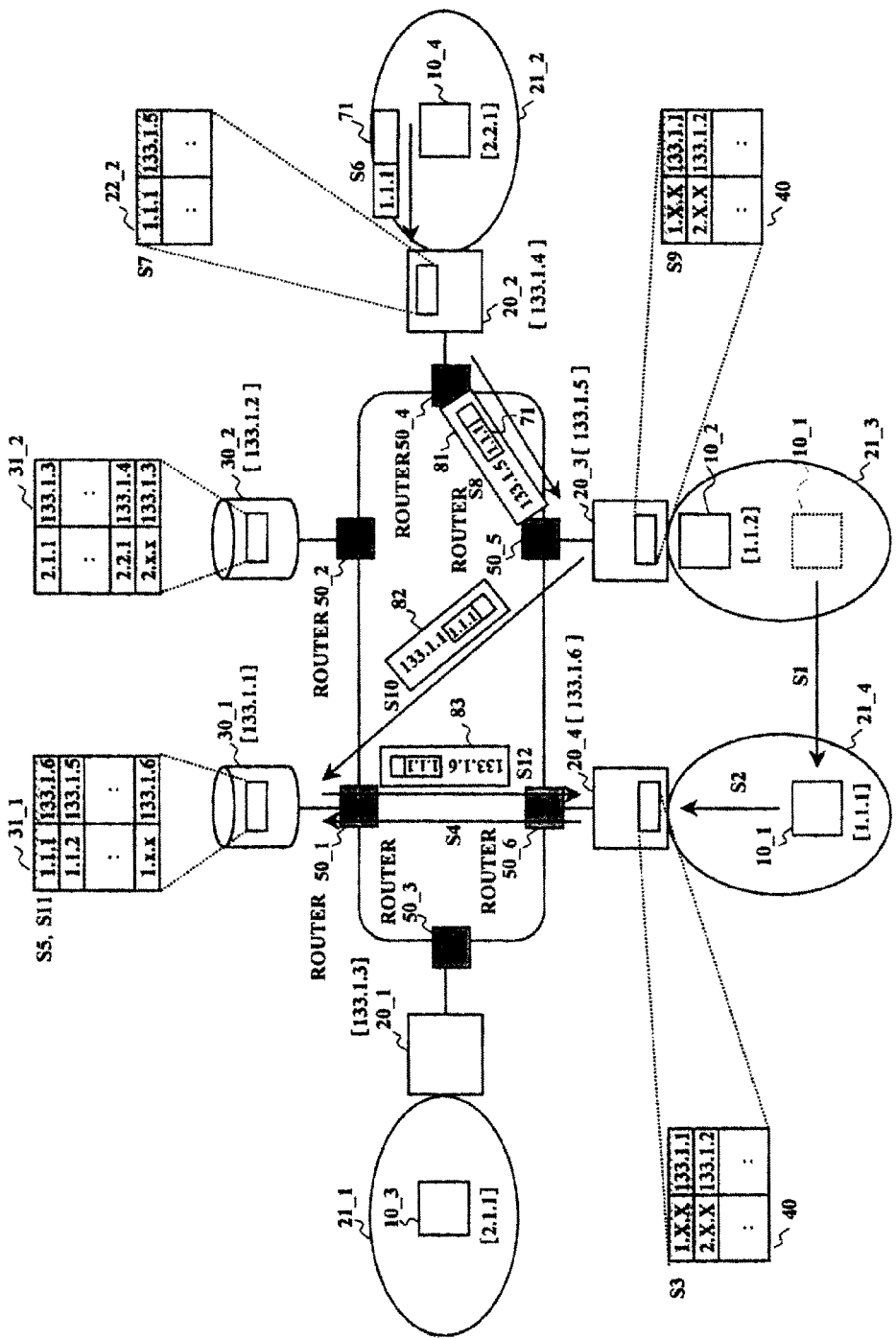
FIG. 5 is a block diagram showing an embodiment (1) of a node device according to the present invention.
Figure 7:
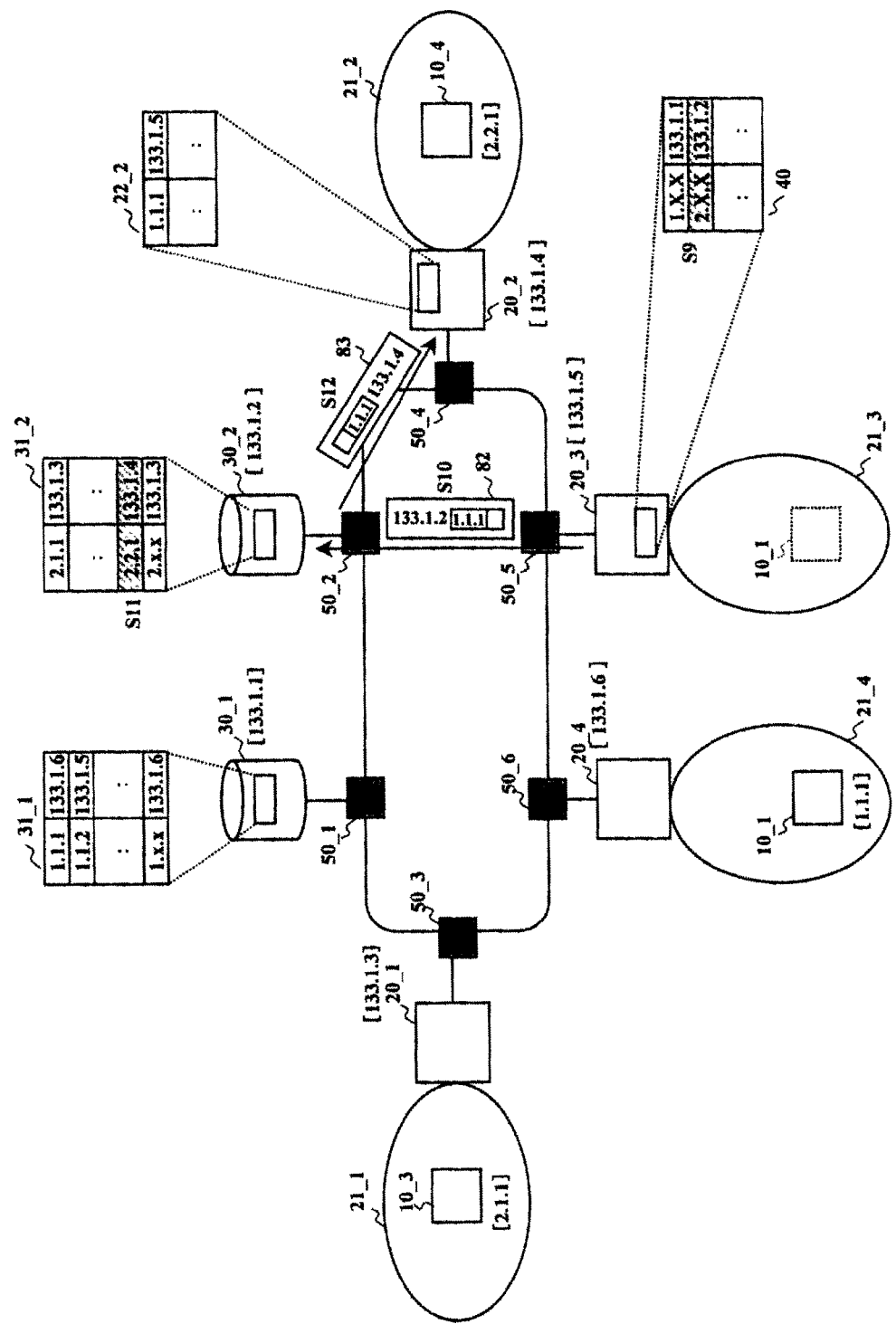
FIG. 7 is a block diagram showing an embodiment (3) of a node device according to the present invention.
Figure 9:
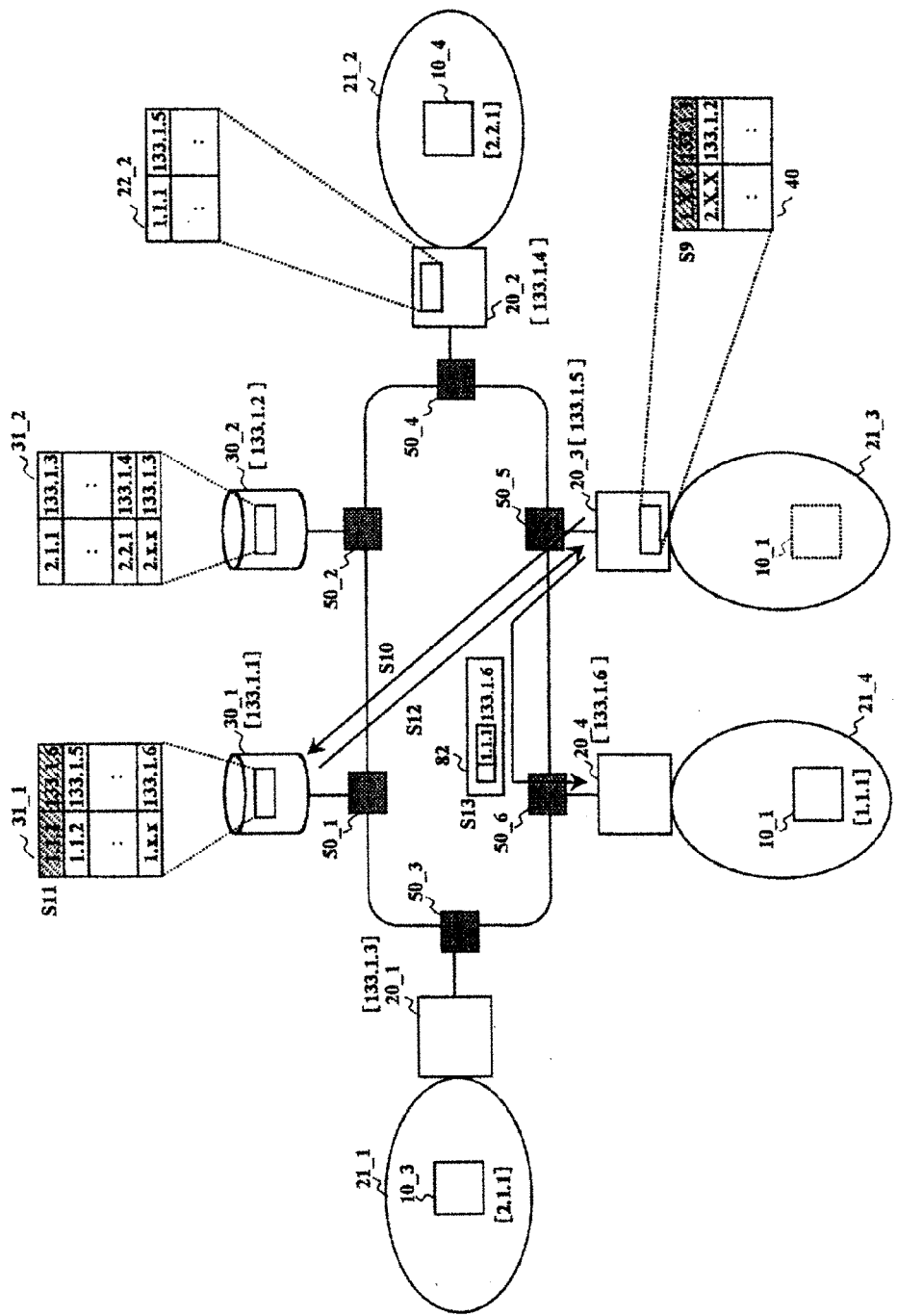
FIG. 9 is a block diagram showing an embodiment (4) of a node device according to the present invention.

(Embodiment (1) of FIG. 5 to Embodiment (3) of FIG. 7 and Embodiment (4) of FIG. 9)

These embodiments are examples for achieving Object 1 (to reduce the packet loss which occurs by the destination terminal movement to the area of another node device) based on Method 1 (to transfer the packet to the destination node device directly or indirectly through other devices based on the location information of the destination terminal in the node device or the location registering server).

FIG. 5 shows the embodiment (1) of the node device according to the present invention which composes the communication system. In the arrangement of this communication system, the general IP (Internet Protocol) network or the router network is applied to the communication system between the location registering servers 30_1, 30_2 and the node devices 20_1–20_4.

Namely, the location registering servers 30_1, 30_2 and the node devices 20_1–20_4 are connected respectively with routers 50_1–50_6 to compose the IP network. Many variations of a connection of each router are considered, for example a mesh type connection, a ring type connection.

IP addresses [133.1.1]–[133.1.6] are respectively assigned to the location registering servers 30_1, 30_2 and the node devices 20_1–20_4.

Hereinafter, operations of this embodiment will be described in the order of processing steps.

The state of the communication system before the packet transfer is as follows:

The terminal 10_1 is located in the area 21_3 of the node device 20_3.

The source node device 20_2 stores the address [133.1.5] of the node device 20_3 having the area where the terminal 10_1 is located in the location information table 22_2.

Step S1: The terminal 10_1 moves to the area 21_4 of the node device 20_4.

Step S2: The terminal 10_1 makes the location registration to the network through the node device 20_4.

Step S3: The node device 20_4 retrieves the server retrieval table 40 to obtain the address [133.1.1] of the location registering server 30_1 corresponding to the address [1.1.1] of the terminal 10_1.

Step S4: The node device 20_4 transmits the location registration information to the location registering server 30_1.

Step S5: The location registering server 30_1 updates the address of the node device having the area where the terminal 10_1 is located in the location registering table 31_1 to [133.1.6].

Step S6: The user packet 71 addressed to the terminal 10_1 arrives at the node device 20_2.

Step S7: The node device 20_2 retrieves the location information table 22_2 to obtain the address [133.1.5] of the node device 20_3 having the area where the terminal 10_1 was located.

Step S8: The node device 20_2 adds the address [133.1.5] of the node device 20_3 to the received packet 71 addressed to the terminal 10_1 to transfer the packet as the inter-node packet 81.

Step S9: When the destination terminal 10_1 is not located in the area 21_3, the node device 20_3 which has received the packet 81 retrieves the server retrieval table 40 to obtain the address [133.1.1] of the location registering server 30_1 corresponding to the address [1.1.1] of the terminal 10_1.

Step S10: The node device 20_3 transfers the packet 82, which has a destination address of the packet 81 rewritten to [133.1.1], to the location registering server 30_1.

Step S11: The location registering server 30_1 retrieves the location registering table 31_1 to obtain the address [133.1.6] of the node device 20_4 having the area where the terminal 10_1 is located.

Step S12: The location registering server 30_1 transfers the packet 83, which has the destination address of the received packet 82 rewritten to [133.1.6], to the node device 20_4.

Thus, even in case the terminal 10_1 moves from the area 21_3 of the node device 20_3 to the area 21_4 of the node device 20_4 while the communication is continuing, the packet 71 is transferred to the destination terminal 10_1 through the node device 20_3, the location registering server 30_1, and the node device 20_4.

It is to be noted that at steps S3 and S9, the node devices 20_4 and 20_3 respectively retrieve the server retrieval table 40 to obtain the address of the location registering server 30_1 corresponding to the address of the terminal 10_1. However, when the communication system is provided with only one location registering server, the node device 20_4 is not required to be provided with the server retrieval table 40.

Namely, in case the location registration information is dispersedly registered in a plurality of location registering servers, the node device and the location registering servers of the embodiment (22) which will be described later are required to be provided with the server retrieval table 40.

Moreover, in case the inter-node packet 82 is transferred to the location registration server 30_1 by steps S6–S10 before the address of the node device 20_4 having the area where the terminal 10_1 is located in the location registering table 31_1 is updated to [133.1.6] at step S5 in this embodiment, there is a possibility that a loop is generated between the node device 20_3 and the location registration server 30_1 since the location registering server 30_1 transfers the inter-node packet to [133.1.5] which is the address before the update.

Measures therefore are as follows:

(1) A survival time (Time To Live) field included in a header of the IP packet is used, and the packet is discarded when the number of the routers passed through becomes equal to or more than a predetermined value.

(2) The location registering server 30_1 compares a source address of the inter-node packet 82 with an address of the node device having the area where the destination terminal of the user packet 71 is located registered in the location registering table 31_1. If they have the same address, the location registration server 30_1 discards the packet by judging that the loop will be generated. Also, by using the survival time (Time To Live) field in the same way as (1) above, when the number of the routers passed through is equal to or less than the predetermined value, the location registration server 30_1 waits until the destination terminal has its location registered, while otherwise discarding the packet.

Figure 6:
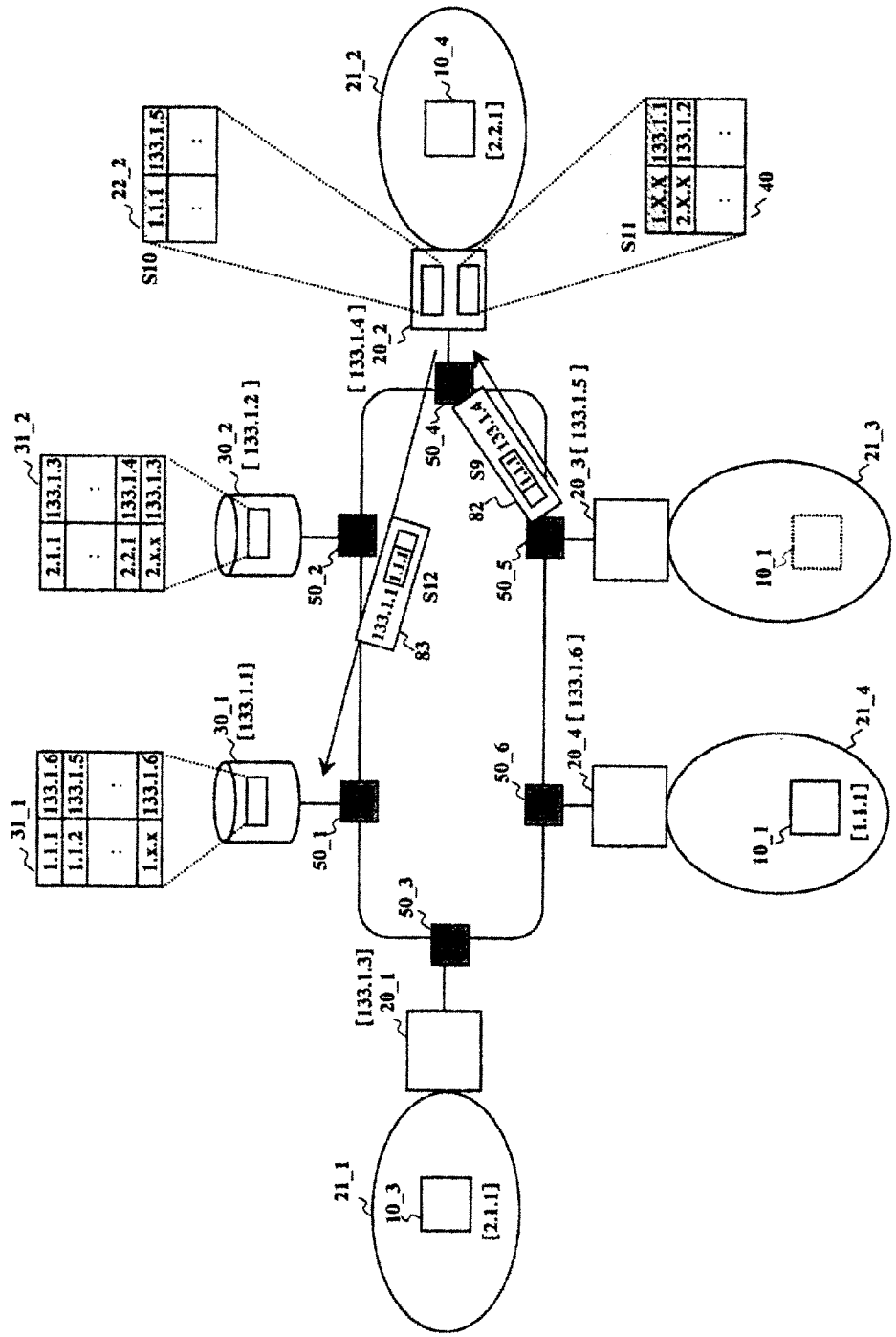
FIG. 6 is a block diagram showing an embodiment (2) of a node device according to the present invention.

FIG. 6 shows the embodiment (2) of the node device according to the present invention which composes the communication system. The arrangement of this communication system is the same as that of the embodiment (1) in FIG. 5. However, this embodiment (2) is different from the embodiment (1) in that the packet is transmitted through the source node device 20_2 when the packet is transferred from the node device 20_3 on the receiving side to the location registering server 30_1.

Hereinafter, steps after the state of step S8 in the embodiment (1) where the packet 81 has been transmitted from the node device 20_2 to the node device 20_3 will be described.

Step S9: When the terminal 10_1 is not located in the area 21_3, the node device 20_3 sends back, to the node device 20_2, the inter-node packet 82, which has the destination address of the received packet 81 (see FIG. 5) rewritten to [133.1.4] of the source node device 20_2.

Step S10: The node device 20_2 retrieves the address of the node device having the area where the terminal 10_1 is located from the location information table 22_2 to obtain [133.1.5]. Since this address corresponds with the source address of the packet 82, i.e. its own device address [133.1.5], it is judged that the terminal 10_1 is not located in the area of the node device 20_3.

Step S11: Therefore, the node device 20_2 retrieves the address of the location registering server 30_1 corresponding to the address [1.1.1] of the terminal 10_1 from the server retrieval table 40 to obtain [133.1.1].

Step S12: The node device 20_2 transfers the inter-node packet 83, which has the destination address of the received packet 82 rewritten to [133.1.1], to the location registering server 30_1.

Hereafter, the operations of steps S11 and S12 of the embodiment (1) shown in FIG. 5 are performed.

Thus, the packet 71 transmitted from the terminal 10_4 is transferred to the node device 20_4 having the area to which the destination terminal has moved as the inter-node packet through the node device 20_2, the node device 20_3, the node device 20_2, and the location registering server 30_1 without being discarded.

It is to be noted that as a varied example of this embodiment (2), after step S11, the node device 20_2 may inquire of the location registering server 30_1 about the address of the destination node device to transfer the packet 82 directly to the node device 20_4.

FIG. 7 shows the embodiment (3) of the node device according to the present invention which composes the communication system. The arrangement of this communication system is the same as that of the embodiment (2) in FIG. 6. However, this embodiment (3) is different from the embodiment (2) in that when the node device 20_3 on the receiving side sends back the received packet 81 (see FIG. 5) to the source node device 20_2, the packet is sent back through the location registering server corresponding to the source terminal instead of being sent back directly to the node device 20_2.

Hereinafter, steps after the state of step S8 in the embodiment (1) where the packet 81 has been transmitted from the node device 20_2 to the node device 20_3 will be described.

Step S9: When the terminal 10_1 is not located in the area 21_3, the node device 20_3 retrieves the server retrieval table 40 to obtain the address [133.1.2] of the location registering server 30_2 corresponding to the address [2.2.1] of the source terminal 10_4.

Step S10: The node device 20_3 transfers the inter-node packet 82, which has the destination address of the received packet 81 rewritten to [133.1.2], to the location registering server 30_2.

The Method for indicating that the packet 82 is a returned packet at this time will be described later referring to FIG. 8.

Step S11: The location registering server 30_2 retrieves the location registering table 31_2 to obtain the address [133.1.4] of the node device 20_2 having the area where the terminal 10_4 is located.

Step S12: The location registering server 30_2 transfers the inter-node packet 83, which has the destination address of the received packet 82 rewritten to [133.1.4], to the node device 20_2.

Hereafter, the operations of steps S10–S12 of the embodiment (2) shown in FIG. 6 and steps S11 and S12 of the embodiment (1) shown in FIG. 5 are performed.

Thus, the packet 71 is transmitted to the destination terminal 10_1 through the node devices 20_2, 20_3, the server 30_2, the node device 20_2, the server 30_1, and the node device 20_4.

Figure 8:
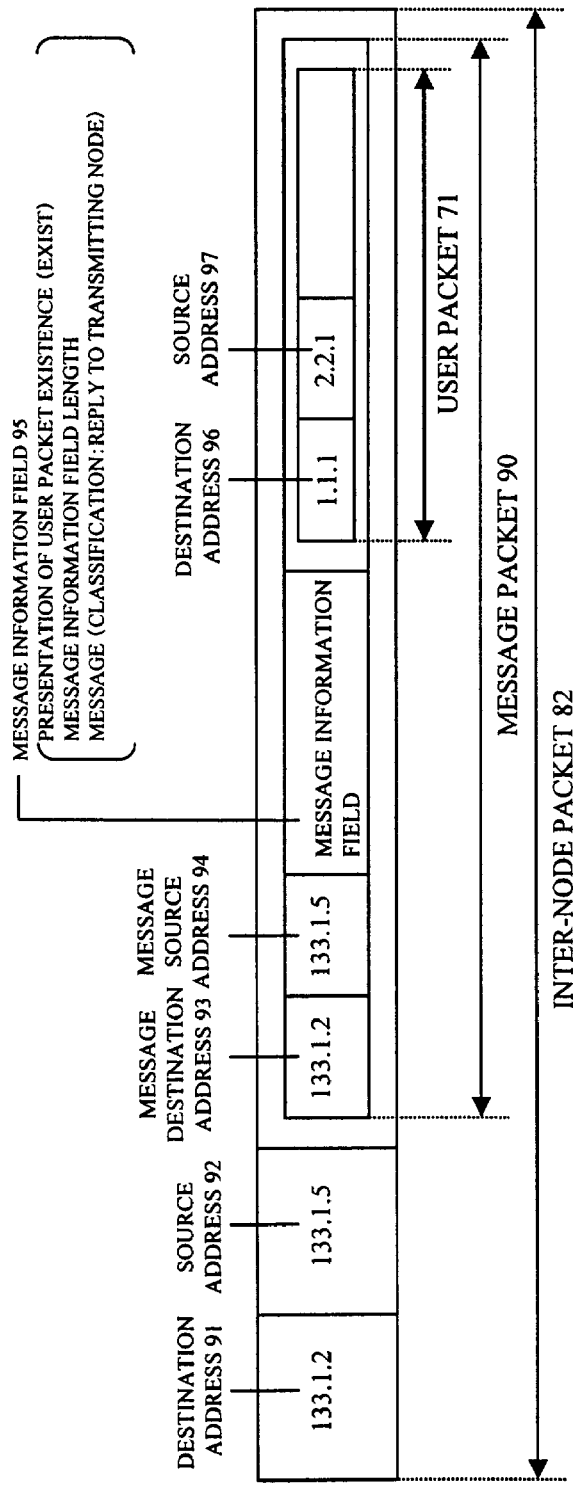
FIG. 8 is a diagram showing a format example of a packet used in the embodiment (3) of a node device according to the present invention.

FIG. 8 shows an embodiment of the inter-node packet 82 at step S10 of the embodiment (3) shown in FIG. 7. This packet 82 is sent back from the node device 20_3 on the receiving side to the source node device 20_2 as the packet 83 through the location registering server 30_2 corresponding to the source terminal 10_4.

The packet 82 is composed of a destination address field 91, a source address field 92, and a message packet field 90.

The address [133.1.2] of the location registering server 30_2 which is the destination of the packet 82 and the address [133.1.5] of the source node device 20_3 are respectively set in the fields 91 and 92.

The field 90 is composed of a message destination address field 93, a message source address field 94, a message information field 95, and a user packet field 71.

The address [133.1.2] of the location registering server 30_2 which is the destination of the message and the address [133.1.5] of the node device 20_3 which is the source of the message are respectively set in the fields 93 and 94.

The field 95 is composed of "Existence of user packet 71", "Message information field length", and "Message classification".

The field 95 of the packet 82 at step S10 presents "Existence of user packet 71"="Exist", and "Message classification"="Reply to source node device". The user packet 71 is inserted into the field 71.

The location registering server 30_2 which has received the packet 82 reads contents of the message information field 95 and recognizes that the classification of this message packet is "Reply to source node device".

Then, the location registration server 30_2 retrieves the location registering table 31_2 at step S11 of the embodiment (3) in FIG. 7 to obtain the address [133.1.4] of the node device 20_2 having the area where the terminal 10_4 of the address [2.2.1] is located by referring to a source address 97 of the user packet 71.

FIG. 9 shows the embodiment (4) of the node device according to the present invention which composes the communication system. The arrangement of this communication system is the same as that of the embodiment (1) in FIG. 5.

The embodiment (4) shows operations following step S8 of the embodiment (1) shown in FIG. 5. Namely, it shows the case where the node device 20_3 on the receiving side, after receiving the inter-node packet 81 (see FIG. 5), obtains the address of the node device having the area where the terminal 10_1 is located from the location registering server 30_1 to transfer the packet to the destination node device 20_4.

Hereinafter, detailed operations after step S8 of the embodiment (1) will be described.

Step S9: When the terminal 10_1 is not located in the area 21_3, the node device 20_3 retrieves the server retrieval table 40 to obtain the address [133.1.1] of the location registering server 30_1 corresponding to the address [1.1.1] of the terminal 10_1.

Step S10: The node device 20_3 transmits, to the location registering server 30_1, a message inquiring the address of the node device having the area where the terminal 10_1 is located.

Steps S11 and S12: The location registering server 30_1 retrieves the address [133.1.6] of the node device 20_4 having the area where the terminal 10_1 is located by referring to the location registering table 31_1 to notify the same to the node device 20_3.

Step S13: The node device 20_3 transfers the inter-node packet 82, which has the destination address of the received packet 81 rewritten to [133.1.6], to the node device 20_4.

Thus, it becomes possible for the node device 20_3, even in case the destination terminal 10_1 is not located in the area of the node device 20_3, to transfer the received packet 81 to the node device 20_4 having the area where the terminal 10_1 is located.

(ii) Embodiments of Method 2 for Achieving Object 1

Figure 10:
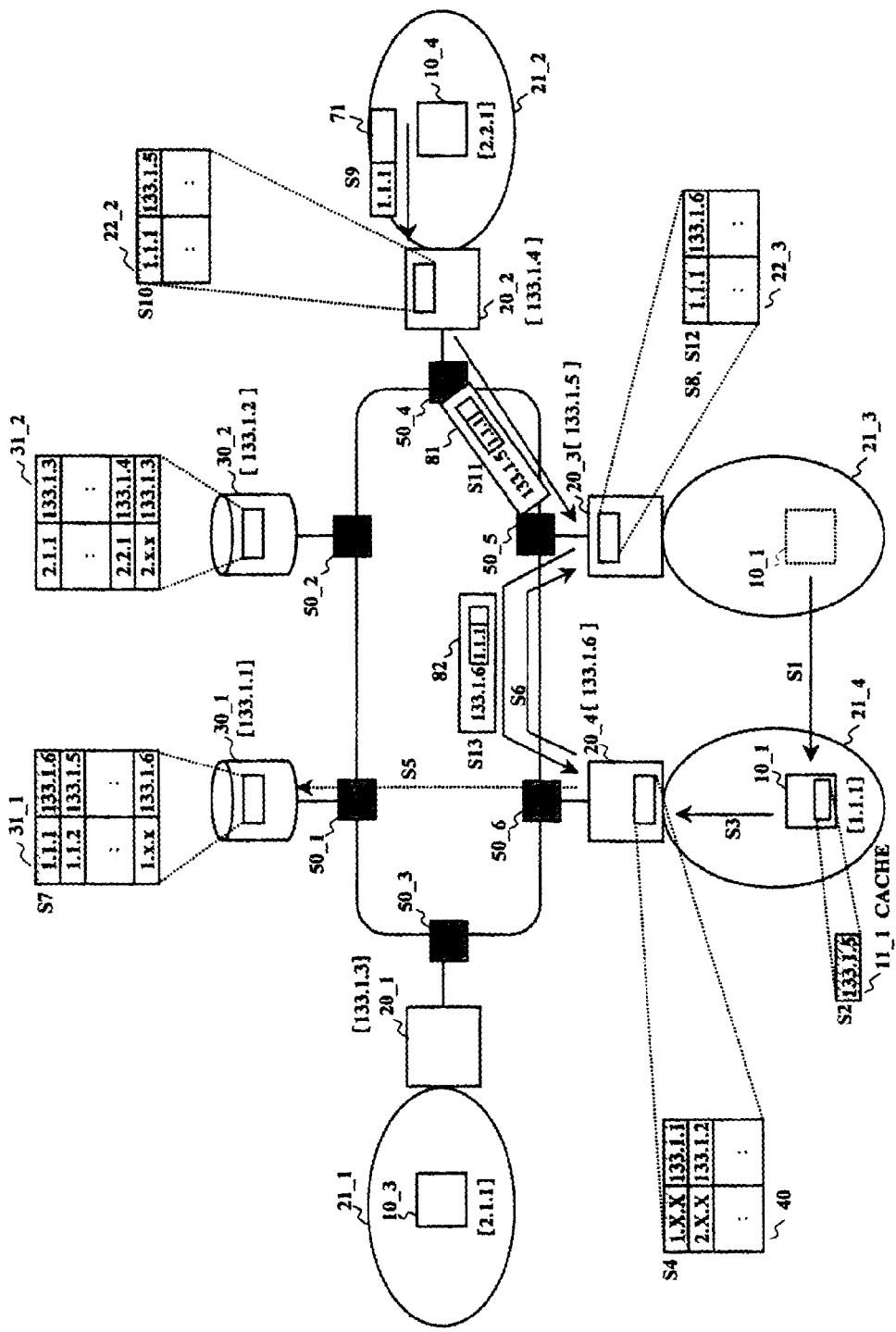
FIG. 10 is a block diagram showing an embodiment (5) of a node device according to the present invention.
Figure 16:
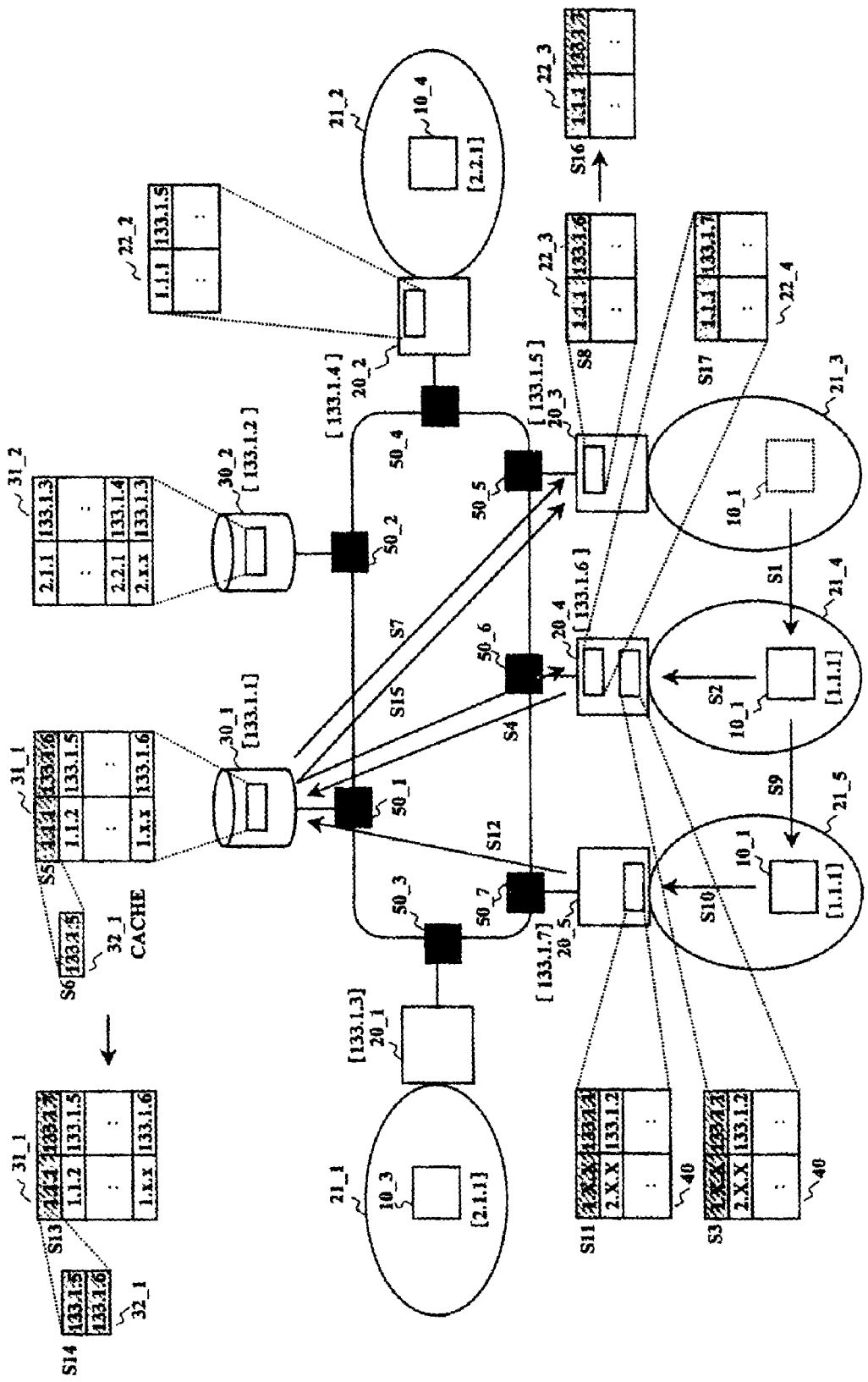
FIG. 16 is a block diagram showing an embodiment (11) of a node device according to the present invention.

(Embodiment (5) of FIG. 10-E*mbodiment* (11) of FIG. 16)

These embodiments achieve Object 1 (to reduce the packet loss which occurs by the destination terminal movement to the area of another node device) based on Method 2 (to obtain directly or indirectly the address of the former node device having the area where the destination terminal has been located to notify its own device address to the former node device directly or through other devices when the destination terminal has moved to its own area).

FIG. 10 shows the embodiment (5) of the node device according to the present invention which composes the communication system. The arrangement of this communication system differs from the embodiment (1) in FIG. 5 only in that the terminal 10_1 is provided with a storage portion, for example a cache 11_1 for storing the address of the node device 20_3 having the area where the terminal 10_1 was located before the movement.

It is to be noted that the location information table 22_3 omitted in FIG. 5 is shown in the node device 20_3 in FIG. 10.

Also, it is possible that not the terminal 10_1 but an adapter is provided with the cache 11_1 so that the adapter is connected to the terminal 10_1 when necessary.

In this embodiment (5), schematically, the destination terminal 10_1 stores the address of the former node device in the cache 11_1 to notify the address of a latest node device to the former node device every time it moves to the latest node device.

Hereinafter, detailed operations of the embodiment (5) will be described.

A state before the transmission of the packet 71 by the source terminal 10_4 is that the terminal 10_1 is located in the area 21_3 of the node device 20_3 and the source node device 20_2 stores the address [133.1.5] of the node device 20_3 having the area where the terminal 10_1 is located in the location information table 22_2.

Step S1: The terminal 10_1 moves to the area 21_4 of the node device 20_4.

Step S2: The terminal 10_1 stores the address [133.1.5] of the former node device 20_3 in the cache 11_1.

Step S3: The terminal 10_1 makes the location registration to the network. At this time, it notifies the node device 20_4 of the address [133.1.5] of the former node device 20_3.

Step S4: The node device 20_4 retrieves the server retrieval table 40 to obtain the address [133.1.1] of the location registering server 30_1 corresponding to the address [1.1.1] of the terminal 10_1.

Step S5: The node device 20_4 transmits the location registration information to the location registering server 30_1.

Step S6: The node device 20_4 notifies its own device address [133.1.6] and the address of the destination terminal to the node device 20_3.

Step S7: The location registering server 30_1 updates the address of the node device having the area where the terminal 10_1 (address [1.1.1]) is located in the location registering table 31_1 to [133.1.6].

Step S8: The node device 20_3 adds, to the location information table 22_3 for "transferring inter-node packets", the address [1.1.1] of the terminal 10_1 and the address [133.1.6] of its destination node device 20_4.

Step S9: The terminal 10_4 transmits the user packet 71 addressed to the terminal 10_1.

Step S10: The node device 20_2 retrieves the address [133.1.5] of the node device 20_3 having the area where the destination terminal 10_1 of the received packet 71 was located from the location information table 22_2 for "transferring user packets".

Step S11: The node device 20_2 adds the address [133.1.5] of the node device 20_3 to the received packet 71 addressed to the terminal 10_1 and transfers the same as the inter-node packet 81.

Step S12: Since the destination terminal 10_1 is not located in the area 21_3, the node device 20_3 refers to the location information table 22_3 to retrieve the address [133.1.6] of the node device 20_4 having the area where the destination terminal 10_1 is located from its address [1.1.1] included in the packet 81.

Step S13: The node device 20_3 transfers the inter-node packet 82, which has the destination address of the received packet 81 rewritten to [133.1.6], to the node device 20_4.

Hereafter, the packet 71 included in the packet 82 is delivered to the destination terminal 10_1 through the node device 20_4.

It is to be noted that as mentioned above, the location information table 22_3 is a table for recognizing the address of the node device to which the packet should be transferred by referring to the table when the node device on the receiving side receives the inter-node packet and the destination terminal is not located in its own device.

On the other hand, the location information table 22_2 is a conventional table for the source node device to refer to the address of the node device which is the destination of the user packet received from the source terminal.

If indicating both of the addresses of the destination terminal and the destination node device, the table 22_3 can be used also as the location information table (not shown) included in the node device 20_3 for transferring user packets. However, the retrieval time gets long when the table is used for both.

In the following embodiments, description will be made supposing that the location information table is used both for transferring inter-node packets and transferring user packets.

Figure 11:
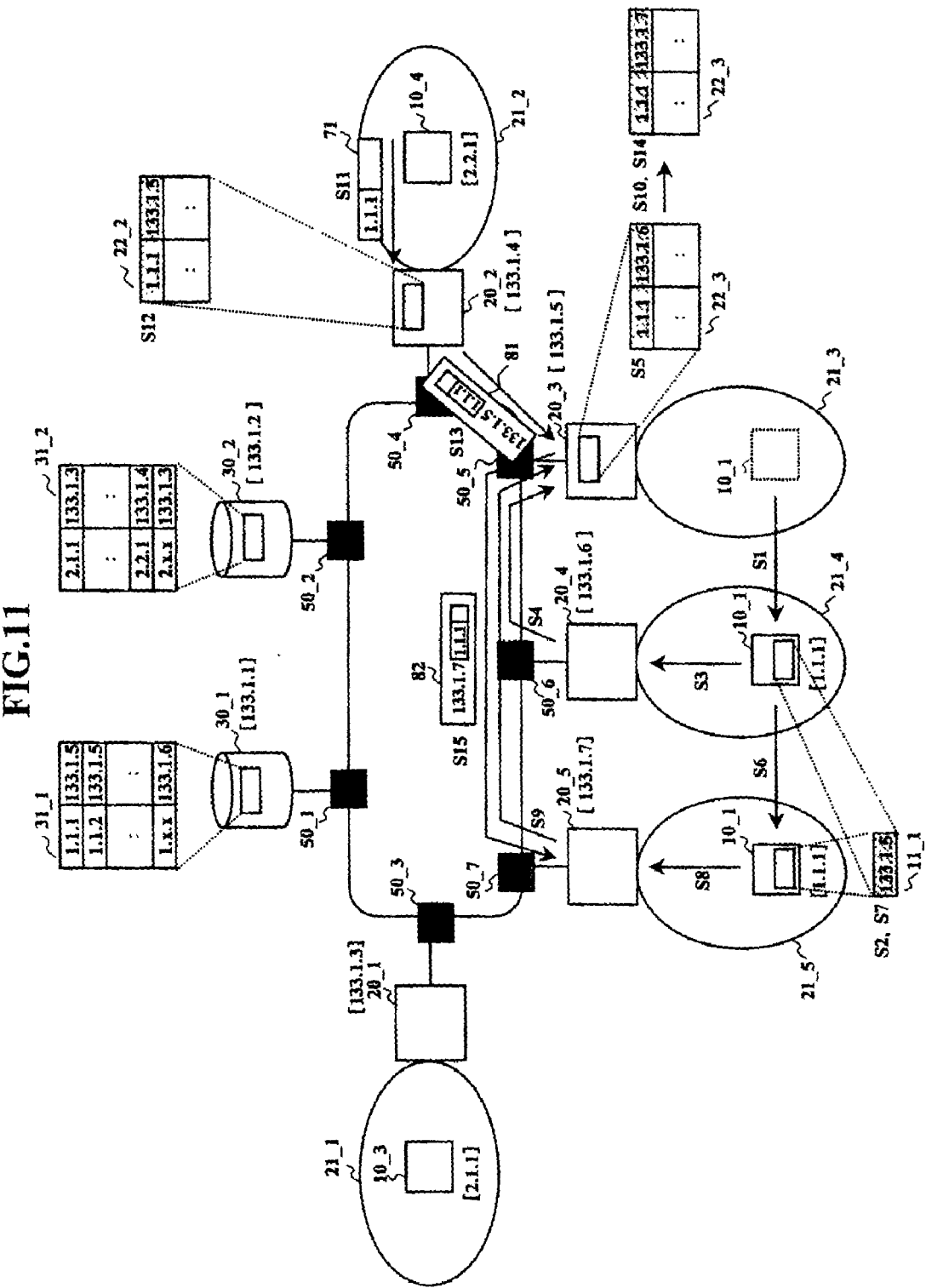
FIG. 11 is a block diagram showing an embodiment (6) of a node device according to the present invention.

FIG. 11 shows the embodiment (6) of the node device according to the present invention which composes the communication system. In the arrangement of this communication system, a router 50_7 is connected to the communication system of the embodiment (5) in FIG. 10. A node device 20_5 is further connected to communication system through the router 50_7. An address [133.1.7] is assigned to the node device 20_5 which has an area 21_5.

In this embodiment (6), schematically, the destination terminal 10_1 stores the address [133.1.5] of the communication start node device 20_3 in the cache 11_1 and notifies the communication start node device 20_3 of the address of the latest node device every time it moves to the area of the latest node device.

Hereinafter, detailed operations of the packet transfer of the embodiment (6) will be described.

As a state before the packet transfer operation, the terminal 10_1 is located in the area 21_3 of the node device 20_3 with which it has started the communication and it is supposed that the source node device 20_2 stores the address [133.1.5] of the node device 20_3 having the area where the terminal 10_1 is located in the location information table 22_2.

Step S1: The terminal 10_1 moves to the area 21_4 of the node device 20_4.

Step S2: The terminal 10_1 stores the address [133.1.5] of the communication start node device 20_3 in the cache 11_1.

Step S3: The terminal 10_1 makes the location registration to the network. At this time, it notifies the address [133.1.5] of the communication start node device 20_3.

Step S4: The node device 20_4 notifies its own device address [133.1.6] and the address of the destination terminal to the communication start node device 20_3.

Step S5: The node device 20_3 adds the address of the terminal 10_1 and the address [133.1.6] of its destination node device to the location information table 22_3.

Step S6: The terminal 10_1 moves to the area 21_5 of the node device 20_5.

Step S7: The terminal 10_1 maintains the address [133.1.5] of the communication start node device 20_3 in the cache 11_1.

Step S8: The terminal 10_1 notifies the address [133.1.5] of the communication start node device 20_3 to the network.

Step S9: The node device 20_5 notifies its own device address [133.1.7] and the destination terminal address to the communication start node device 20_3.

Step S10: The node device 20_3 updates the address of the node device having the area where the terminal 10_1 is located in the location information table 22_3 to [133.1.7].

Steps S11–S13: The user packet 71 addressed to the terminal 10_1 from the terminal 10_4 is included in the inter-node packet 81 to be transferred to the node device 20_3.

Step S14: The node device 20_3 retrieves the location information table 22_3 to obtain the address [133.1.7] of the node device 20_5 having the area where the terminal 10_1 is located.

Step S15: The node device 20_3 transfers the inter-node packet 82, which has the destination address of the received packet 81 rewritten to [133.1.7], to the node device 20_5.

Thus, for example, it becomes possible for the node device 20_3 to transfer the packet addressed to the terminal 10_1, which has moved out of its own area during the communication, to the node device 20_5 having the area where the terminal 10_1 is located. The packet can be transferred to the node device having the area where the terminal 10_1 is located at present in the same way even if the terminal 10_1 sequentially moves to other areas.

Figure 12:
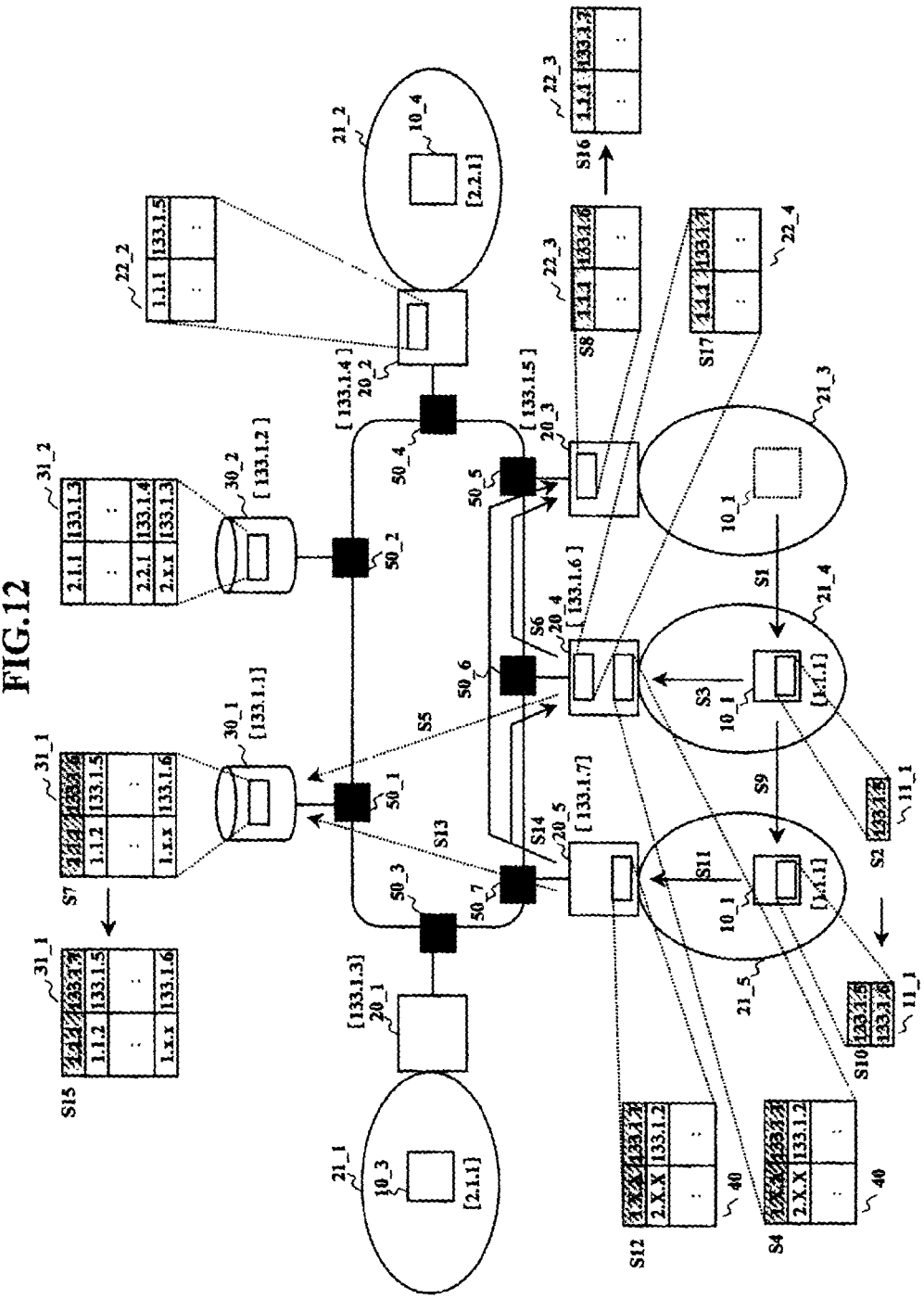
FIG. 12 is a block diagram showing an embodiment (7) of a node device according to the present invention.

FIG. 12 shows the embodiment (7) of the node device according to the present invention which composes the communication system. The arrangement of this communication system is the same as that of the embodiment (6) shown in FIG. 11. However, the location information table 22_4 and the server retrieval table 40 which are not shown in FIG. 11 are illustrated.

Schematically, in the embodiment (6), the destination terminal 10_1 notifies only the communication start node device 20_3 of the addresses of the latest node device and the destination terminal every time it moves to the area of the latest node device. However, in this embodiment (7), the cache 11_1 of the destination terminal 10_1 stores the addresses of all the former node devices including the communication start node device 20_3 having the areas to which it has moved until the present time, and notifies the former node devices including the communication start node device of the addresses of the latest node device and the destination terminal every time it moves to the area of the latest node device.

Hereinafter, detailed operations of the embodiment (7) will be described.

The state before the packet transfer operation is the same as the state before the operation of the embodiment (6).

Step S1: The terminal 10_1 moves to the area 21_4 of the node device 20_4.

Step S2: The terminal 10_1 stores the address [133.1.5] of the communication start node device 20_3 in the cache 11_1.

Step S3: The terminal 10_1 makes the location registration to the network. At this time, it notifies the address [133.1.5] of the communication start node device 20_3 to the network.

Step S4: The node device 20_4 retrieves the address [133.1.1] of the location registering server 30_1 corresponding to the address [1.1.1] of the terminal 10_1 from the server retrieval table 40.

Steps S5 and S6: The node device 20_4 transmits the location registration information to the location registering server 30_1 and notifies the address [133.1.6] of its own device and the address of the destination terminal to the node device 20_3.

Step S7: The location registering server 30_1 updates the address of the node device having the area where the terminal 10_1 is located in the location registering table 31_1 to [133.1.6].

Step S8: The node device 20_3 adds the address of the terminal 10_1 and the address [133.1.6] of its destination node device to the location information table 22_3.

Step S9: The terminal 10_1 moves to the area 21_5 of the node device 20_5.

Step S10: The terminal 10_1 stores the address [133.1.5] of the communication start node device 20_3 and the address [133.1.6] of the former node device 20_4 in the cache 11_1.

Step S11: The terminal 10_1 makes the location registration to the network. At this time, it notifies the address [133.1.5] of the communication start node device 20_3 and the address [133.1.6] of the former node device 20_4 to the network.

Steps S12 and S13: The node device 20_5 retrieves the address [133.1.1] of the location registering server 30_1 corresponding to the address [1.1.1] of the terminal 10_1 from the server retrieval table 40 and transmits the location registration information to the location registering server 30_1.

Step S14: The node device 20_5 notifies the address [133.1.7] of the node device 20_5 and the address of the destination terminal to the node devices 20_3 and 20_4.

Step S15: The location registering server 30_1 updates the address of the node device having the area where the terminal 10_1 is located in the location registering table 31_1 to [133.1.7].

Step S16: The node device 20_3 updates the address of the node device having the area where the terminal 10_1 is located in the location information table 22_3 to [133.1.7].

Step S17: The node device 20_4 adds the address of the terminal 10_1 and the address [133.1.7] of its destination node device to the location information table 22_4.

Thus, the node devices 20_3 and 20_4 are to know the address of the node device having the area where the terminal 10_1 is located at present.

Hereafter, when the node devices 20_3 and 20_4 receive the inter-node packet 81 addressed to the terminal 10_1, they perform operations similar to steps S11–S13 of the embodiment (5) shown in FIG. 10 and transfer the received packet 81 to the node device 20_5.

Figure 13:
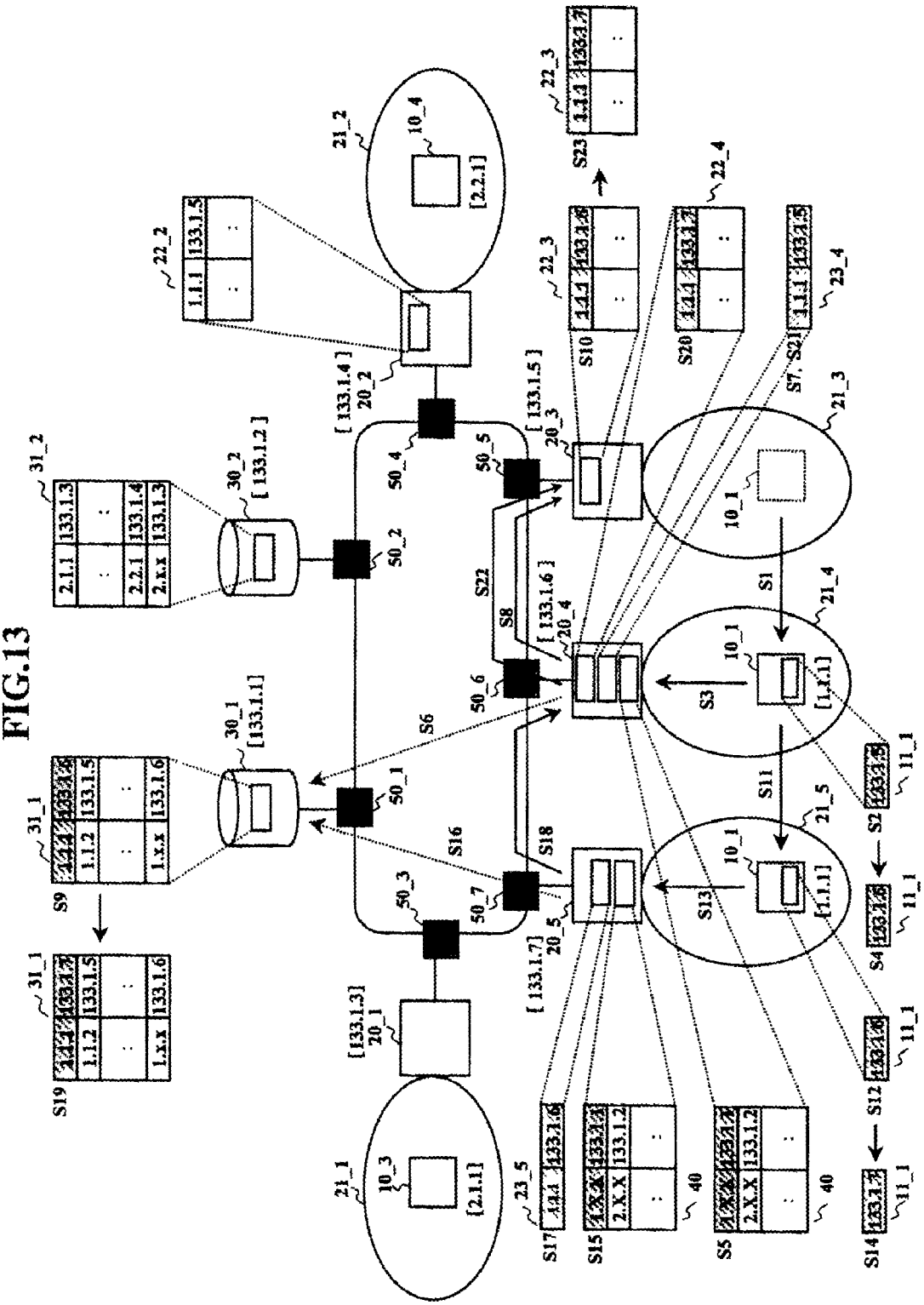
FIG. 13 is a block diagram showing an embodiment (8) of a node device according to the present invention.

FIG. 13 shows the embodiment (8) of the node device according to the present invention which composes the communication system. The arrangement of this communication system is different from that of the embodiment (7) in FIG. 12 in that the node devices 20_4 and 20_5 are respectively provided with storage portions 23_4 and 23_5 (hereinafter generally referred as a reference numeral "23").

Also, there is a difference that the storage portion 11_1 of the destination terminal 10_1 stores only the address of the destination node device having the area where the destination terminal was located immediately before moving.

The storage portions 23_4 and 23_5 of the node devices 20_4 and 20_5 store the address of the node device having the area where the destination terminal 10_1 was located immediately before moving the area.

In this embodiment (8), schematically, the storage portion 11_1 stores the address of the most recent former node device and the storage portion 23 of the latest node device stores this address.

Then, every time the destination terminal 10_1 moves to the area of the new destination node device while the communication is continuing, the latest node device notifies the addresses of its own device and the destination terminal to the most recent former node device. The former node device notifies the addresses of the latest node device and the destination terminal to the previous former node device by referring to its own storage portion 23.

By repeating this, the address of the latest node device is notified to all of the node devices having the areas where the destination terminal 10_1 was located.

Hereinafter, detailed operations of the embodiment (8) will be described. The state before the operations is the same as that of the embodiment (7).

Step S1: The terminal 10_1 moves to the area 21_4 of the node device 20_4.

Step S2: The terminal 10_1 stores the address [133.1.5] of the former node device 20_3 in the cache 11_1.

Step S3: The terminal 10_1 makes the location registration to the network. At this time, it notifies the address [133.1.5] of the communication start node device 20_3 to the network.

Step S4: The terminal 10_1 updates the cache 11_1 to the address [133.1.6] of the destination node device 20_4.

Step S5: The node device 20_4 retrieves the server retrieval table 40 to obtain the address [133.1.1] of the location registering server 30_1 corresponding to the address [1.1.1] of the terminal 10_1.

Step S6: The node device 20_4 transmits the location registration information to the location registering server 30_1.

Step S7: The node device 20_4 stores the address [1.1.1] of the terminal 10_1 and the address [133.1.5] of the former node device 20_3 in the cache 23_4.

Step S8: The node device 20_4 notifies the address [133.1.6] of its own device and the address of the destination terminal to the node device 20_3.

Step S9: The location registering server 30_1 updates the address of the node device having the area where the terminal 10_1 is located in the location registering table 31_1 to [133.1.6].

Step S10: The node device 20_3 adds the address [1.1.1] of the terminal 10_1 and the address [133.1.6] of its corresponding destination node device to the location information table 22_3.

Step S11: The terminal 10_1 moves to the area 21_5 of the node device 20_5.

Step S12: The terminal 10_1 stores the address [133.1.6] of the former node device 20_4 in the cache 11_1.

Step S13: The terminal 10_1 makes the location registration to the network. At this time, it notifies the address [133.1.6] of the former node device 20_4 to the network.

Step S14: The terminal 10_1 updates the address of the cache 11_1 to [133.1.7].

Step S15: The node device 20_5 retrieves the server retrieval table 40 to obtain the address [133.1.1] of the location registering server 30_1 corresponding to the address [1.1.1] of the terminal 10_1.

Step S16: The node device 20_5 transmits the location registration information to the location registering server 30_1.

Step S17: The node device 20_5 stores the address [1.1.1] of the terminal 10_1 and the address [133.1.6] of its corresponding former node device in the cache 23_5.

Step S18: The node device 20_5 notifies the address [133.1.7] of its own device and the address of the destination terminal to the node device 20_4.

Step S19: The location registering server 30_1 updates the address of the destination node device corresponding to the terminal 10_1 in the location registering table 31_1 to [133.1.7].

Step S20: The node device 20_4 adds the address [1.1.1] of the terminal 10_1 and the address [133.1.7] of its corresponding destination node device to the location information table 22_4.

Step S21: The node device 20_4 retrieves, from the cache 23_4, the address [133.1.5] of the former node device having the area where the terminal 10_1 was located.

Step S22: The node device 20_4 notifies the address [133.1.7] of the node device 20_5 and the address of the destination terminal to the node device 20_3.

Step S23: The node device 20_3 updates the address of the destination node device corresponding to the terminal 10_1 in the location information table 22_3 to [133.1.7].

Thus, the node devices 20_3 and 20_4 respectively store, in the location information tables 22_4 and 22_3, the address [133.1.7] of the node device 20_5 having the area where the destination terminal is located at present.

Hereafter, when the node devices 20_3 and 20_4 receive the inter-node packet 81 addressed to the terminal 10_1, they perform operations of steps S13–S15 of the embodiment (6) shown in FIG. 11 and the received packet 81 is directly transferred to the node device 20_5 having the area where the destination terminal 10_1 is located.

Figure 14:
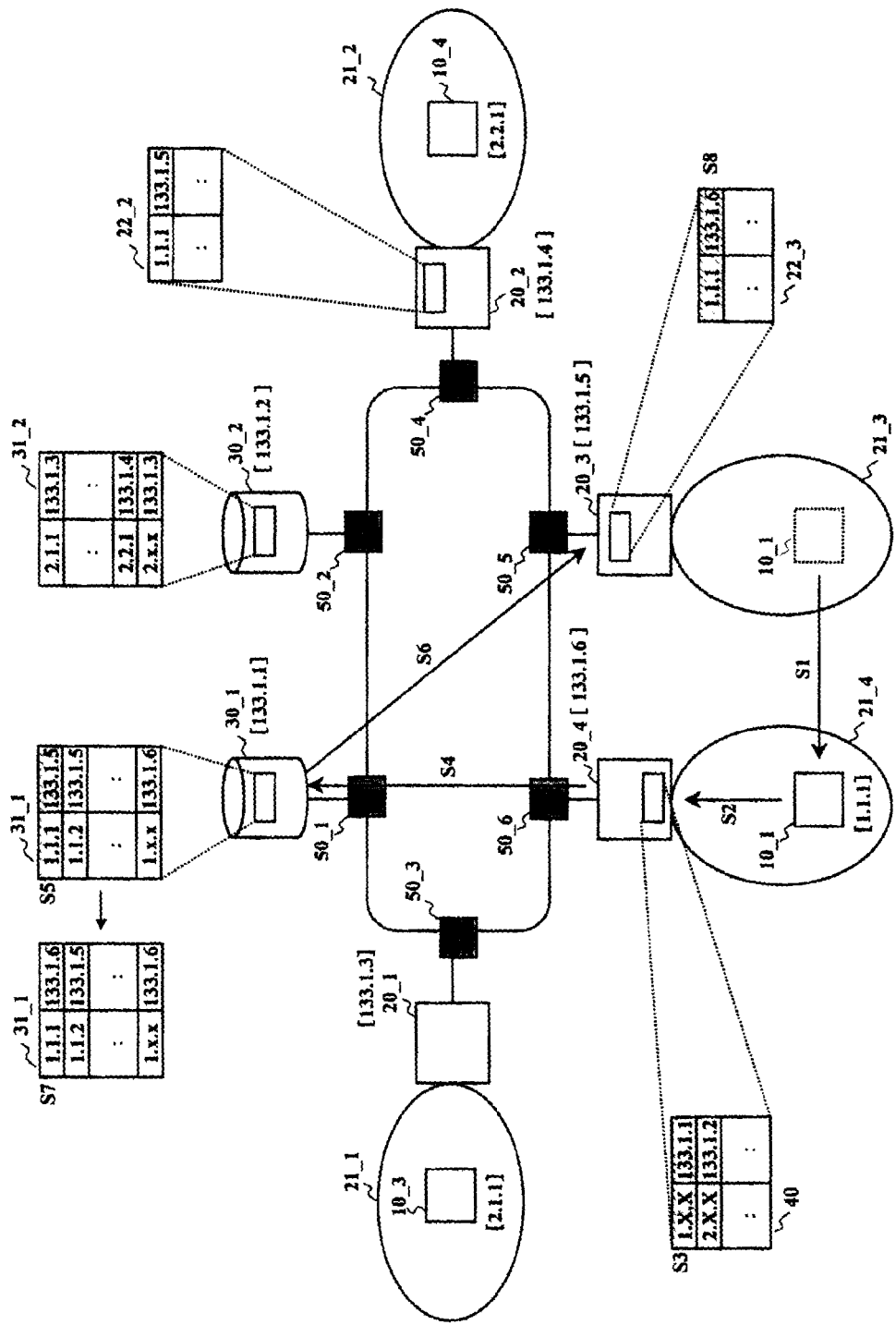
FIG. 14 is a block diagram showing an embodiment (9) of a node device according to the present invention.

FIG. 14 shows the embodiment (9) of the node device according to the present invention which composes the communication system. The arrangement of this communication system is the same as that of the embodiment (5) in FIG. 10 except that the destination terminal 10_1 does not have the cache 11_1.

The operations of this embodiment (9) are, schematically, different from those of the embodiment (5) where the cache 11_1 stores the address of the former node device in that the address of the former node device is obtained from the location registration information of the destination terminal 10_1 registered in the location registering server 30_1 so that the former node device is notified of the addresses of the destination node device and the destination terminal.

Hereinafter, detailed operations of the embodiment (9) will be described.

The state of the communication system before the terminal 10_1 moves is as follows:

The terminal 10_1 is located in the area 21_3 of the node device 20_3.

Step S1: The terminal 10_1 moves to the area 21_4 of the node device 20_4.

Step S2: The terminal 10_1 makes the location registration to the network.

Step S3: The node device 20_4 retrieves the address [133.1.1] of the location registering server 30_1 corresponding to the address [1.1.1] of the terminal 10_1 from the server retrieval table 40.

Step S4: The node device 20_4 transmits the location registration information to the location registering server 30_1.

Step S5: The location registering server 30_1 refers to the location registering table 31_1 to retrieve the address [133.1.5] of the node device having the area where the terminal 10_1 was located.

Step S6: The location registering server 30_1 notifies the node device 20_3 of the address [133.1.6] of the node device 20_4 having the area where the destination terminal 10_1 is located and the address of the destination terminal.

Step S7: The location registering server 30_1 updates the address of the node device having the area where the destination terminal 10_1 is located in the location registering table 31_1 to the address [133.1.6] with which the location registration was made.

Step S8: The node device 20_3 adds the address [1.1.1] of the terminal 10_1 and the address [133.1.6] of its destination node device to the location information table 22_3.

Hereafter, the operations of steps S9–S13 of the embodiment (5) shown in FIG. 10 are performed.

It is to be noted that as a varied example of this embodiment (9), the node device 20_4 may transmit the addresses of its own device and the destination terminal in the above-mentioned steps S4–S7 as follows:

Before making the location registration of the destination terminal 10_1, the node device 20_4 transmits, to the location registering server 30_1, a message inquiring the address of the destination node device having the area where the destination terminal 10_1 was located to obtain the address [133.1.5] of the former node device 20_3.

Then, based on this address, the node device 20_4 directly transmits the address [133.1.6] of its own device and the address of the destination terminal to the former node device 20_3.

Figure 15:
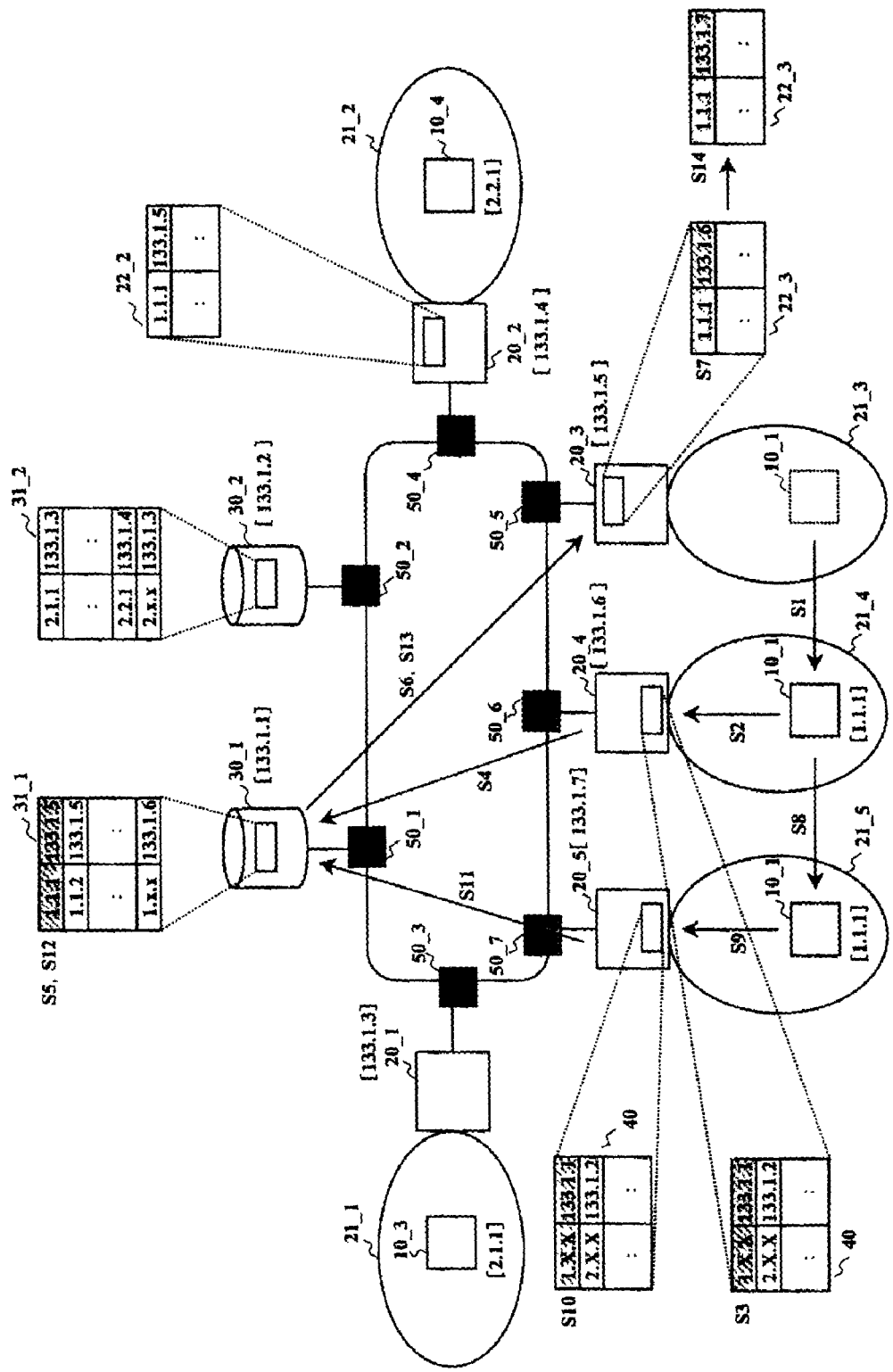
FIG. 15 is a block diagram showing an embodiment (10) of a node device according to the present invention.

FIG. 15 shows the embodiment (10) of the node device according to the present invention which composes the communication system. The arrangement of this communication system is the same as that of the embodiment (6) shown in FIG. 11 except that the terminal 10_1 does not maintain the storage portion 11_1.

Schematically, in the previous embodiment (6), the address of the latest node device is notified to the node device 20_3 every time the destination terminal 10_1 moves to the latest node device based on the address [133.1.5] of the communication start node device 20_3 stored in the destination terminal 10_1.

On the other hand, in this embodiment (10), the location registering server 30_1 stores the address [133.1.5] of the communication start node device 20_3 and notifies the address of the latest node device and the address of the destination terminal to the communication start node device every time the destination terminal 10_1 moves to the area of the latest node device.

Hereinafter, detailed operations of the embodiment (10) will be described.

The state of the communication system before the terminal 10_1 moves is as follows:

The terminal 10_1 is located in the area 21_3 of the node device 20_3 with which it has started the communication and the source node device 20_2 stores the address [133.1.5] of the node device 20_3 having the area where the terminal 10_1 is located in the location information table 22_2.

Step S1: The terminal 10_1 moves to the area 21_4 of the node device 20_4.

Step S2: The terminal 10_1 makes the location registration to the network. At this time, it is notified that the communication is being continued.

Steps S3 and S4: The node device 20_4 retrieves the address [133.1.1] of the location registering server 30_1 corresponding to the address [1.1.1] of the terminal 10_1 from the server retrieval table 40 and transmits the location registration information to the location registering server 30_1. At this time, it is notified that the communication is being continued.

Step S5: The location registering server 30_1 retrieves the location registering table 31_1 to obtain the address [133.1.5] of the node device having the area where the terminal 10_1 was located.

Step S6: The location registering server 30_1 notifies the address [133.1.6] of node device 20_4 and the address of the destination terminal to the node device 20_3. Since the communication is being continued at this time, the location registering table is not updated.

Step S7: The node device 20_3 adds the address [1.1.1] of the terminal 10_1 and the address [133.1.6] of the destination node device to the location information table 22_3.

Step S8: The terminal 10_1 moves to the area 21_5 of the node device 20_5.

Step S9–S13: Operations similar to steps S2–S6 are performed.

Step S14: The node device 20_3 updates the address of the node device having the area where the terminal 10_1 is located in the location information table 22_3 to [133.1.7].

Hereafter, operations similar to steps S11–S15 of the embodiment (6) in FIG. 11 are performed and the node device 20_3 directly transfers the packet 81 as the packet 82 to the node device 20_5 having the area where the destination terminal 10_1 is located.

FIG. 16 shows the embodiment (11) of the node device according to the present invention which composes the communication system. The arrangement of this communication system is different from that of the embodiment (10) in FIG. 15 in that the location registering server 30_1 is provided with the storage portion (cache) 32_1 corresponding to each terminal and all of the addresses of the former node devices are stored in this cache 32_1.

Also, the location information table 22_4 of the node device 20_4 omitted in FIG. 15 is shown in FIG. 16.

Schematically, in the previous embodiment (10), the location registering server 30_1 notifies the addresses of the destination node device and the destination terminal to the communication start node device 20_3 while the communication is continuing. However, in this embodiment (11), the location registering server 30_1 notifies the addresses of the latest node device and the destination terminal to all of the node devices having the areas where the destination terminal has been located every time the destination terminal 10_1 moves to the latest node device.

Hereinafter, detailed operations of the embodiment (11) will be described. The state of the communication system before the terminal 10_1 moves is the same as that of the embodiment (10).

Step S1: The terminal 10_1 moves to the area 21_4 of the node device 20_4.

Step S2: The terminal 10_1 makes the location registration to the network. At this time, it is notified that the communication is being continued.

Step S3: The node device 20_4 retrieves the server retrieval table 40 to obtain the address [133.1.1] of the location registering server 30_1 corresponding to the address [1.1.1] of the terminal 10_1.

Step S4: The node device 20_4 transmits the location registration information to the location registering server 30_1. At this time, it is notified that the communication is being continued.

Steps S5 and S6: The location registering server 30_1 updates the address of the node device having the area where the terminal 10_1 is located in the location registering table 31_1 to [133.1.6] and stores the address [133.1.5] of the former node device 20_3 in the cache 32_1 corresponding to the terminal 10_1.

Step S7: The location registering server 30_1 notifies the address [133.1.6] of the node device 20_4 and the address of the destination terminal to the node device 20_3.

Step S8: The node device 20_3 adds the address [1.1.1] of the terminal 10_1 and the address [133.1.6] of the destination node device to the location information table 22_3.

Step S9: The terminal 10_1 moves to the area 21_5 of the node device 20_5.

Step S10: The terminal 10_1 makes the location registration to the network. At this time, it is notified that the communication is being continued.

Step S11: The node device 20_5 retrieves the server retrieval table 40 to obtain the address [133.1.1] of the location registering server 30_1 corresponding to the address [1.1.1] of the terminal 10_1.

Step S12: The node device 20_5 transmits the location registration information to the location registering server 30_1. At this time, it is notified that the communication is being continued.

Step S13: The location registering server 30_1 updates the destination node device address corresponding to the address [1.1.1] of the terminal 10_1 in the location registering table 31_1 to [133.1.7].

Step S14: The location registering server 30_1 adds the address [133.1.6] of the former node device 20_4 to the cache 32_1 corresponding to the terminal 10_1.

Step S15: The location registering server 30_1 notifies the address [133.1.7] of the node device 20_5 and the address of the destination terminal to the node devices 20_3 and 20_4 based on the cache 32_1.

Steps S16 and S17: The node devices 20_3 updates the address of the node device having the area where the terminal 10_1 is located in the location information table 22_3 to [133.1.7] and the node device 20_4 adds the same to the location information table 22_4.

Hereafter, when the inter-node packet 81 addressed to the terminal 10_1 is received, the operations similar to steps S11–S15 of the embodiment (6) in FIG. 11 are performed so that the node device 20_3 directly transfers the packet 81 to the destination node device 20_5.

Also, in the same way, the node device 20_4 directly transfers the packet 81 to the node device 20_5 when it receives the packet 81 addressed to the terminal 10_1.

It is to be noted that as a varied example of this embodiment (11), although the node device 20_4 in the above-mentioned steps S4–S7 transmits its own device address [133.1.6] and the address of the destination terminal to the former node device 20_3 through the location registering server 30_1, it may transmit the addresses of its own device and the destination terminal as follows:

Namely, the node device 20_4 transmits an inquiry message for the address of the node device having the area where the destination terminal 10_1 is located to the location registering server 30_1. The location registering server 30_1 sends back the address [133.1.5] stored in the cache 32_1 to the node device 20_4.

Then, based on this address, the node device 20_4 directly transmits the addresses of its own device and the destination terminal to the former node device 20_3.

In the same way, instead of steps S12–S15, the latest node device 20_5 transmits the inquiry message to the location registering server 30_1, obtains the addresses [133.1.5] and [133.1.6] of the node devices 20_3 and 20_4, and transmits the address [133.1.7] of its own device and the address of the destination terminal to the node devices 20_3 and 20_4.

(iii) Embodiments of Method 1 for Achieving Object 2

Figure 17:
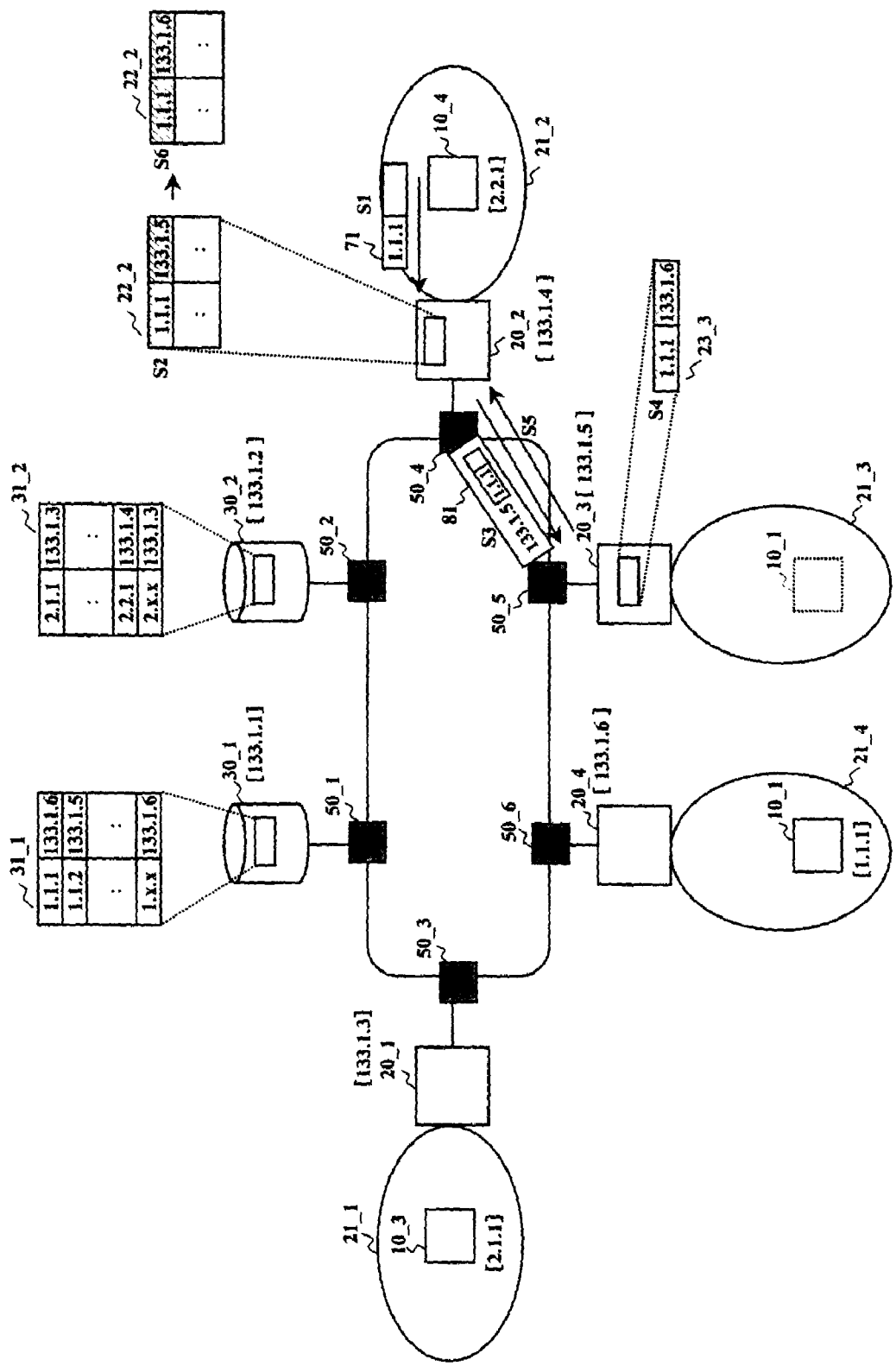
FIG. 17 is a block diagram showing an embodiment (12) of a node device according to the present invention.
Figure 20:
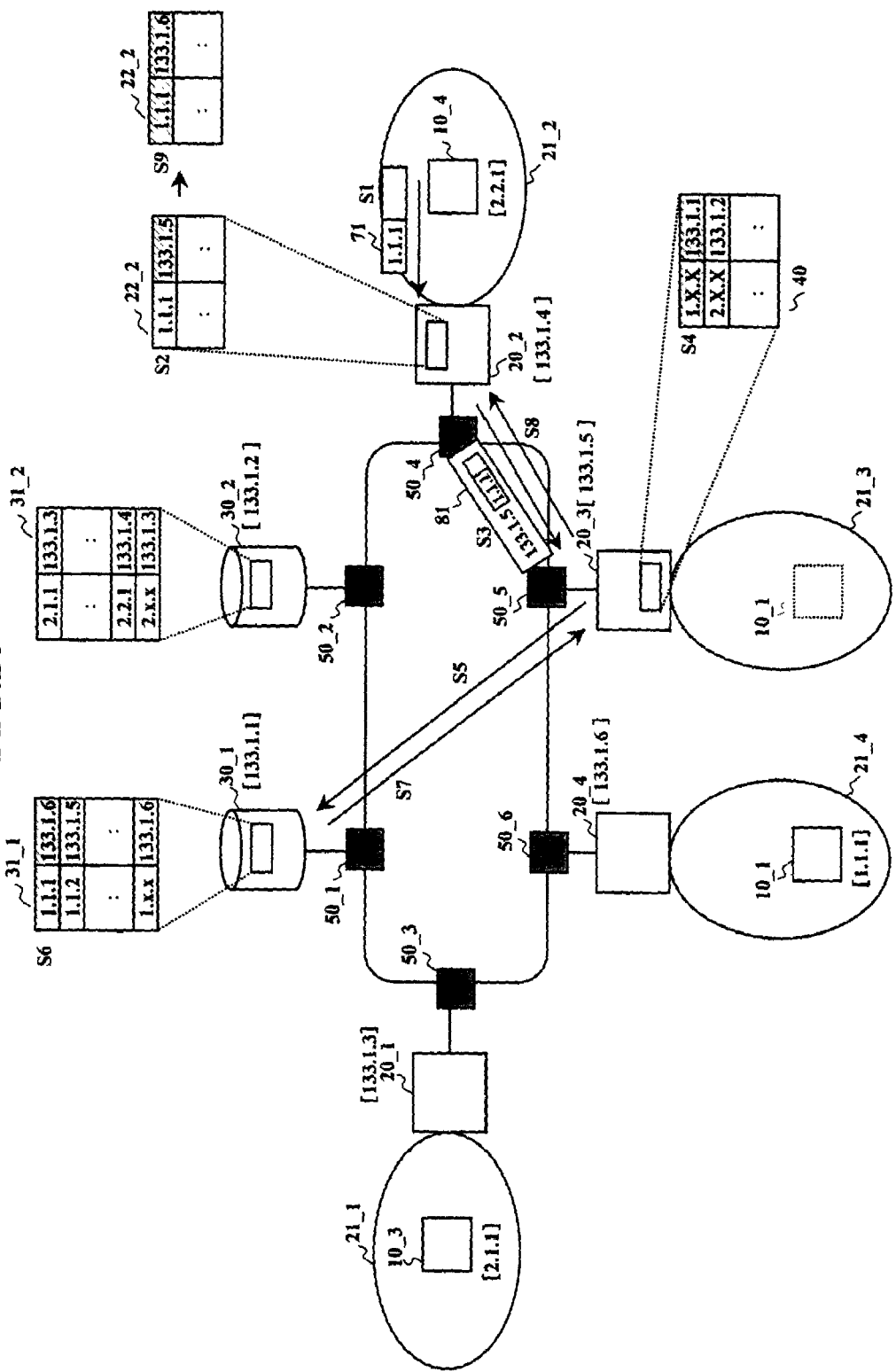
FIG. 20 is a block diagram showing an embodiment (15) of a node device according to the present invention.

(Embodiment (12) of FIG. 17-*Embodiment* (15) of FIG. 20)

These embodiments achieve Object 2 (reducing the occurrence of the source node device continuously transmitting the packet to the former node device having the area where the destination terminal has been located with the location information stored in the source node device not being updated in spite of the movement of the destination terminal) based on Method 1 (to update the location information of the destination terminal stored in the source node device when the packet arrives at the node device on the receiving side).

FIG. 17 shows the embodiment (12) of the node device according to the present invention which composes the communication system. In the arrangement of this communication system, the node device 20_3 is provided with the storage portion (for example cache) 23_3 instead of the cache 11_1 in the destination terminal 10_1 of the embodiment (5) shown in FIG. 10. The storage portion 23_3 can also be used as the location information table.

The cache 23_3 stores the address [1.1.1] of the destination terminal 10_1 and the address [133.1.6] of the node device 20_4 having the area where the destination terminal 10_1 is located made corresponding to each other.

It is to be noted that as operations of the cache 23_3 before storing the address of the destination node device, for example, there are the embodiment (5) of FIG. 10-the embodiment (11) of FIG. 16.

Schematically, in this embodiment (12), the former node device 20_3 notifies the address [133.1.6] of the node device 20_4 having the area where the destination terminal 10_1 is located and the address of the destination terminal to the source node device 20_2.

Hereinafter, detailed operations after the destination terminal 10_1 has moved will be described.

In the state before the source terminal 10_4 transmits the packet 71, the the terminal 10_1 moves from the area 21_3 of the node device 20_3 to the area 21_4 of the node device 20_4, address [133.1.6] is stored in the cache 23_3, and the source node device 20_2 stores the address [133.1.5] of the former node device 20_3 having the area where the destination terminal 10_1 was located in the location information table 22_2.

Step S1–S3: The node device 20_2 transfers to the node device 20_3 the inter-node packet 81 which is the received packet 71, addressed to the terminal 10_1 and added with the address [133.1.5] of the node device 20_3.

Steps S4 and S5: The node device 20_3 retrieves the cache 23_3, obtains the address [133.1.6] of the node device 20_4 having the area where the terminal 10_1 is located, and notifies this address and the address of the destination terminal to the node device 20_2.

Step S6: The node device 20_2 updates the address of the node device having the area where the terminal 10_1 is located in the location information table 22_2 to [133.1.6].

Thus, it becomes possible for the node device 20_2 to directly transfer the packet 71 addressed to the terminal 10_1 to the node device 20_4 having the area where the terminal 10_1 is located.

Figure 18:
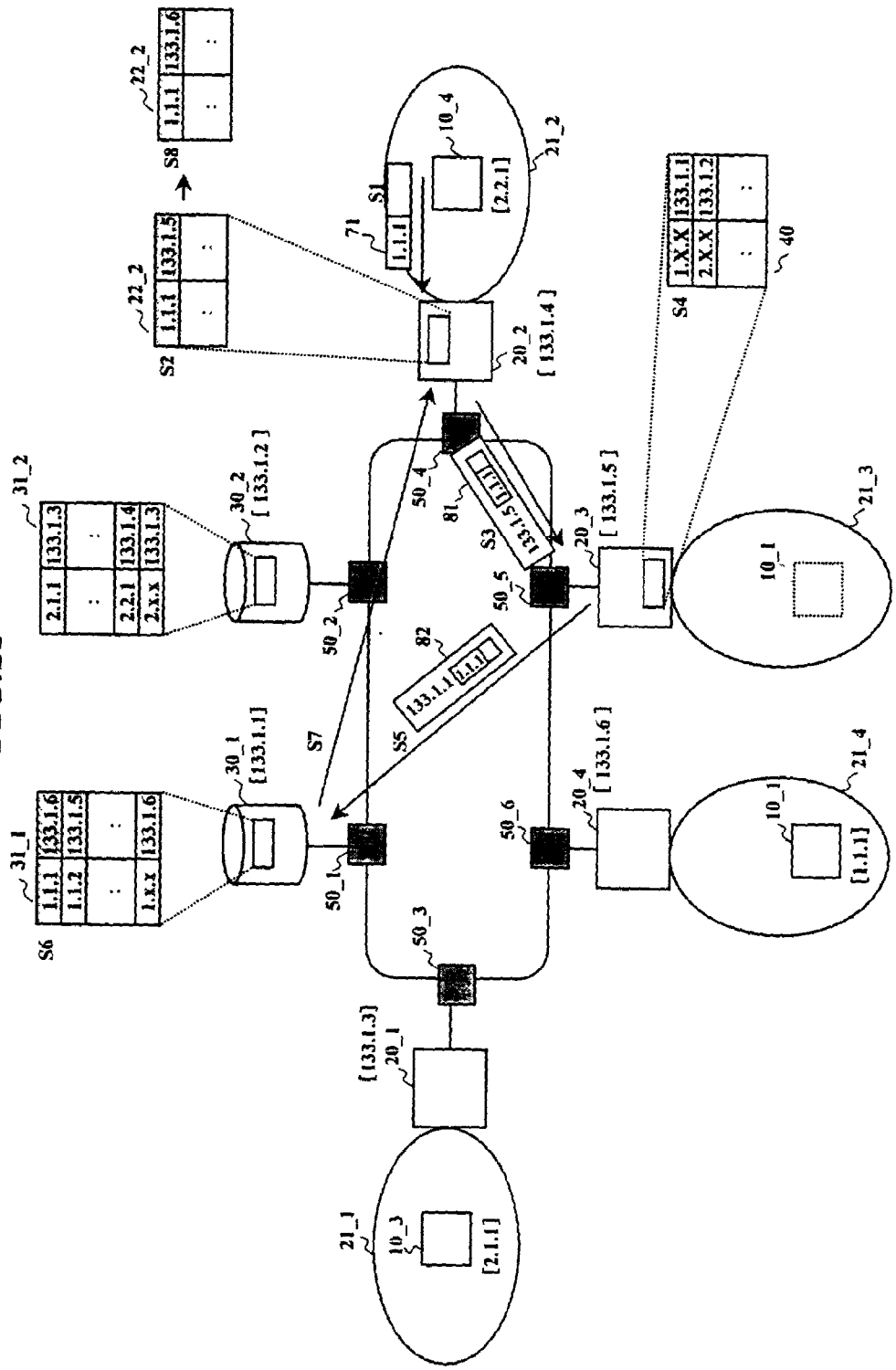
FIG. 18 is a block diagram showing an embodiment (13) of a node device according to the present invention.

FIG. 18 shows the embodiment (13) of the node device according to the present invention which composes the communication system. The arrangement of this communication system is the same as that of the embodiment (1) shown in FIG. 5.

In this embodiment (13), schematically, the former node device 20_3 transfers the received inter-node packet 81 to the location registering server 30_1 to request this location registering server 30_1 to notify the source node device 20_2 of the address [133.1.6] of the destination node device 20_4 and the address of the destination terminal.

Hereinafter, detailed operations after the destination terminal 10_1 has moved will be described.

The state before the source terminal 10_4 transmits the packet in FIG. 18 is as follows:

The source node device 20_2 stores the address [133.1.5] of the node device 20_3 having the area where the terminal 10_1 is located in the location information table 22_2.

The terminal 10_1 moves from the area 21_3 of the node device 20_3 to the area 21_4 of the node device 20_4 and makes the location registration.

The location registering server 30_1 updates the address of the node device corresponding to the address [1.1.1] of the terminal 10_1 in the location registering table 31_1 to the address [133.1.6] of the node device 20_4.

Steps S1–S3: The node device 20_2 adds the address [133.1.5] of the node device 20_3 to the received user packet 71 addressed to the terminal 10_1 and transfers the same as the inter-node packet 81.

Step S4: Since the destination terminal 10_1 is not located in its area, the node device 20_3 retrieves the server retrieval table 40 to obtain the address [133.1.1] of the location registering server 30_1 corresponding to the address [1.1.1] of the terminal 10_1.

Step S5: The node device 20_3 transfers the inter-node packet 82, which has the destination address of received packet 81 rewritten to [133.1.1], to the location registering server 30_1. At this time, the address of the source node device of the received packet 81 remains to be [133.1.4].

Step S6: The location registering server 30_1 retrieves the location registering table 31_1 to obtain the address [133.1.6] of the node device 20_4 having the area where the terminal 10_1 is located.

Step S7: The location registering server 30_1 notifies the address [133.1.6] of the node device 20_4 having the area where the terminal 10_1 is located and the address of the destination terminal to the source node device 20_2.

Step S8: The node device 20_2 updates the address of the node device having the area where the terminal 10_1 is located in the location information table 22_2 to [133.1.6].

Thus, "the address of the destination node device" of the terminal 10_1 in the location information table 22_2 of the source node device 20_2 is updated to the address [133.1.6] of the node device 20_4 having the area where the terminal 10_1 is actually located.

Hereafter, the source node device 20_2 directly transfers the packet addressed to the terminal 10_1 to the node device 20_4.

Figure 19:
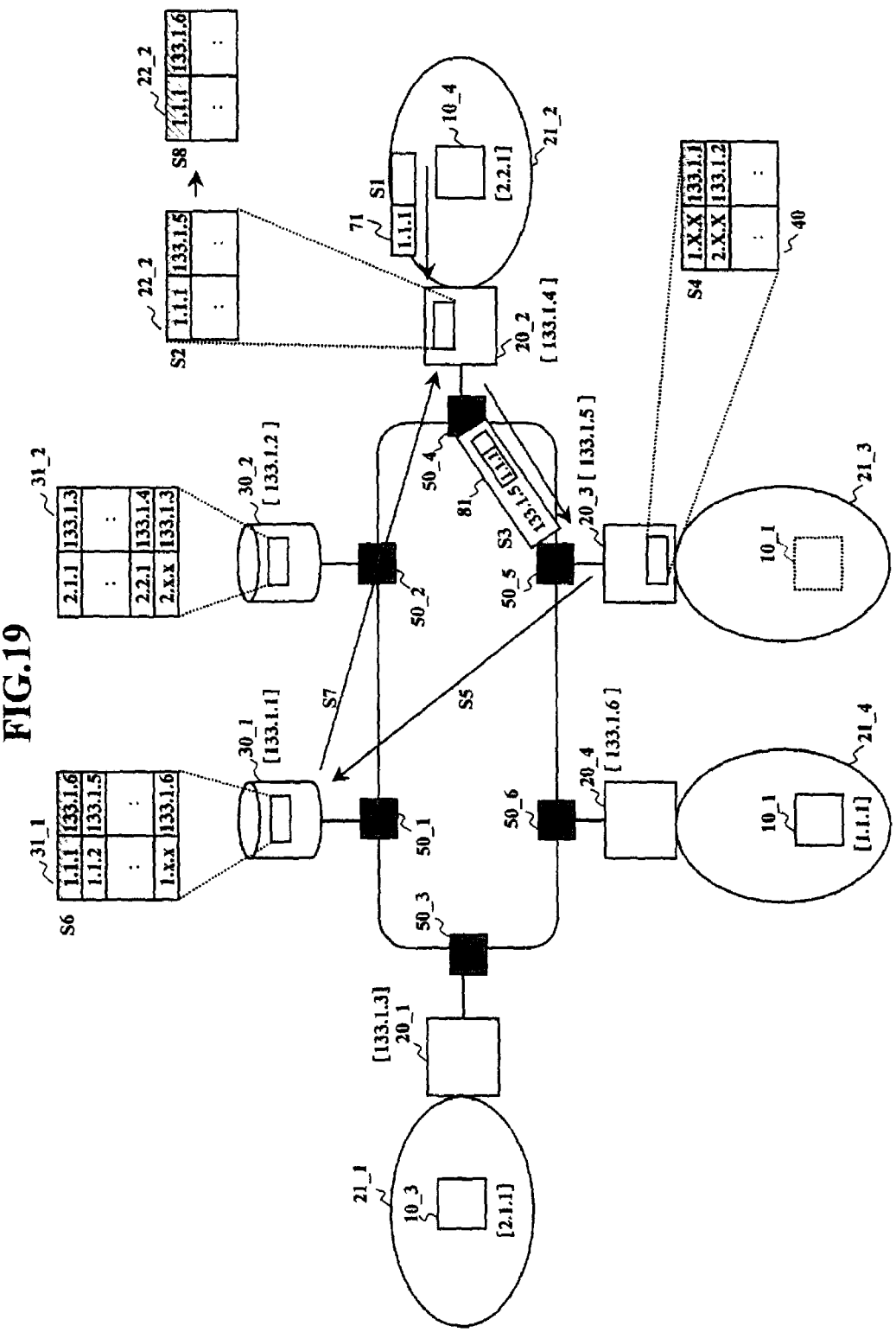
FIG. 19 is a block diagram showing an embodiment (14) of a node device according to the present invention.

FIG. 19 shows the embodiment (14) of the node device according to the present invention which composes the communication system. The arrangement of this communication system is similar to that of the embodiment (13) shown in FIG. 18.

In this embodiment (14), schematically a difference from the embodiment (13) is the node device 20_3 on the receiving side requests the location registering server 30_1 to notify the address [133.1.6] of the node device 20_4 having the area where the destination terminal 10_1 is located and the address of the destination terminal to the source node device 20_2 instead of directly transferring the inter-node packet 82 to the location registering server 30_1.

Then, the location registering server 30_1 notifies the address [133.1.6] of the destination node device and the address of the destination terminal to the source node device 20_2.

Hereinafter, detailed operations after the destination terminal 10_1 has moved will be described. The state before the source terminal 10_4 transmits the packet is the same as that of the embodiment (13).

Steps S1–S3: The node device 20_2 transfers the inter-node packet 81 which has the address [133.1.5] of the node device 20_3 added to the received packet 71.

Step S4: Since the destination terminal 10_1 is not located in its area, the node device 20_3 retrieves the server retrieval table 40 to obtain the address [133.1.1] of the location registering server 30_1 corresponding to the address [1.1.1] of the terminal 10_1.

Step S5: The node device 20_3 transmits the message which requests to notify the source node device 20_2 of the address of the node device having the area where the terminal 10_1 is located and the address of the destination terminal to the location registering server 30_1.

Steps S6 and S7: The location registering server 30_1 retrieves the location registering table 31_1 to obtain the address [133.1.6] of the node device 20_4 having the area where the terminal 10_1 is located and notifies the address [133.1.6] and the address of the destination terminal to the source node device 20_2.

Step S8: The node device 20_2 updates the address of the node device having the area where the terminal 10_1 is located in the location information table 22_2 to [133.1.6].

Thus, it becomes possible for the node device 20_2 to directly transfer the packet 71 addressed to the terminal 10_1 to the node device 20_4 having the area where the terminal 10_1 is located, as in the embodiment (13).

FIG. 20 shows the embodiment (15) of the node device according to the present invention which composes the communication system. The arrangement of this communication system is similar to that of the embodiment (14) shown in FIG. 19.

In this embodiment (15), schematically, the node device 20_3 on the receiving side, different from the embodiment (14), obtains the address [133.1.6] from the location registering server 30_1 and transfers the same to the source node device 20_2 instead of requesting the location registering server 30_1 to notify the address [133.1.6] of the destination node device and destination terminal to the source node device.

Hereinafter, detailed operations after the destination terminal 10_1 has moved will be described. The state before the source terminal 10_4 transmits the packet is the same as that of the embodiment (14).

Steps S1–S3: The node device 20_2 transfers to the node device 20_3 the inter-node packet 81 which is the received packet 71, addressed to the terminal 10_1 and added with the address [133.1.5] of the node device 20_3.

Step S4: Since the destination terminal 10_1 is not located in the area 21_3, the node device 20_3 retrieves the server retrieval table 40 to obtain the address [133.1.1] of the location registering server 30_1 corresponding to the address [1.1.1] of the terminal 10_1.

Step S5: The node device 20_3 transmits the message inquiring the address of the node device having the area where the terminal 10_1 is located to the location registering server 30_1.

Steps S6 and S7: The location registering server 30_1 retrieves the location registering table 31_1 to obtain the address [133.1.6] of the node device 20_4 having the area where the terminal 10_1 is located and notifies the same to the node device 20_3.

Step S8: The node device 20_3 notifies the address [133.1.6] and the address of the destination terminal to the node device 20_2.

Step S9: The node device 20_2 updates the address of the node device having the area where the terminal 10_1 is located in the location information table 22_2 to [133.1.6].

Thus, it becomes possible for the node device 20_2 to directly transfer a packet addressed to the terminal 10_1 to the node device 20_4 having the area where the terminal 10_1 is located as in the embodiment (14).

(iv) Embodiments of Method 2 for Achieving Object 2

Figure 21:
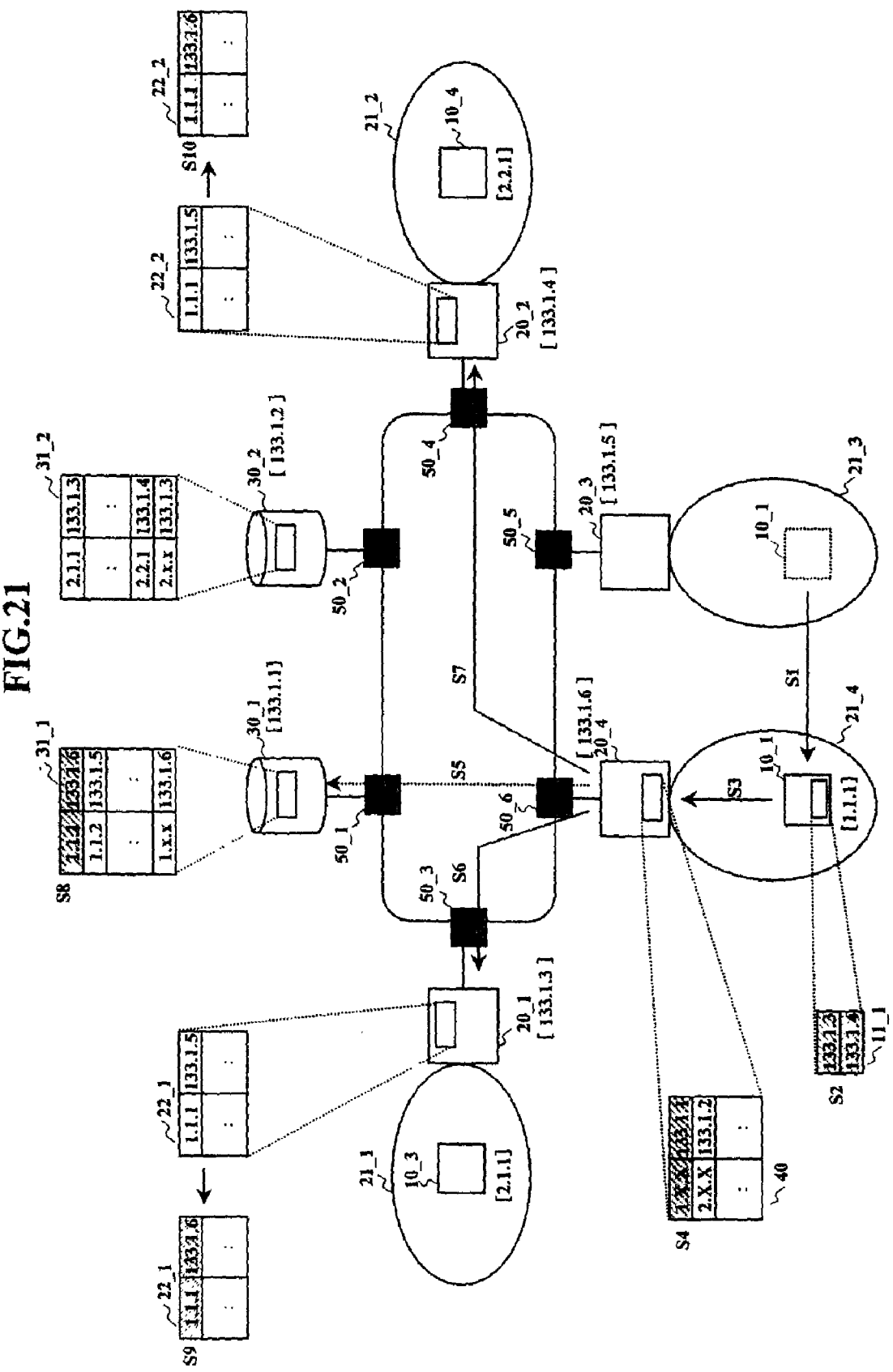
FIG. 21 is a block diagram showing an embodiment (16) of a node device according to the present invention.
Figure 27:
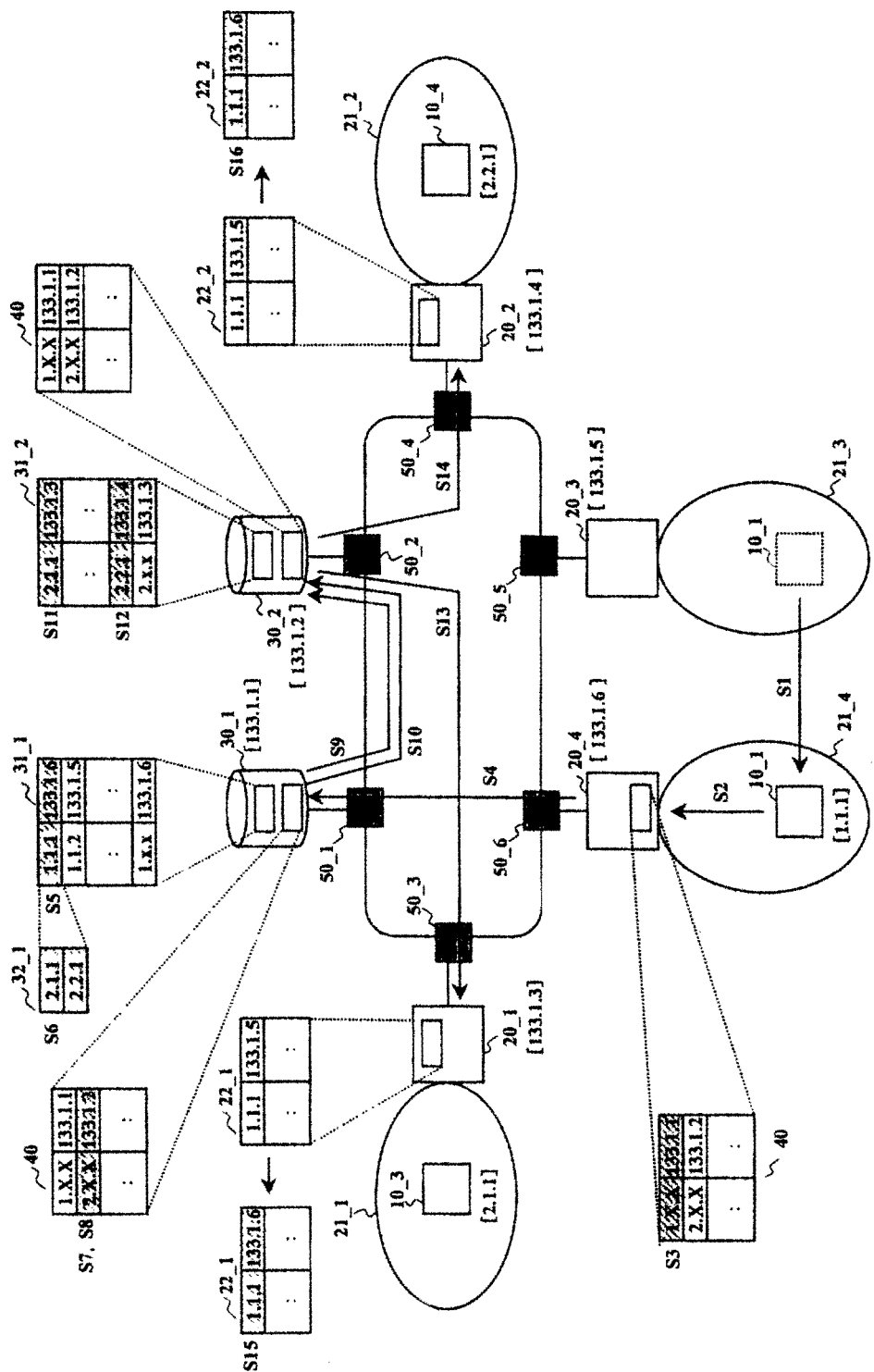
FIG. 27 is a block diagram showing an embodiment (22) of a node device according to the present invention.

(Embodiment (16) of FIG. 21-E*mbodiment* (22) of FIG. 27)

These embodiments achieve Object 2 (reducing the occurrence of the source node device from continuously transmitting the packet to the former node device having the area where the destination terminal has been located with the location information stored in the source node device not being updated in spite of the movement of the destination terminal) based on Method 2 (to update the location information of the destination terminal stored in the source node device when the destination terminal has moved to another area).

FIG. 21 shows the embodiment (16) of the node device according to the present invention which composes the communication system. The arrangement of this communication system is similar to that of the embodiment (5) shown in FIG. 10. However, it is different from the embodiment (5) in that the storage portion (for example cache) 11_1 of the destination terminal 10_1 stores the address of the source node device instead of the address of the former node device.

In this embodiment (16), schematically, the node device 20_4 notifies the address [133.1.6] of its own device and the address of the destination terminal to the source node devices all at once based on the addresses stored in the cache 11_1 when the destination terminal 10_1 has moved to its own area 21_4.

It is possible that a terminal generally performs a packet communication simultaneously with a plurality of terminals. However, in the embodiments (1)–(15), the packet communication from a single source terminal to a single destination terminal has been described as an example for simplicity.

In this embodiment (16) and in the embodiments (17)–(22) to be described later, the case where the destination terminal 10_1 is communicating simultaneously with the source terminals 10_3 and 10_4 will be described.

Hereinafter, detailed operations after the destination terminal 10_1 has moved will be described.

The state of the communication system before the destination terminal 10_1 moves is as follows:

The terminal 10_1 is located in the area 21_3 of the node device 20_3.

The source node devices 20_1 and 20_2 respectively store the address [133.1.5] of the node device 20_3 having the area where the terminal 10_1 is located in the location information tables 22_1 and 22_2.

Step S1: The terminal 10_1 moves to the area 21_4 of the node device 20_4.

Step S2: The terminal 10_1 stores the addresses [133.1.3] and [133.1.4] of the node devices 20_1 and 20_2 having the areas where the source terminals 10_3 and 10_4 are respectively located in the cache 11_1.

Step S3: The terminal 10_1 makes the location registration to the network. At this time, it notifies the addresses [133.1.3] and [133.1.4] to the network.

Step S4: The node device 20_4 retrieves the server retrieval table 40 to obtain the address [133.1.1] of the location registering server 30_1 corresponding to the address [1.1.1] of the terminal 10_1.

Step S5: The node device 20_4 transmits the location registration information to the location registering server 30_1.

Steps S6 and S7: The node device 20_4 notifies the address [133.1.6] of its own device and the address of the destination terminal to each of the node devices 20_1 and 20_2.

Step S8: The location registering server 30_1 updates the address of the node device having the area where the terminal 10_1 is located in the location registering table 31_1 to [133.1.6].

Steps S9 and S10: The node devices 20_1 and 20_2 respectively update the address of the node device having the area where the terminal 10_1 is located in the location information tables 22_1 and 22_2 to [133.1.6].

Hereafter, the node devices 20_1 and 20_2 directly transfer the packets addressed to the terminal 10_1 to the node device 20_4 having the area to which the terminal 10_1 has moved.

Figure 22:
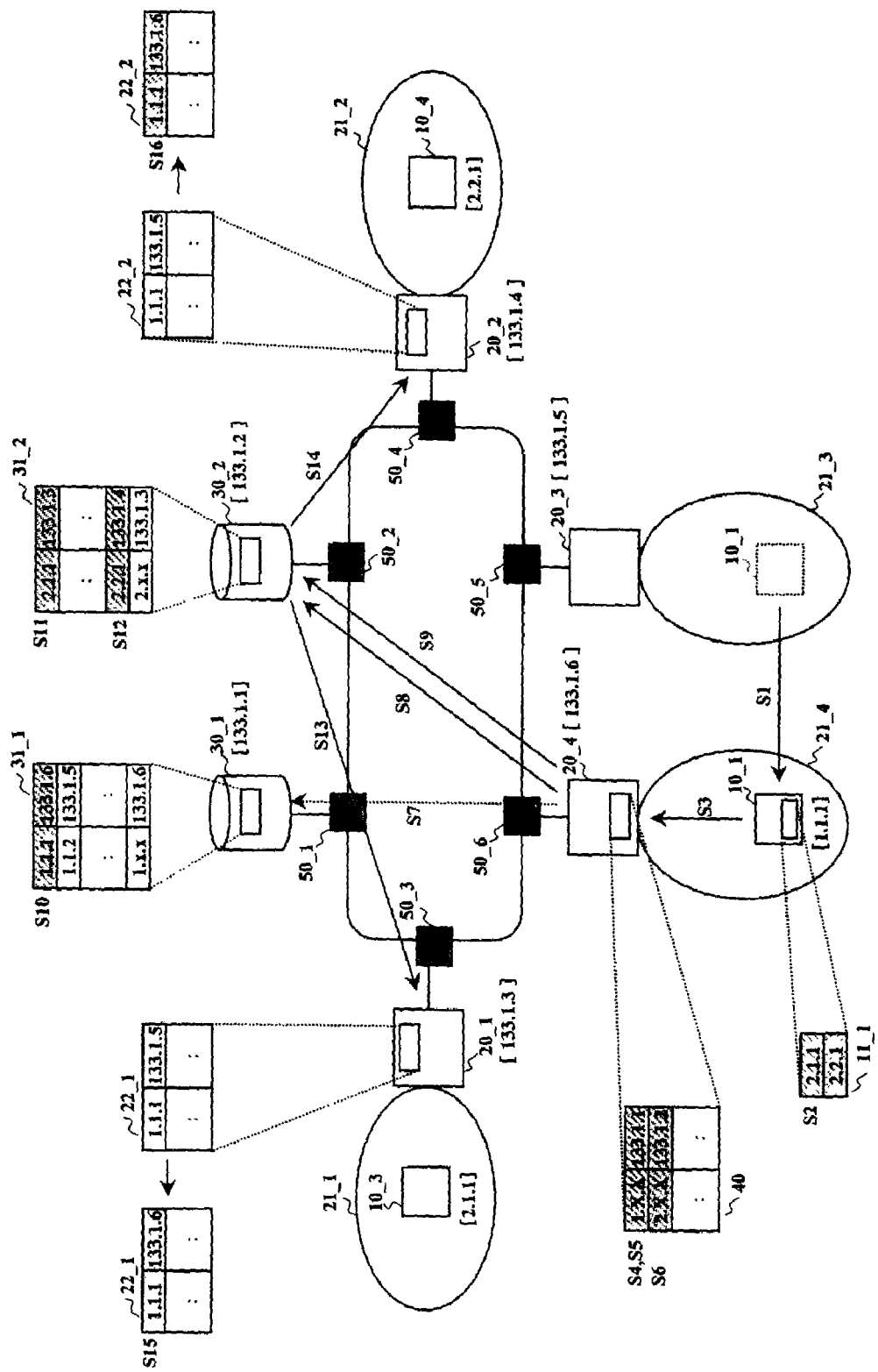
FIG. 22 is a block diagram showing an embodiment (17) of a node device according to the present invention.

FIG. 22 shows the embodiment (17) of the node device according to the present invention which composes the communication system. The arrangement of this communication system is similar to that of the embodiment (16) shown in FIG. 21. However, it differs from the embodiment (16) in that the cache 11_1 of the destination terminal 10_1 stores the address of the source terminal instead of storing the address of the source node device.

In this embodiment (17), schematically, the node device 20_4 indirectly notifies the address [133.1.6] of its own device and the address of the destination terminal to the source node device through the location registering server based on the address stored in the cache 11_1 of the terminal 10_1 when the destination terminal 10_1 has moved to its own area 21_4.

Hereinafter, detailed operations after the destination terminal 10_1 has moved will be described.

The state of the communication system before the destination terminal 10_1 moves is the same as that of the embodiment (16).

Step S1: The terminal 10_1 moves to the area 21_4 of the node device 20_4.

Step S2: The terminal 10_1 stores the address [2.1.1] of the source terminal 10_3 and the address [2.2.1] of the source terminal 10_4 in the cache 11_1.

Step S3: The terminal 10_1 makes the location registration to the network. At this time, it notifies the address [2.1.1] of the source terminal 10_3 and the address [2.2.1] of the source terminal 10_4 to the network.

Step S4: The node device 20_4 retrieves the server retrieval table 40 to obtain the address [133.1.1] of the location registering server 30_1 corresponding to the address [1.1.1] of the terminal 10_1.

Step S5: The node device 20_4 retrieves the server retrieval table 40 to obtain the address [133.1.2] of the location registering server 30_2 corresponding to the address [2.1.1] of the source terminal 10_3.

Step S6: The node device 20_4 retrieves the server retrieval table 40 to obtain the address [133.1.2] of the location registering server 30_2 corresponding to the address [2.2.1] of the source terminal 10_4. It is to be noted that at this time, depending on the address of the source terminal, there are cases where a location registering server different from the one in step S5 is retrieved.

Step S7: The node device 20_4 transmits the location registration information to the location registering server 30_1.

Step S8: The node device 20_4 transmits a message to the location registering server 30_2 in order to have the address [133.1.6] of its own device and the address of the destination terminal notified to the node device 20_1 having the area where the source terminal 10_3 is located.

Step S9: The node device 20_4 transmits a message to the location registering server 30_2 in order to have the address [133.1.6] of its own device and the address of the destination terminal notified to the node device 20_2 having the area where the source terminal 10_4 is located.

Step S10: The location registering server 30_1 updates the address of the node device having the area where the terminal 10_1 is located in the location registering table 31_1 to [133.1.6].

Step S11: The location registering server 30_2 retrieves the location registering table 31_2 to obtain the address [133.1.3] of the node device having the area where the source terminal 10_3 is located.

Step S12: The location registering server 30_2 retrieves the location registering table 31_2 to obtain the address [133.1.4] of the node device having the area where the source terminal 10_4 is located.

Steps S13 and S14: The location registering server 30_2 notifies the address [133.1.6] of the node device 20_4 and the address of the destination terminal to each of the node devices 20_1 and 20_2.

Steps S15 and S16: The node devices 20_1 and 20_2 update the address of the destination node device corresponding to the terminal 10_1 respectively in the location information tables 22_1 and 22_2 to [133.1.6].

Thus, the source node devices 20_1 and 20_2 are to know the address [133.1.6] of the node device 20_4 having the area where the destination terminal 10_1 is located, so that hereafter, the packet addressed to the destination terminal 10_1 can be directly transferred to the node device 20_4.

Figure 23:
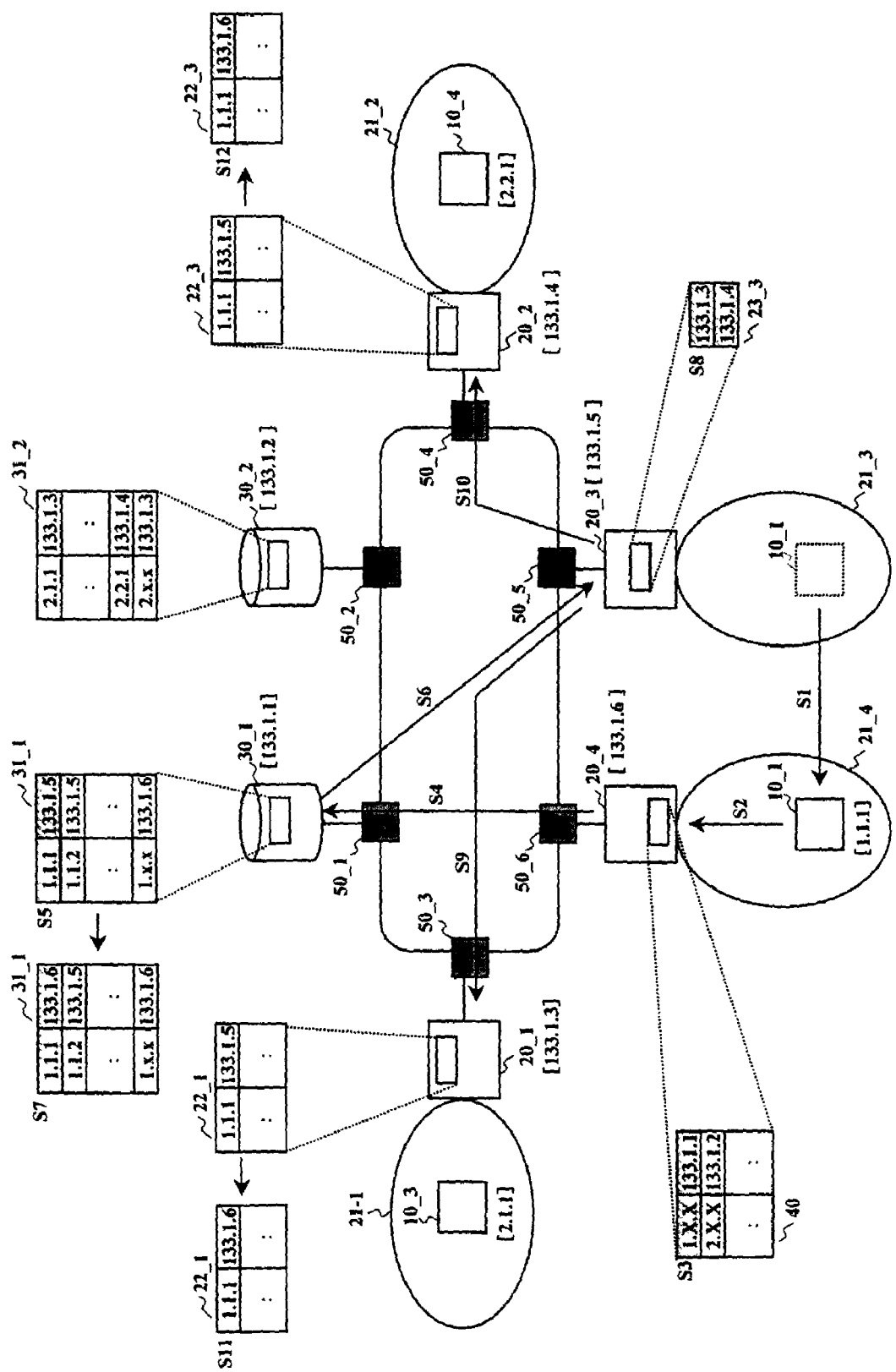
FIG. 23 is a block diagram showing an embodiment (18) of a node device according to the present invention.

FIG. 23 shows the embodiment (18) of the node device according to the present invention which composes the communication system. The arrangement of this communication system similar to that of the embodiment (16) shown in FIG. 21 except that the destination terminal 10_1 is not provided with the cache 11_1.

Also, it is different in that the node device 20_3 is provided with the storage portion (for example cache) 23_3, which stores the addresses [133.1.3] and [133.1.4] of the node devices 20_1 and 20_2 having the areas where the source terminals 10_3 and 10_4 are respectively located.

In this embodiment (19), schematically, when the destination terminal 10_1 has moved to the area 21_4, the node device 20_4 indirectly notifies the address [133.1.6] of its own device and the address of the destination terminal to the source node devices 20_1 and 20_2 through the location registering server and the former node device 20_3.

Hereinafter, the detailed operations after the destination terminal 10_1 has moved will be described.

The state of the communication system before the destination terminal 10_1 moves is as follows:

The terminal 10_1 is located in the area 21_3 of the node device 20_3.

The location information tables 22_1 and 22_2 respectively store the address [133.1.5] of the node device 20_3 having the area where the terminal 10_1 is located.

The cash 23_3 stores the addresses [133.1.3] and [133.1.4] of the node devices 20_1 and 20_2 having the areas where the source terminals 10_3 and 10_4 of the destination terminal 10_1 are respectively located.

Step S1: The terminal 10_1 moves to the area 21_4 of the node device 20_4.

Step S2: The terminal 10_1 makes the location registration to the network.

Step S3: The node device 20_4 retrieves the server retrieval table 40 to obtain the address [133.1.1] of the location registering server 30_1 corresponding to the address [1.1.1] of the terminal 10_1.

Step S4: The node device 20_4 transmits the location registration information to location registering server 30_1.

Steps S5 and S6: The location registering server 30_1 retrieves the location registering table 31_1, obtains the address [133.1.5] of the node device having the area where the terminal 10_1 was located, and notifies the address [133.1.6] of the destination node device and the address of the destination terminal to the former node device 20_3 of this address [133.1.5].

Step S7: The location registering server 30_1 updates the address of the node device having the area where the terminal 10_1 is located in the location registering table 31_1 to [133.1.6].

Steps S8–S10: The node device 20_3 notifies the address [133.1.6] of node device 20_4 and the address of the destination terminal to the node devices 20_1 and 20_2.

Steps S11 and S12: The node devices 20_1 and 20_2 respectively update the address of the node device having the area where the terminal 10_1 is located in the location information tables 22_1 and 22_2 to [133.1.6].

Thus, the source node devices 20_1 and 20_2 are to know the address [133.1.6] of the node device 20_4 having the area where the destination terminal 10_1 is located, so that hereafter, it becomes possible for the packet addressed to the destination terminal 10_1 to be directly transferred to the node device 20_4.

Figure 24:
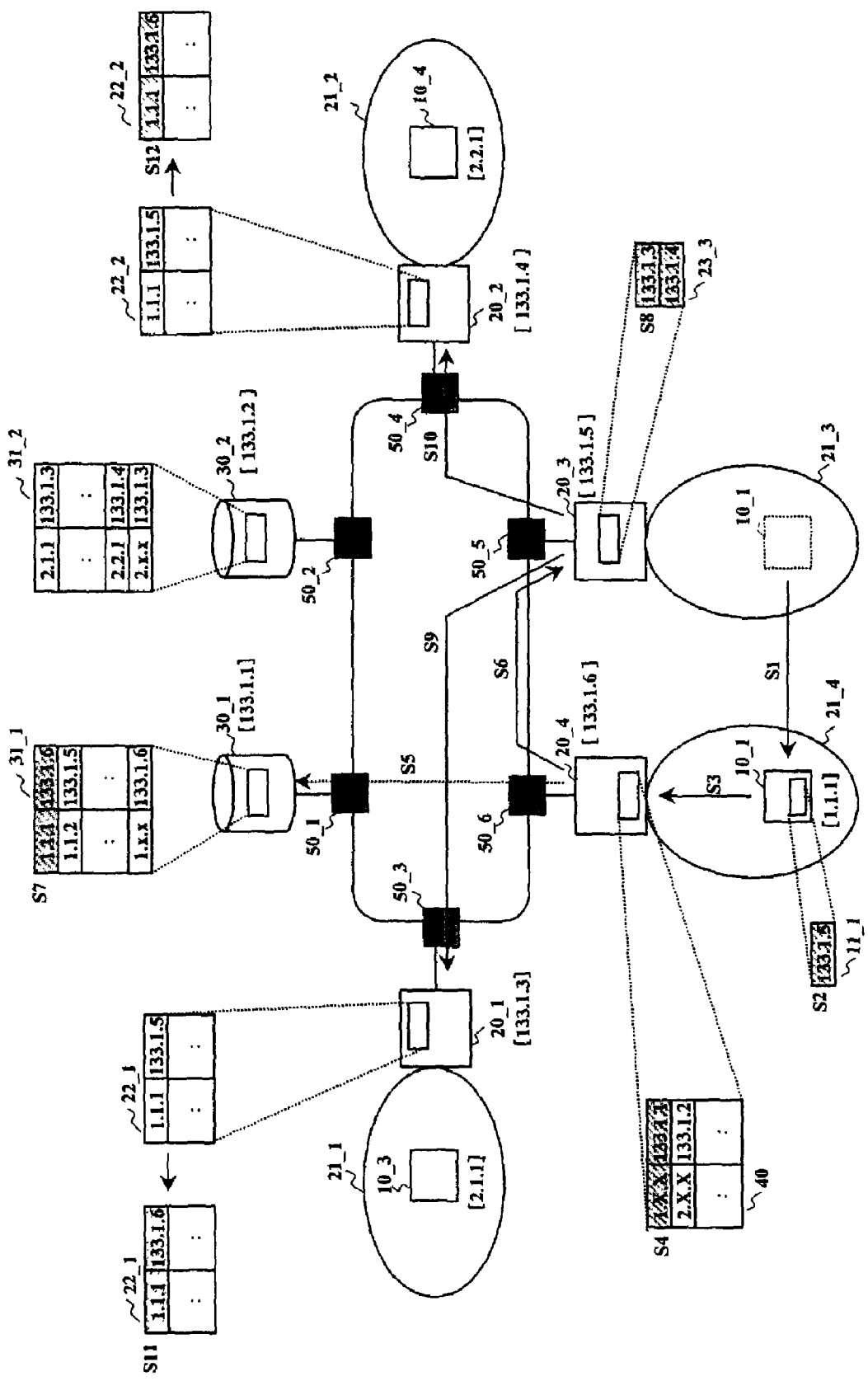
FIG. 24 is a block diagram showing an embodiment (19) of a node device according to the present invention.

FIG. 24 shows the embodiment (19) of the node device according to the present invention which composes the communication system. The arrangement of this communication system is similar to that of the embodiment (18) shown in FIG. 23. However, it is different in that the terminal 10_1 is further provided with the storage portion 11_1 for storing the address of the former node device.

In this embodiment (19), schematically, when the destination terminal 10_1 has moved to the area 21_4, the node device 20_4 notifies the address [133.1.6] of its own device and the address of the destination terminal to the source node devices 20_1 and 20_2 through the former node device 20_3 based on the address stored in the cache 11_1 of the terminal 10_1.

Hereinafter, detailed operations after the destination terminal 10_1 has moved will be described.

The state of the communication system before the destination terminal 10_1 moves is as follows:

The terminal 10_1 is located in the area 21_3 of the node device 20_3.

The cache 23_3 stores the address [133.1.3] of the node device 20_1 having the area where the source terminal 10_3 of the terminal 10_1 is located and the address [133.1.4] of the node device 20_2 having the area where the source terminal 10_4 is located.

The source node devices 20_1 and 20_2 respectively store the address [133.1.5] of the node device 20_3 having the area where the terminal 10_1 is located in the location information tables 22_1 and 22_2.

Step S1: The terminal 10_1 moves to the area 21_4 of the node device 20_4.

Step S2: The terminal 10_1 stores the address [133.1.5] of the former node device 20_3 in the cache 11_1.

Step S3: The terminal 10_1 makes the location registration to the network. At this time, it notifies the address [133.1.5] of the former node device 20_3 to the network.

Steps S4 and S5: The node device 20_4 retrieves the server retrieval table 40, obtains the address [133.1.1] of the location registering server 30_1 corresponding to the address [1.1.1] of the terminal 10_1, and transmits the location registration information to the location registering server 30_1.

Step S6: The node device 20_4 notifies the address [133.1.6] of its own device and the address of the destination terminal to the node device 20_3.

The location registering server 30_1 updates the address of the node device having the area where the terminal 10_1 is located in the location registering table 31_1 to [133.1.6].

Steps S8–S10: The node device 20_3 refers to the cache 23_3 to notify the address [133.1.6] of the node device 20_4 and the address of the destination terminal to the node devices 20_1 and 20_2.

Steps S11 and S12: The node devices 20_1 and 20_2 respectively update the address of the node device having the area where the terminal 10_1 is located in the location information tables 22_1 and 22_2 to [133.1.6].

Thus, the node devices 20_1 and 20_2 respectively store the address [133.1.6] of the node device 20_4 having the area where the terminal 10_1 is located in the location information tables 22_1 and 22_2.

Hereafter, it becomes possible for the node devices 20_1 and 20_2 to directly transfer the packet addressed to the terminal 10_1 to the node device 20_4.

Figure 25:
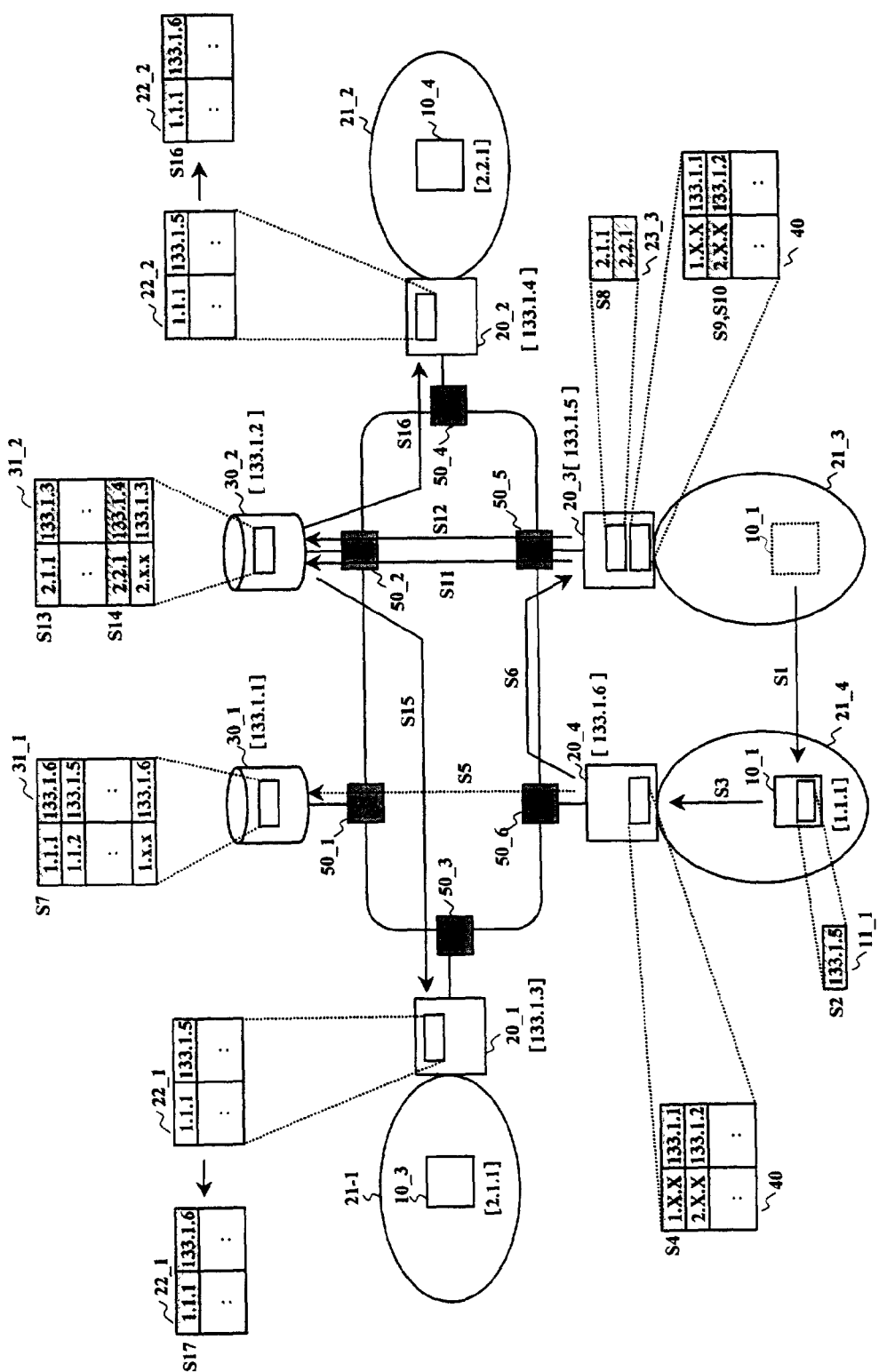
FIG. 25 is a block diagram showing an embodiment (20) of a node device according to the present invention.

FIG. 25 shows the embodiment (20) of the node device according to the present invention which composes the communication system. This embodiment (20) is different from the embodiment (19) shown in FIG. 24 in that the cache 23_3 of the node device 20_3 stores the addresses [2.1.1] and [2.2.1] of the source terminals instead of storing the addresses [133.1.3] and [133.1.4] of the source node devices 20_1 and 20_2.

In this embodiment (20), schematically, when the destination terminal 10_1 has moved to the area 21_4, the node device 20_4 notifies the address [133.1.6] of its own device and the address of the destination terminal to the source node devices 20_1 and 20_2 through the former node device 20_3 and the location registering server 30_2 based on the addresses stored in the caches 11_1 and 23_3.

Hereinafter, detailed operations after the destination terminal 10_1 has moved will be described.

The state of the communication system before the destination terminal 10_1 moves is as follows:

The terminal 10_1 is located in the area 21_3 of the node device 20_3. The cache 23_3 stores the addresses [2.1.1] and [2.2.1] of the source terminals 10_3 and 10_4 of the terminal 10_1. The location information tables 22_1 and 22_2 respectively store the address [133.1.5] of the node device 20_3 having the area where the terminal 10_1 is located.

Step S1: The terminal 10_1 moves to the area 21_4 of the node device 20_4.

Step S2: The terminal 10_1 stores the address [133.1.5] of the former node device 20_3 in the cache 11_1.

Step S3: The terminal 10_1 makes the location registration to the network. At this time, it notifies the address [133.1.5] of the former node device 20_3 to the network.

Steps S4 and S5: The node device 20_4 retrieves the server retrieval table 40, obtains the address [133.1.1] of the location registering server 30_1 corresponding to the address [1.1.1] of the terminal 10_1, and transmits the location registration information to the location registering server 30_1.

Step S6: The node device 20_4 notifies the address [133.1.6] of its own device and the address of the destination terminal to the node device 20_3.

Step S7: The location registering server 30_1 updates the address of the node device having the area where the terminal 10_1 is located in the location registering table 31_1 to [133.1.6].

Steps S8–S10: The node device 20_3 retrieves the server retrieval table 40 to obtain the address [133.1.2] of the location registering server 30_2 corresponding to the address [2.1.1] of the source terminal 10_3 stored in the cache 23_3.

In the same way, the node device 20_3 obtains the address [133.1.2] of the location registering server 30_2 corresponding to the address [2.2.1] of the source terminal 10_4.

Step S11: The node device 20_3 transmits a message to the location registering server 30_2, and requests with this message the location registering server 30_2 to notify the address [133.1.6] of the node device 20_4 having the area where the terminal 10_1 is located and the address of the destination terminal to the node device 20_1 having the area where the source terminal 10_3 is located.

Step S12: Similarly, the node device 20_3 requests the location registering server 30_2, with a message, to notify the address [133.1.6] of the node device 20_4 having the area where the terminal 10_1 is located and the address of the destination terminal to the node device 20_2 having the area where the source terminal 10_4 is located.

Steps S13 and S14: The location registering server 30_2 retrieves the location registering table 31_2 and obtains the addresses [133.1.3] and [133.1.4] of the node devices 20_1 and 20_2 having the area where the source terminals 10_3 and 10_4 are respectively located.

Steps S15 and S16: The location registering server 30_2 notifies the address [133.1.6] of node device 20_4 and the address of the destination terminal to each of the node devices 20_1 and 20_2.

Steps S17 and S18: The node devices 20_1 and 20_2 respectively update the address of the node device having the area where the destination terminal 10_1 is located in the location information tables 22_1 and 22_2 to [133.1.6].

Thus, the node devices 20_1 and 20_2 respectively know the address [133.1.6] of the node device 20_4 having the area where the destination terminal 10_1 is located, so that hereafter it becomes possible for them to directly transfer the packet addressed to the terminal 10_1 to the node device 20_4.

Figure 26:
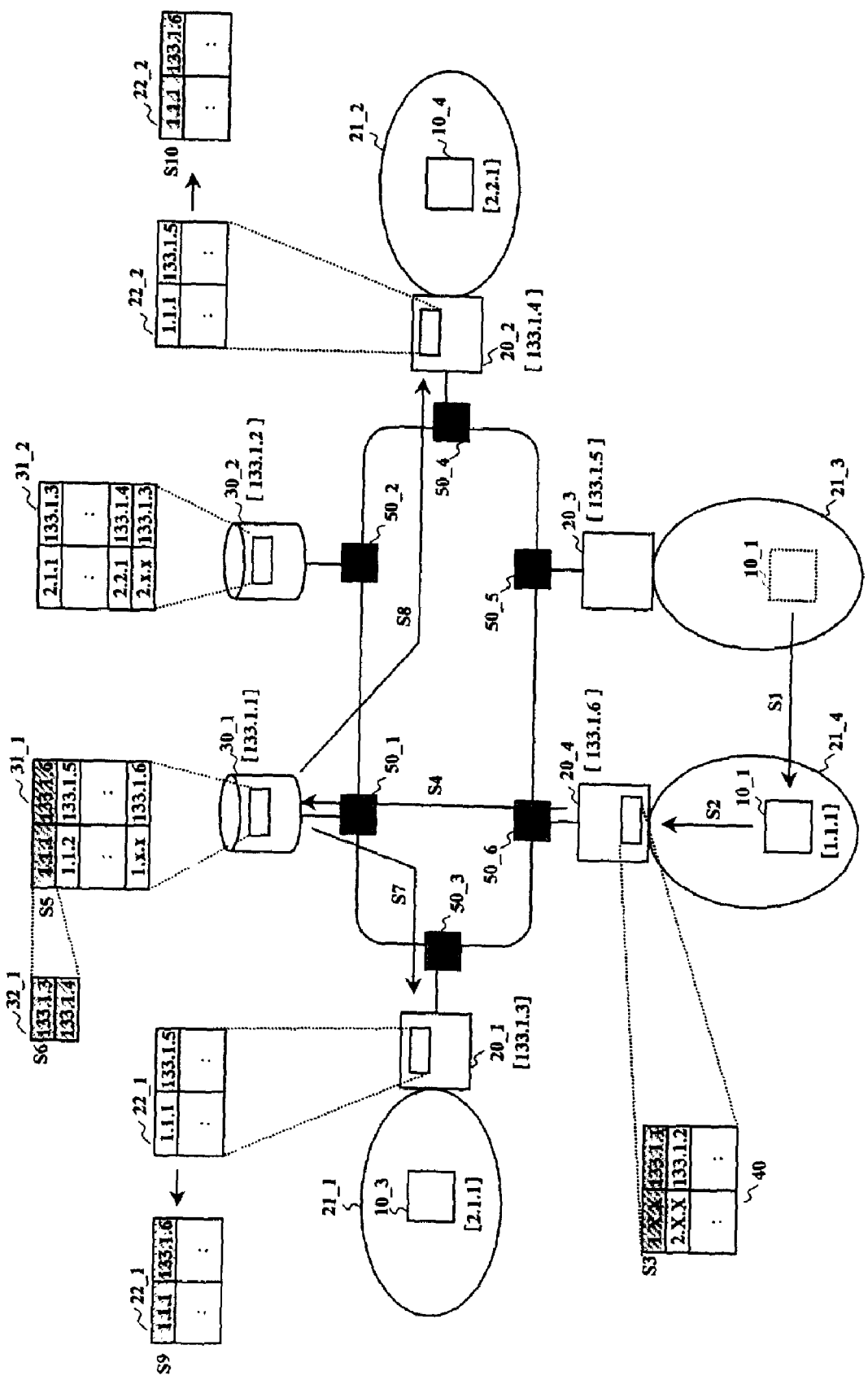
FIG. 26 is a block diagram showing an embodiment (21) of a node device according to the present invention.

FIG. 26 shows the embodiment (21) of the node device according to the present invention which composes the communication system. This embodiment (21) is different from the embodiment (18) shown in FIG. 23 in that the location registering table 31_1 of the location registering server 30_1 is provided with a storage portion (for example cache) 32_1 corresponding to each of the destination terminals while the node device 20_3 is not provided with the cache 23_3.

This cache 32_1 stores, for example, the addresses [133.1.3] and [133.1.4] of the node devices 20_1 and 20_2 having the areas where the source terminals 10_3 and 10_4, with which the destination terminal 10_1 of the address [1.1.1] registered in the location registering table 31_1 is communicating, are located.

In this embodiment (21), schematically, when the destination terminal 10_1 moves to the area 21_4, the node device 20_4 requests, for example, to the location registering server 30_1 to notify the address [133.1.6] of its own device and the address of the destination terminal to the source node devices 20_1 and 20_2 based on the address stored in the cache 32_1.

Hereinafter, detailed operations after the destination terminal 10_1 has moved will be described.

The state of the communication system before the destination terminal 10_1 moves is as follows:

The terminal 10_1 is located in the area 21_3 of the node device 20_3.

The source node devices 20_1 and 20_2 respectively store the address [133.1.5] of the node device 20_3 having the area where the terminal 10_1 is located in the location information tables 22_1 and 22_2.

The cache 32_1 of the location registering server 30_1 stores the addresses [133.1.3] and [133.1.4] of the node devices 20_1 and 20_2 having the areas where the source terminals 10_3 and 10_4 of the terminal 10_1 are respectively located. Method by which the cache 32_1 stores the addresses of the source node devices will be described later referring to FIG. 30.

Step S1: The terminal 10_1 moves to the area 21_4 of the node device 20_4.

Step S2: The terminal 10_1 makes the location registration to the network.

Step S3: The node device 20_4 retrieves the server retrieval table 40 to obtain the address [133.1.1] of the location registering server 30_1 corresponding to the address [1.1.1] of the terminal 10_1.

Step S4: The node device 20_4 transmits the location registration information to the location registering server 30_1.

Step S5: The location registering server 30_1 updates the address of the node device having the area where the terminal 10_1 is located in the location registering table 31_1 to [133.1.6].

Steps S6–S8: The location registering server 30_1 notifies the address [133.1.6] of node device 20_4 and the address of the destination terminal to each of the node devices 20_1 and 20_2 of the addresses [133.1.3] and [133.1.4] stored in the cache 32_1.

Steps S9 and S10: The node devices 20_1 and 20_2 respectively update the address of the node device having the area where the terminal 10_1 is located in the location information tables 22_1 and 22_2 to [133.1.6].

Thus, the node devices 20_1 and 20_2 are to know the address [133.1.6] of the node device 20_4 having the area where the destination terminal 10_1 is located, so that hereafter, it becomes possible for them to directly transfer the packet addressed to the terminal 10_1 to the node device 20_4.

In a varied example of this embodiment (21), the node device 20_4 transmits, to the location registering server 30_1, a message inquiring the addresses of the node devices, with which the destination terminal 10_1 located in the area 21_4 is communicating.

Then, the location registering server 30_1 retrieves the storage portion 32_1 and sends back the addresses [2.1.1] and [2.2.1].

The node device 20_4 may obtain the addresses [133.1.3] and [133.1.4] of the node devices 20_1 and 20_2 having the area where the terminals of the addresses [2.1.1] and [2.2.1] are located from the location registering server 30_2 and may directly transmit the address [133.1.6] of its own device and the address of the destination terminal to the node devices 20_1 and 20_2.

FIG. 27 shows the embodiment (22) of the node device according to the present invention which composes the communication system. This embodiment (22) is different from the embodiment (21) shown in FIG. 26 in that the cache 32_1 stores the addresses of the source terminals instead of storing the addresses of the source node devices corresponding to the destination terminal.

Also, it is different in that the location registering server 30_1 further has the server retrieval table 40.

In this embodiment (22), schematically, when the destination terminal 10_1 moves to the area 21_4, the node device 20_4 requests the location registering server 30_1 to notify the address [133.1.6] of its own device and the address of the destination terminal to the source node devices 20_1 and 20_2 based on the addresses stored in the cache 32_1.

Although the operations of this embodiment (22) similar to those of the embodiment (21), they are different from the operations of the embodiment (21) since the addresses stored in the cache 32_1 are mutually different.

Hereinafter, detailed operations after the destination terminal 10_1 has moved will be described.

The state of the communication system before the destination terminal 10_1 moves in FIG. 27 is as follows:

The terminal 10_1 is located in the area 21_3 of the node device 20_3.

The location information tables 22_1 and 22_2 respectively store the address [133.1.5] of the node device 20_3 having the area where the terminal 10_1 is located.

The cache 32_1 stores the addresses [2.1.1] and [2.2.1] of the source terminals 10_3 and 10_4 of the terminal 10_1. It is to be noted that the method by which the cache 32_1 stores the addresses of the source terminals will be described later referring to FIG. 30.

Step S1: The terminal 10_1 moves to the area 21_4 of the node device 20_4.

Step S2: The terminal 10_1 makes the location registration to the network.

Step S3: The node device 20_4 retrieves the server retrieval table 40 to obtain the address [133.1.1] of the location registering server 30_1 corresponding to the address [1.1.1] of the terminal 10_1.

Step S4: The node device 20_4 transmits the location registration information to the location registering server 30_1.

Step S5: The location registering server 30_1 updates the address of the node device having the area where the terminal 10_1 is located in the location registering table 31_1 to [133.1.6].

Step S6: The location registering server 30_1 stores the address [2.1.1] of the source terminal 10_3 of the terminal 10_1 and the address [2.2.1] of the source terminal 10_4 in the cache 32_1.

Step S7: The location registering server 30_1 retrieves the server retrieval table 40 to obtain the address [133.1.2] of the location registering server 30_2 corresponding to the address [2.1.1] of the terminal 10_3.

Step S8: The location registering server 30_1 retrieves the server retrieval table 40 to obtain the address [133.1.2] of the location registering server 30_2 corresponding to the address [2.2.1] of the terminal 10_4.

Step S9: The location registering server 30_1 transmits a message to the location registering server 30_2 and requests to notify, with this message, the address of the node device having the area where the terminal 10_1 is located and the address of the destination terminal to the node device having the area where the source terminal 10_3 of the address [2.1.1] is located.

Step S10: The location registering server 30_1 transmits a message to the location registering server 30_2 and requests to notify, with this message, the address of the node device having the area where the terminal 10_1 is located and the address of the destination terminal to the node device having the area where the source terminal 10_4 of the address [2.2.1] is located Steps S11 and S12: The location registering server 30_2 retrieves the location registering table 31_2 to obtain the addresses [133.1.3] and [133.1.4] of the node devices having the areas where the source terminals 10_3 and 10_4 are respectively located.

Steps S13 and S14: The location registering server 30_2 notifies the address [133.1.6] of the node device 20_4 and the address of the destination terminal to each of the node devices 20_1 and 20_2.

Steps S15 and S16: The node devices 20_1 and 20_2 respectively update the address of the node device having the area where the terminal 10_1 is located in the location information tables 22_1 and 22_2 to [133.1.6].

Thus, the node devices 20_1 and 20_2 are to know the address [133.1.6] of the node device 20_4 having the area where the destination terminal 10_1 is located, so that hereafter, it becomes possible for them to directly transfer the packet addressed to the terminal 10_1 to the node device 20_4.

In a varied example of this embodiment (22), the node device 20_4 may transmit the addresses of its own device and the destination terminal at steps S4–S14 as follows:

The node device 20_4 transmits a message inquiring the addresses of the source terminals 10_3 and 10_4 to the location registering server 30_1. The location registering server 30_1 sends back the addresses [2.1.1] and [2.2.1] stored in the cache 32_1 to the node device 20_4.

Then, the node device 20_4 transmits a message inquiring the node devices having the areas where the terminals of the addresses [2.1.1] and [2.2.1] are located to the location registering server 30_2. The location registering server 30_2 sends back the addresses [133.1.3] and [133.1.4] to the node device 20_4.

Based on these addresses [133.1.3] and [133.1.4], the node device 20_4 directly transmits the address [133.1.6] of its own device and the address of the destination terminal to the source node devices 20_1 and 20_2.

It is to be noted that in this varied example, the location registering servers 30_1 and 30_2 do not require the server retrieval table 40.

(v) Other Embodiments

Figure 28:
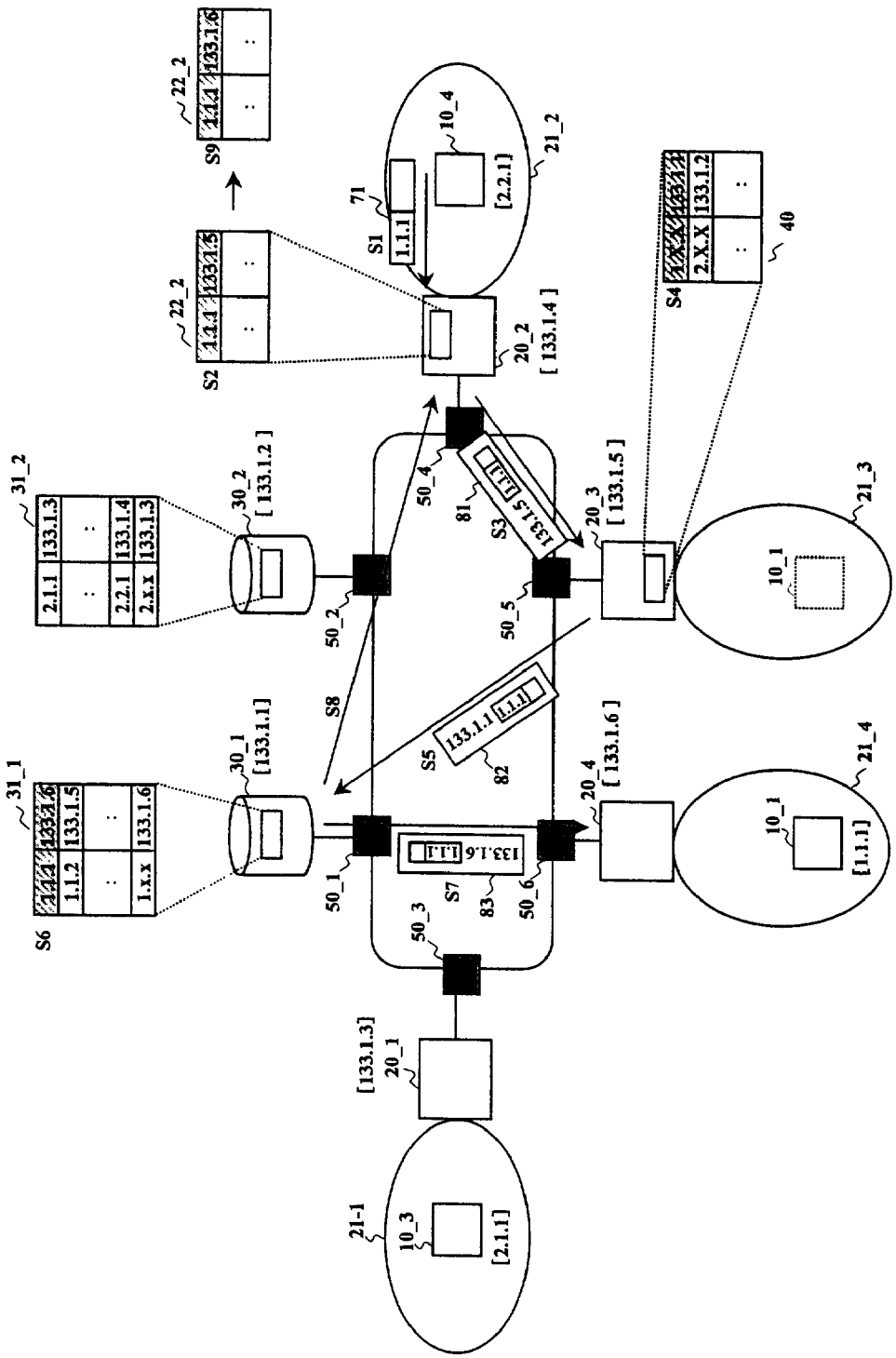
FIG. 28 is a block diagram showing an embodiment (23) of a node device according to the present invention.

FIG. 28 shows the embodiment (23) of the node device according to the present invention which composes the communication system. This embodiment (23) is the embodiment in which the embodiment (1) shown in FIG. 5 and the embodiment (13) shown in FIG. 18 are combined and the arrangement of the communication system is similar to that of the embodiment (13).

In this embodiment (23), schematically, the node device on the receiving side transmits the packet 81 (packet 71) and a message to the location registering server. With this message, the node device on the receiving side requests to transfer the packet 71 to the destination node device and to notify the address of the node device having the area where the destination terminal is located at present to the source node device.

Hereinafter, detailed operations after the destination terminal 10_1 has moved will be described.

The state of the communication system before the destination terminal 10_1 has moved in FIG. 28 is as follows:

The terminal 10_1 is located in the area 21_3 of the node device 20_3.

The source node device 20_2 stores the address [133.1.5] of the node device 20_3 having the area where the terminal 10_1 is located in the location information table 22_2.

Step S1: The user packet 71 addressed to the terminal 10_1 arrives at the node device 20_2.

Step S2: The node device 20_2 retrieves the location information table 22_2 to obtain the address [133.1.5] of the node device 20_3 having the area where the terminal 10_1 is located.

Step S3: The node device 20_2 transfers the inter-node packet 81 which has the address [133.1.5] of node device 20_3 added to the received packet 71 addressed to the terminal 10_1.

Step S4: Since the destination terminal 10_1 is not located in the area, the node device 20_3 retrieves the server retrieval table 40 to obtain the address [133.1.1] of the location registering server 30_1 corresponding to the address [1.1.1] of the terminal 10_1.

Step S5: The node device 20_3 transfers the inter-node packet 82 including the packet 71 addressed to the terminal 10_1 and the message information to the location registering server 30_1.

Figure 29:
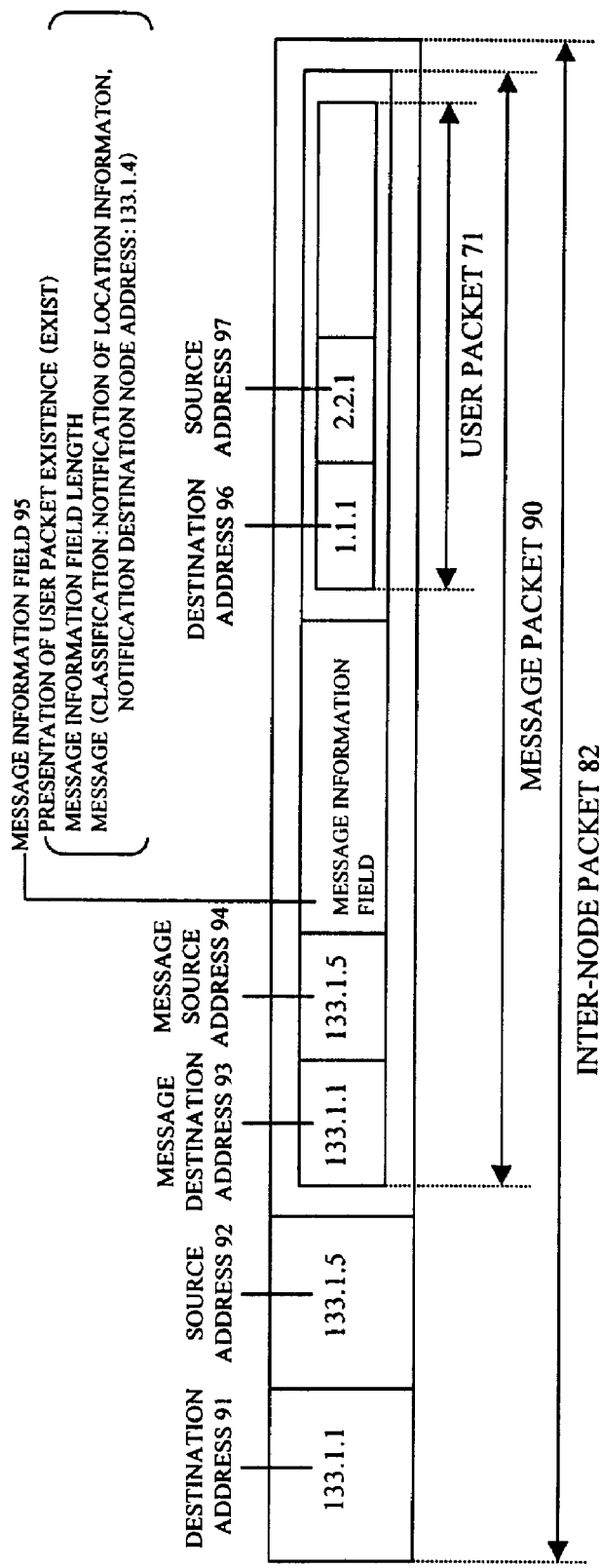
FIG. 29 is a diagram showing a format example of a packet used in the embodiment (23) of a node device according to the present invention.

FIG. 29 shows a detailed example of the packet 82, the format of which is the same as that of the packet 82 shown in FIG. 8.

In the fields 91 and 92, the address [133.1.1] of the location registering server 30_1 which is the destination of the packet 82 and the address [133.1.5] of the node device 20_3 which is the source of the packet 82 are respectively presented.

In the fields 93 and 94, the address [133.1.1] of the location registering server 30_1 which is the destination of the message packet 90 and the address [133.1.5] of the node device 20_3 which is the source of the message are respectively presented.

In the message information field 95, "Existence of user packet"="Exist", and "Message classification"="Notification of location information with notification destination node address being [133.1.4]" are presented.

Step S6: The location registering server 30_1 recognizes that the message packet 90 is addressed to the server 30_1 itself since the field 93 of the packet 82 received from the node device 20_3 is the address [133.1.1] of the server 30_1 itself.

Therefore, the location registering server 30_1 reads the contents of the message information field 95 and recognizes that the user packet 71 addressed to the terminal 10_1 is included in the message packet 90.

Then, the location registering server 30_1 retrieves the location registering table 31_1 to obtain the address [133.1.6] of the node device 20_4 having the area where the terminal 10_1 of address [1.1.1] in the destination address field 96 included in the packet 71 is located.

Step S7: The location registering server 30_1 transfers the inter-node packet 83, which is the user packet 71, addressed to the terminal 10_1 and added with the address [133.1.6] of the node device 20_4, to the node device 20_4.

Step S8: Moreover, the location registering server 30_1 recognizes that "Message classification" in the message information field 95 is "Notification of location information" and its notification destination node address is "Address [133.1.4]".

Therefore, the location registering server 30_1 transmits the message to notify the address [133.1.6] of the node device 20_4 having the area where the terminal 10_1 is located and the address of the destination terminal to the node device 20_2.

Step S9: The node device 20_2 updates the address of the node device having the area where the terminal 10_1 is located in the location information table 22_2 to [133.1.6].

Thus, the packet 71 is transferred to the destination terminal 10_1 through the node device 20_4. Also, the node device 20_2 is to know the address of the node device 20_4 having the area where the destination terminal 10_1 is located.

Hereafter, it becomes possible for the node device 20_2 to directly transfer the packet 71 addressed to the terminal 10_1 to the node device 20_4.

Figure 30:
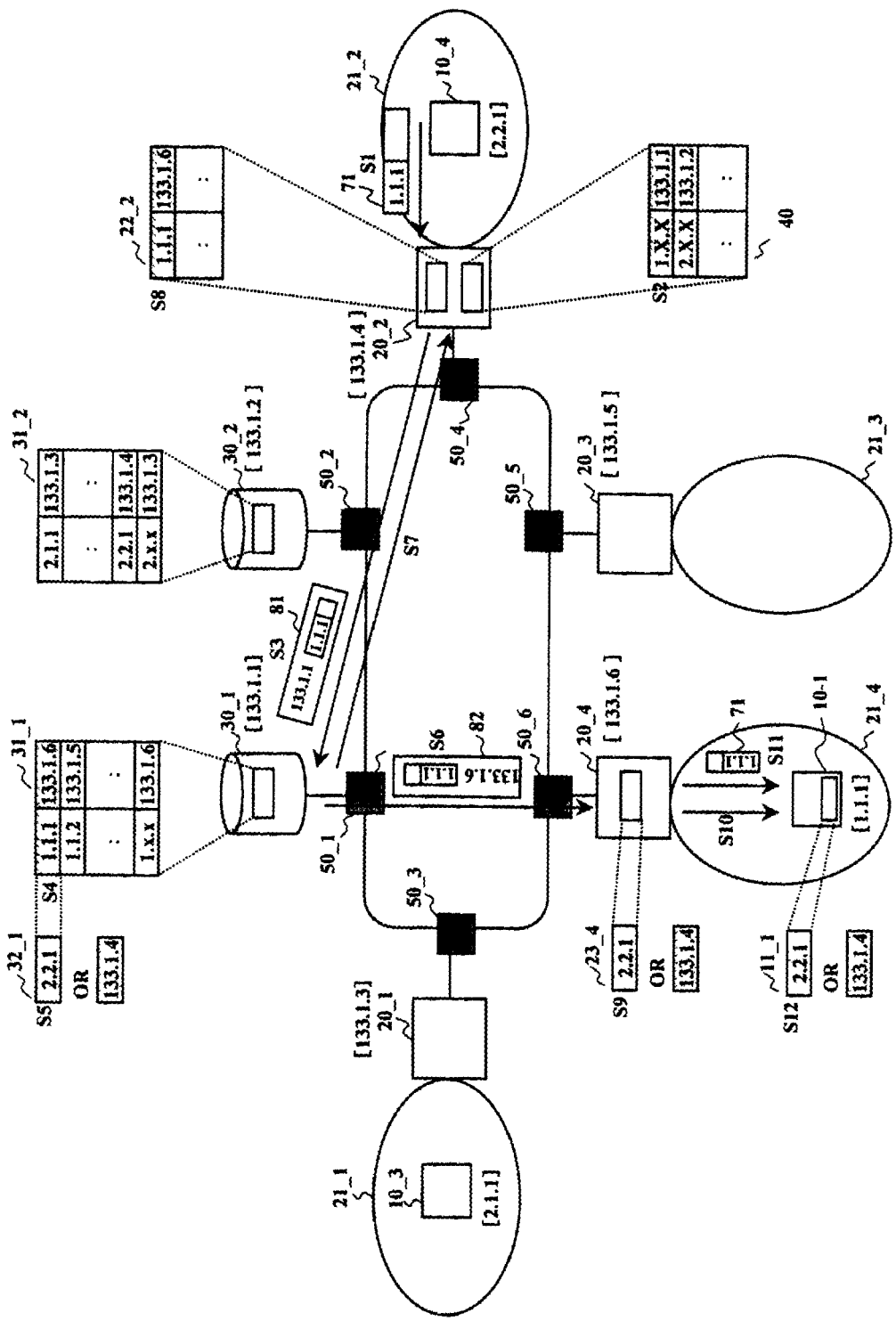
FIG. 30 is a block diagram showing an embodiment (24) of a node device according to the present invention.

FIG. 30 shows procedures by which the storage portions of the destination terminal, the node device, and the location registering servers respectively store the addresses of the source node devices or the source terminals for example in the embodiments (16), (18), (19), and (21).

Also, it shows procedures by which the storage portions of the destination terminal, the node device, and the location registering servers respectively store the addresses of the source terminals for example in the embodiments (17), (20), and (22), respectively.

As an example of procedures, FIG. 30 shows procedures by which the storage portion 11_1 of the destination terminal 10_1, the storage portion 23_4 of the node device 20_4 having the area where the destination terminal 10_1 is located, and the storage portion 32_1 of the location registering server 30_1 corresponding to the destination terminal 10_1 store the address [2.2.1] of the source terminal 10_4 or the address [133.1.4] of the source node device 20_2 when the source terminal 10_4 transmits the packet 71 to the address terminal 10_1.

It is to be noted that the arrangement of the communication system of FIG. 30 is similar to that of the system of FIG. 21.

Step S1: The user packet 71 transmitted from the source terminal 10_4 to the destination terminal 10_1 arrives at the node device 20_2.

Step S2: Since the node device 20_2 does not know the address of the node device having the area where the destination terminal 10_1 is located, it retrieves the server retrieval table 40 to obtain the address [133.1.1] of the location registering server 30_1 corresponding to the address [1.1.1] of the terminal 10_1.

Step S3: The node device 20_2 transfers to the location registering server 30_1 the inter-node packet 81, which is the received packet 71, addressed to the terminal 10_1 and added with the address [133.1.1] of location registering server 30_1.

Step S4: The location registering server 30_1 retrieves the location registering table 31_1 to obtain the address [133.1.6] of the node device 20_4 having the area where the terminal 10_1 is located.

Step S5: At this time, the location registering server 30_1 can store the address [2.2.1] of the source terminal 10_4 in the storage portion 32_1 by examining the source address of the packet 71.

Also, the location registering server 30_1 can store the address [133.1.4] of the node device 20_2 having the area where the source terminal 10_4 is located in the storage portion 32_1 by examining the source address of the packet 81.

Step S6: The location registering server 30_1 transfers the inter-node packet 82, which has the destination address of the received packet 81 rewritten to [133.1.6], to the node device 20_4.

Step S7: The location registering server 30_1 notifies the address [133.1.6] of the node device 20_4 having the area where the terminal 10_1 is located to node device 20_2 based on the source address [133.1.4] of the packet 81.

Step S8: The node device 20_2 adds the address of the terminal 10_1 and the address [133.1.6] of its destination node device to the location information table 22_2.

Step S9: The node device 20_4 can store the address [2.2.1] of the source terminal 10_4 in the storage portion 23_4 by examining the source address of the packet 71 included in the received packet 82.

Also, the node device 20_4 can store the address [133.1.4] of the node device 20_2 having the area where the source terminal 10_4 is located in the storage portion 23_4 by examining the source address of the received inter-node packet 82.

Step S10: When notifying the address [133.1.4] of the node device 20_2 having the area where the source terminal 10_4 is located to the destination terminal 10_1, the node device 20_4 transmits a notification message including the address [133.1.4] of the node device 20_2.

Step S11: The node device 20_4 transmits the packet 71 from the source terminal 10_4 to the destination terminal 10_1.

Step S12: The destination terminal 10_1 can store the address [133.1.4] of the node device 20_2 included in the received notification message in the storage portion 11_1.

Also, the destination terminal 10_1 receives the user packet 71 transmitted from the source terminal 10_4. At this time, the destination terminal 10_1 can store the address [2.2.1] of the source terminal 10_4 in the storage portion 11_1 by examining the source address of the user packet 71.

Thus, the storage portions 11_1, 23_4, and 32_1 respectively store the address [2.2.1] of the source terminal 10_4 or the address [133.1.4] of the source node device 20_2.

Figure 31:
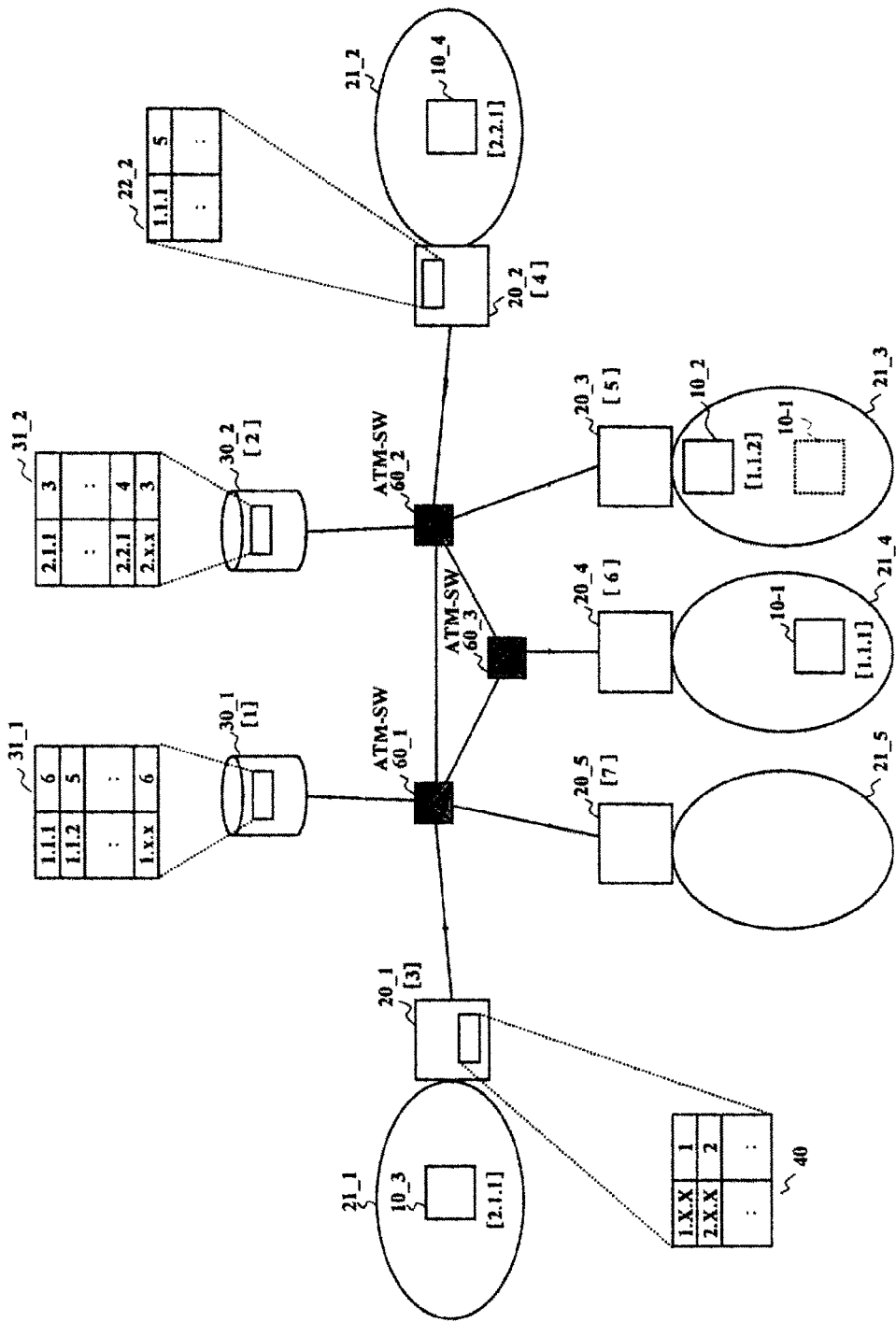
FIG. 31 is a block diagram showing an embodiment (25) of a node device according to the present invention.
Figure 32:
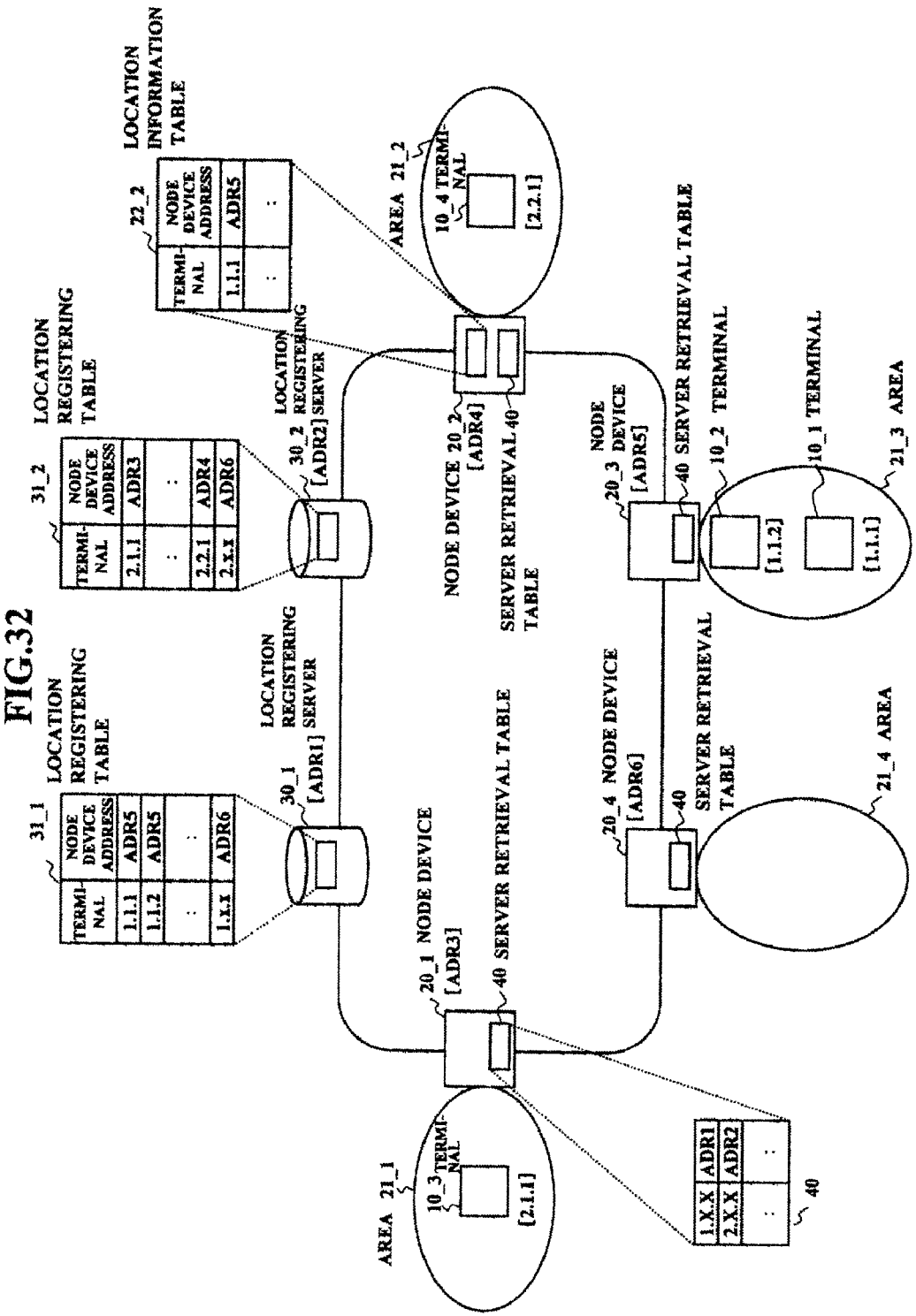
FIG. 32 is a block diagram showing an arrangement of a mobile packet communication system composed of a general node device.
Figure 33:
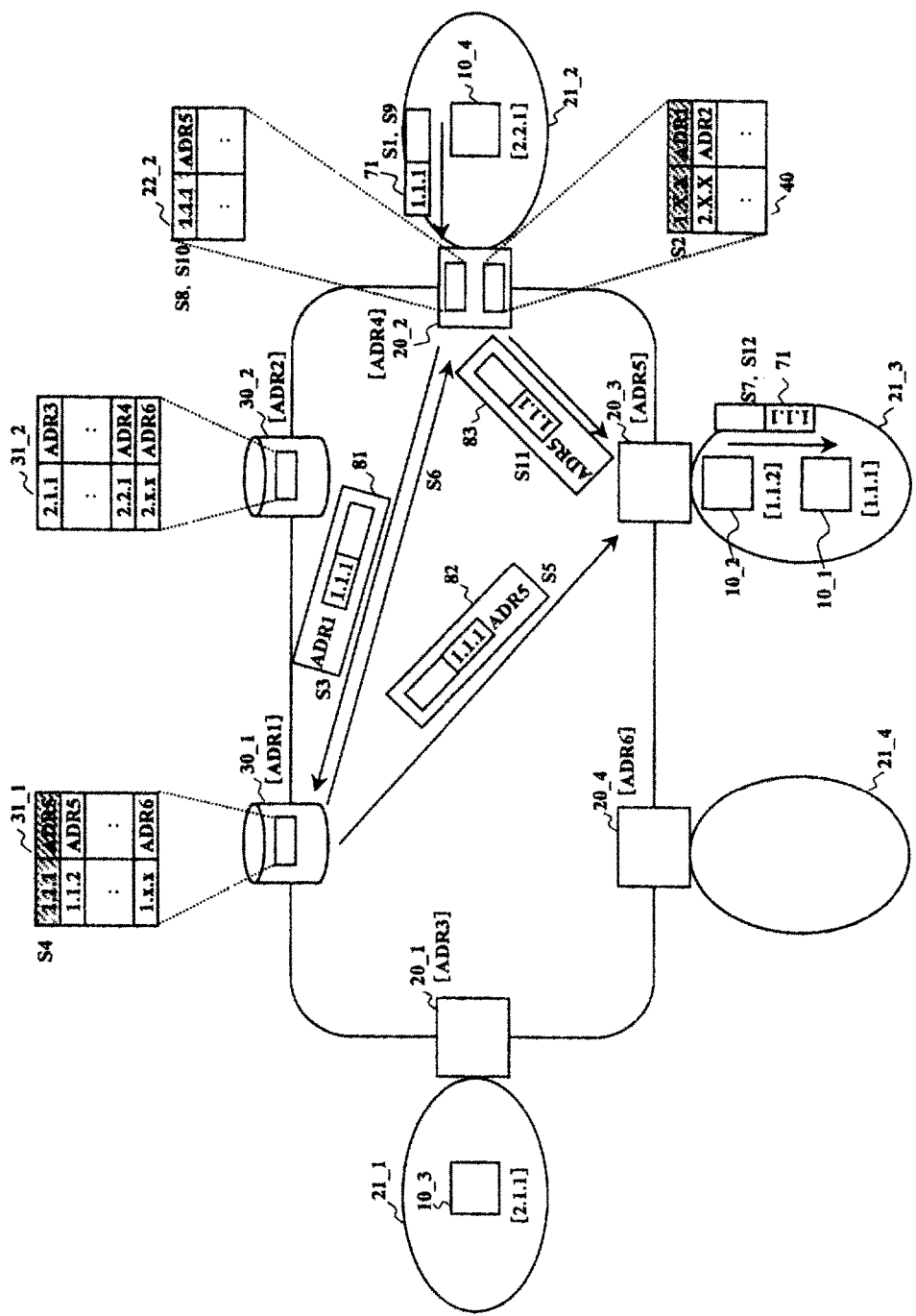
FIG. 33 is a block diagram showing an operation example (1) of a packet transfer in a mobile packet communication system.
Figure 34:
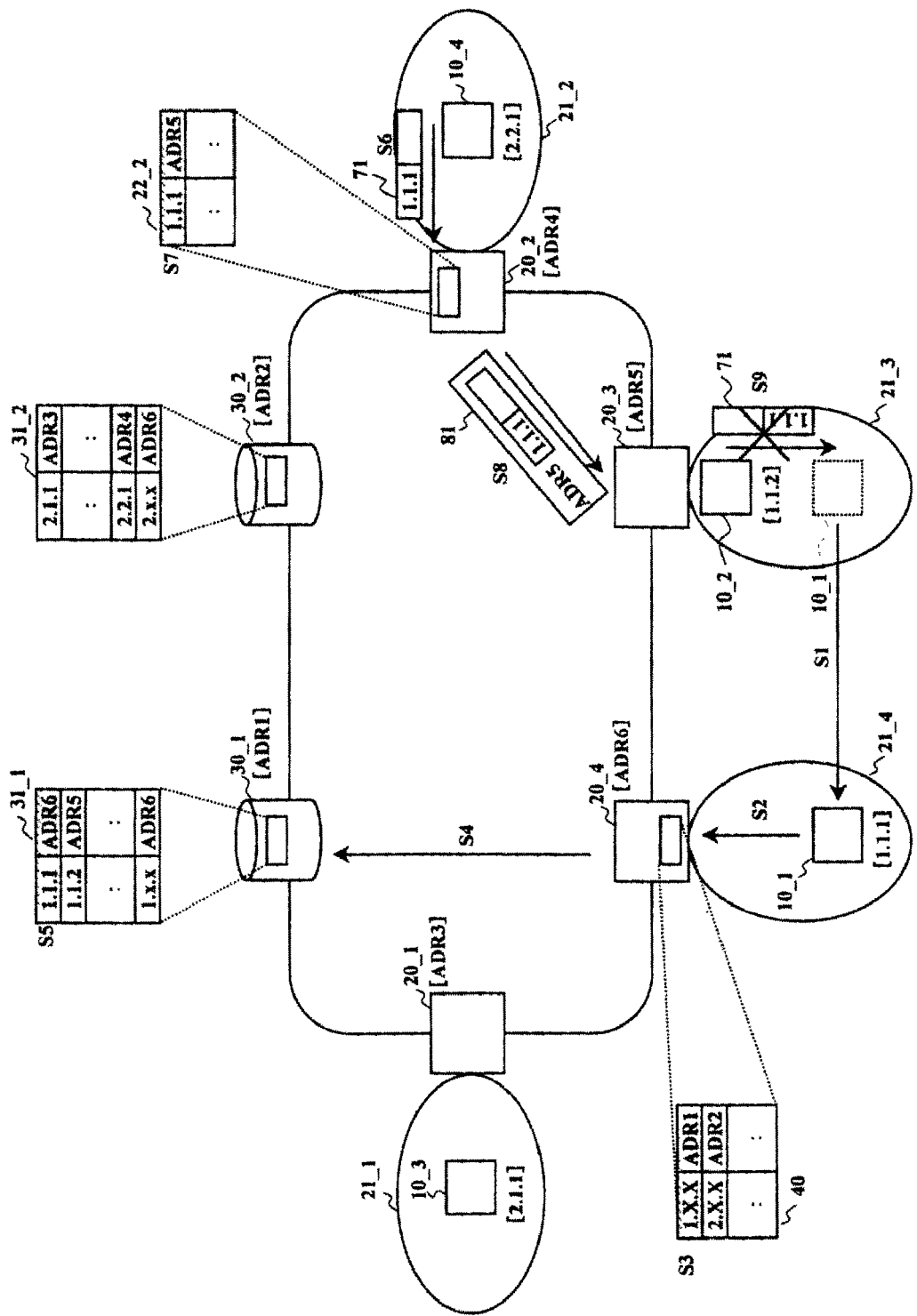
FIG. 34 is a block diagram showing an operation example (2) of a packet transfer in a mobile packet communication system.

FIG. 31 shows the embodiment (25) of the node device according to the present invention which composes the communication system. In this embodiment (25), the node devices 20_1–20_5 and the location registering servers 30_1 and 30_2 (hereinafter the node devices 20_1–20_5 and the location registering servers 30_1 and 30_2 are generally referred to as node device) are connected by ATM-SW's 60_1–60_3 (ATM switches).

Addresses [1]–[7] are assigned to each of the node devices 30_1, 30_2, and 20_1–20_5. VPI/VCI addresses, E.164 addresses, IPv4 addresses, IPv6 addresses, or the like can be used as the addresses [1]–[7].

Thus, even in the communication system where a general ATM network is applied to the network between the node devices, it is possible to perform a similar packet transfer operation to those of the embodiments (1)–(23) by replacing the IP addresses [133.1.1]–[133.1.7] of the node devices, in the embodiment (1) of FIG. 5—the embodiment (23), with the addresses [1]–[7] of the respective node devices in the ATM network.

Particularly, when the node devices are connected with ATM-SVC (Switched Virtual Connection), cases may be expected where the address of the node device that is the source of the inter-node packet cannot be recognized only by the ATM header information. In such cases, the method of the embodiment (3) shown in FIGS. 7 and 8 is useful.

As described above, a node device according to the present invention is arranged such that a node device on a receiving side transfers, to a destination node device, a received inter-node packet, based on destination terminal location information of its storage portion or a location registering server, directly or through other devices, or the destination node device notifies a former node device (on the receiving side) of an address of its own device directly or through other devices. Therefore, it becomes possible to reduce deterioration of a communication quality caused by a packet loss which occurs when the destination terminal moves to an area of another node device.

Also, the node device according to the present invention is arranged such that the node device on the receiving side or the destination node device notify a source node device of the address of the destination node device directly or through other devices, based on a predetermined address stored in the storage portion of the terminal, the node device, or the location registering server. Therefore, it becomes possible for the source node device to correctly transfer the packet to the destination node device without continuing to transmit the packet to the former node device having the area where the destination terminal was located with the stored location information not being updated.

What we claim is:

1. A communication system having a plurality of node devices for communicating with a terminal, said terminal may move among said plurality of node devices and register its location with said communication system, said location being an address of a destination node device accommodating said terminal, comprising:
    a location registering server for registering the location of said terminal;
    a node device that receives a packet destined for said terminal and transfers said packet to the destination node device when knowing the address of the destination node device, while otherwise transferring the packet to the destination node device by referring to the location registering server; and
    a transfer sequence; wherein when the node device does not know the address of the destination node device, the received packet is transferred to the destination node device by the node device forwarding the received packet to the location registering server which forwards the packet to the destination node device by referring to a location registering table.

2. The communication system as claimed in claim 1 wherein the location registering server further forwards the address of the destination node device to the node device.

3. The communication system as claimed in claim 2 wherein the node device forwards a received subsequent packet directly to said destination node device.

4. The communication system of claim 1, further comprising:
    a transfer sequence, wherein when the node device does not know the address of the destination node device, the address of the destination node device is obtained from the location registering server so that the received packet is transferred by the node device to the destination node device at the obtained address.

5. The communication system of claim 4 further comprising:
    a sender node device being a node device that sent the packet, wherein said node device further notifies the sender node device of the address of the destination node device.

6. The communication system of claim 1 wherein said node device further comprising:
a storage portion for storing an address of the terminal and the address of the destination node device in correspondence with each other, and
a transfer portion for transferring the received packet to the destination node device when the terminal is not being accommodated by the node device.

7. The communication system as claimed in claim 6 wherein the node device continues transferring packets to the destination node device after the received packet until a predetermined time elapses or a finish of the packet transfer is instructed.

8. The communication system of claim 1, wherein the terminal having a storage portion included in an adapter connected to the terminal.

9. The communication system of claims 1, wherein a packet transmitted/received between the plurality of node devices designates to the destination node device at least one of a necessity of a transfer of its own packet, a transfer destination, a necessity of a response message, and a response destination.

10. The communication system of claim 1, further comprising:
a plurality of location registering servers; and
the node device having a server retrieval table for providing a correspondence between the terminal and an address of a location registering server where a terminal location registration is made.

11. The communication system of claim 1, wherein the node device is connected to a router to compose the communication system.

12. The communication system of claim 1, wherein the node device is connected with an ATM-SWITCH to compose the communication system.

13. The communication system of claim 1, further comprising a plurality of terminals, wherein at least one of the terminals has a fixed terminal, and
at least one of the node devices has a node device for a fixed communication network.

14. A communication system having a plurality of node devices for communicating with a terminal said terminal may move among said plurality of node devices and register its location with said communication system, said location being an address of a destination node device accommodating said terminal, comprising:
a location registering saver for registering the location of said terminal;
a node device that receives a packet destined for said terminal and transfers said packet to the destination node device when knowing the address of the destination node device, while otherwise transferring the packet to the destination node device by referring to the location registering server;
a source node device being an originating node device of said received packet; and
a transfer sequence; wherein when the node device does not know the address of the destination node device, the received packet is once sent back to the source node device by the node device, and by referring to the location registering server the packet is transferred to the destination node device.

15. The communication system of claim 14 wherein the source node device obtains the address of the destination node device from the location registering server and transfers the packet to the destination node device.

16. The communication system of claim 14 wherein when the received packet is being once sent back to the source node device, the received packet is transferred by the node device to the location registering server which forwards the received packet back to the source node device.

17. The communication system as claimed in claim 14 wherein the location registering server further forwards the address of the destination node device to at least one of the source node device and the node device.

18. A communication system plurality of node devices for communicating with a terminal, said terminal may move among said plurality of node devices and register its location with said communication system, said location being an address of a destination node device accommodating said terminal, comprising:
a location registering server for registering the location of said terminal;
a node device that receives a packet destined for said terminal and transfers said packet to the destination node device when knowing the address of the destination node device, while otherwise transferring the packet to the destination node device by referring to the location registering server;
a source node device being an originating node device of said received packet; and
a transfer sequence, wherein when the node device does not know the address of the destination node device, the received packet is once sent back to the source node device by the node device, the source node device transfer the packer to the location registering server, which further transfers the received packet to the destination node device by referring to a location registering table.

19. The communication system of claim 9 wherein when the received packet is being once sent back to the source node device, the received packet is transferred by the node device to the location registering server which forwards the received packet back to the source node device.

20. The communication system as claimed in claim 18 wherein the location registering server further forwards the address of the destination node to the source node device.

21. The communication system of claim 18 wherein the location registering server further forwards the address of the destination node device to the node device.

22. A communication system having a plurality of node devices for communicating with a terminal, said terminal may move among said plurality of node devices, comprising:
a destination node device being a node device of said plurality of node devices that is accommodating the terminal and facilitating communication between the terminal and the communication system; and
a former node device being a node device of said plurality of node devices that previously accommodated the terminal; wherein
the destination node device obtains an address of the former node device and notifies the former node device of an address of the destination node device and an address of the terminal.

23. The communication system of claim 22 wherein the terminal comprises:
a storage portion for storing the address of the former node device; wherein
the destination node device receives the address of the former node device stored in the storage portion and by way of the received address of the former node device notifies the former node device of the addresses of the destination node device and the terminal.

24. The communication system of claim 23 wherein the storage portion of the terminal stores the address of the former node device with which the terminal has first started communication during a communication session.

25. The communication system of claim 23 wherein the storage portion of the terminal stores all addresses of former node devices servicing areas where the destination terminal has been located from a communication start to a present time, and
the destination node device receives said all addresses from the storage portion of the terminal to notify all of the former node devices of the addresses of the destination node device and the terminal.

26. The communication system of claim 23, said destination node device further comprising:
a storage portion for storing the address of the former node device and the address of the terminal in correspondence with each other, and
the destination node device notifying the former node device, by referring to its storage portion, of an address of a new destination node device, when the terminal has moved from an area in which the destination node device accommodates the terminal to an area of a new destination node device, said new destination node device having the area where the terminal is located at present, and
the new destination node device has notified the destination node device of the address of the new destination node device and the address of the terminal.

27. The communication system of claim 22, the communication system further comprises:
a location registering server, wherein
the destination node device obtains, from the location registering server, the address of the former node device to notify the former node device of the addresses of the destination node device and the terminal.

28. The communication system of claim 27 wherein
the destination node device, when the terminal has moved to an area accommodated by the destination node device and before making a location registration of the terminal, obtains from the location registering server the address of the former node device to notify the former node device of the addresses of the destination node device and the terminal, the former node device having an area where the terminal was located before.

29. The communication system of claim 22, the communication system further comprises:
a location registering server which further comprises:
a storage portion for storing the address of the former node device, wherein
the location registering server notifies the former node device of the address of the destination node device to which a location registration request from the terminal is being made.

30. The communication system of claim 22, the communication system further comprises:
a location registering server which further comprises:
a storage portion for storing the address of the former node device, wherein
while the terminal continues a communication session the storage portion of the location registering server stores the address of the first former node device being a node device where the terminal started the communication session, and
the destination node device notifies the first former node device of the addresses of the destination node device and the terminal.

31. The communication system of claim 22, the communication system further comprises:
a location registering server which further comprises:
a storage portion for storing all addresses of former node devices where the terminal has been located from a communication start to a present time, and
the location registering server notifies all of the former node devices of the address of the destination node device and the address of the terminal.

32. The communication system of claim 22, the communication system further comprises:
a location registering server which further comprises:
a storage portion for storing the address of the former node device, wherein
the destination node device receives the address of the former node device from the location registering server, when the terminal has moved to an area accommodated by the destination node device, to notify the former node device of the addresses of the destination node device and the terminal.

33. The communication system of claim 22, the communication system further comprises:
a location registering server which further comprises:
a storage portion for storing the address of the former node device, wherein
the storage portion of the location registering server stores all addresses of former node devices where the terminal has been located from a communication start to a present time, and
the destination node device notifies all of the former node devices of the addresses of the destination node device and the terminal.

34. A communication system having a plurality of node devices for communicating with a terminal, said terminal may move among said plurality of node devices, comprising:
a destination node device being a node device of said plurality of node devices that is accommodating the terminal and facilitating communication between the terminal and the communication system;
a former node device being a node device of said plurality of node devices that previously accommodated the terminal; and
a location registering server having a location registering table and for notifying the former node device of the address of the destination node device and the address of the terminal based on the address of the former node device registered in the location registering table, the address of the former node device being registered in the location registering table before receiving a location registration request from the destination node device and the terminal.

35. A communication system having a plurality of node devices for communicating with a terminal, said terminal may move among said plurality of node devices, comprising:
a destination node device being a node device of said plurality of node devices that is accommodating the terminal and facilitating communication between the terminal and the communication system;
a former node device being a node device of said plurality of node devices that previously accommodated the terminal; and a location registering server having a location registering table, wherein the location registering server registers the location of a first destination node device, being a node device with which the terminal has first started communication during a communication session, and when receiving a location registration request of a latest destination node device and the terminal, during the communication session, the location registering server does not register the latest destination node device in the location registering table, and notifies the first destination node device of the address of the latest destination node device and the terminal.

36. A communication system having a plurality of node devices for communicating with a terminal and a location registering server, said terminal may move among said plurality of node devices and register its location with the location registering server, comprising:

a destination node device being a node device of said plurality of node devices that is accommodating the terminal and facilitating communication between the terminal and the communication system;

a sender node device being a node device of said plurality of node devices that sends or forwards a packet to a node device of said plurality of node devices; and a transfer sequence, wherein the node device receiving the packet notifies the sender node device of an address of the destination node device and an address of the terminal when knowing the address of the destination node device, while otherwise notifying the location registering server whereby the address of the destination node device and the address of the terminal registered in the location registering server is provided to the sender node device.

37. The communication system of claim 36 wherein the sender node device is a node device that received the packet from a sending terminal.

38. The communication system of claim 36, wherein the node device further comprising:

a storage portion for storing the address of the destination node device, wherein the node device notifies the sender node device of the address of the destination node device and an address of the terminal by referring to the storage portion.

39. The communication system of claim 36 wherein the node device transfers the received packet to the location registering server and requests the location registering server to notify the sender node device of the address of the destination node device and an address of the terminal.

40. The communication system of claim 36 wherein the node device transmits, to the location registering server, a message for requesting the location registering server to notify the sender node device of the address of the destination node device and an address of the terminal.

41. The communication system of claim 36 wherein the node device obtains the address of the destination node device from the location registering server and notifies the sender node device of the address of the destination node device and an address of the terminal.

42. A communication system having a plurality of node devices for communicating with a terminal, said terminal may move among said plurality of node devices, comprising:

a destination node device being a node device of said plurality of node devices that is servicing an area where the terminal is located and having an address;

a sender node device being a node device of said plurality of node devices that sends or forwards a packet and having an address; and a transfer sequence, wherein the destination node device notifies a sender node device of its own address and an address of the terminal based on an address stored in a storage portion provided in at least one of the terminal and the destination node device.

43. The communication system of claim 42 wherein the terminal has a storage portion for storing the address of the sender node device, and the destination node device receives the address of the sender node device from the terminal to notify the sender node device of its own address and the address of the terminal.

44. The communication system of claim 42, further comprising:

a location registering server; wherein the terminal has a storage portion for storing an address of a source terminal, and the destination node device transmits, to the location registering server, a message including the source terminal address received from the terminal and its own address, and requests the location registering server to notify the sender node device of the addresses of the destination node device and the terminal.

45. The communication system of claim 42, further comprising:

a location registering server; wherein the destination node device has a storage portion for storing the address of the sender node device, when the terminal has moved to an area not serviced by the destination node device, the destination node device receives, from a latest node device, being a node device servicing an area to which the terminal has moved, an address of the latest node device and the address of the terminal through the location registering server, the destination node device notifies the sender node device of the addresses of the latest node device and the terminal.

46. The communication system of claim 42, wherein the terminal has a storage portion for storing an address of a node device servicing an area where the terminal was located, and the node device having a storage portion for storing the address of the sender node device, wherein the node device receives, from the destination node device, the addresses of the destination node device and the terminal, and the node device notifies the sender node device of the addresses of the destination node device and the terminal.

47. The communication system of claim 42, further comprising:

a location registering server;

the terminal having a storage portion for storing an address of a node device servicing an area where the terminal was located; and the node device having a storage portion for storing an address of a source terminal, wherein the destination node device transmits a message to the node device including its own address and the address of the terminal, based on the address stored in the storage portion of the terminal, the node device receives said message and transmits, to the location registering server, a message including the address of the destination node device, the address of the terminal, and the address of the source terminal stored in the storage portion of the node device, and requests the location registering server to notify the sender node device servicing the source terminal of the addresses of the destination node device and terminal.

48. The communication system of claim 42, further comprising:
a location registering server, having a storage portion for storing the address of the sender node device, wherein
when the terminal moves to an area serviced by the destination node device the destination node device transmits, to the location registering server, a message including its own address and the address of the terminal, and requests the location registering server to notify the sender node device of the addresses of destination node device and the terminal.

49. The communication system of claim 42, further comprising:
a location registering server, having a storage portion for storing the address of the sender node device, wherein
when the terminal moves to an area serviced by the destination node device the destination node device transmits an inquiry to the location registering server requesting the address of the sender node device, and the destination node device directly notifies the sender node device of its own address and the address of the terminal.

50. The communication system of claim 42, further comprising:
a location registering server, having a storage portion for storing an address of a source terminal in correspondence with the address of the terminal, wherein
when the terminal moves to an area serviced by the destination node device the destination node device transmits, to the location registering server, a message including its own address and the address of the terminal, and requests the location registering server to notify the sender node device of the addresses of destination node device and the terminal.

51. The communication system of claim 50, further comprising:
a plurality of location registering servers, wherein when the location registering server receives the message from the destination node device and the location registering server does not have the address of the source terminal stored in its storage portion, the location registering server requests another location registering server in which the source terminal is registered to notify the sender node device of the addresses of the destination node device and the terminal.

52. The communication system of claim 42, further comprising;
a location registering server, having a storage portion for storing an address of a source terminal in correspondence with the address of the terminal, wherein
when the terminal moves to an area serviced by the destination node device the destination node device receives from the location registering server an address of the source terminal and an address of a source node device servicing the area where the source terminal is located, and directly transmits, to the sender node device, its own address and the address of the terminal.

53. A communication system of having a plurality of, node devices for communicating with a terminal said terminal may move among said Plurality of node devices and register its location with said communication system, said location, being an address of a destination node device accommodating said terminal,
a location registering server for registering the location of said terminal; and
a node device that receives a packet destined for said terminal and transfers said packet to the destination node device when knowing the address of the destination node device, while otherwise transferring the packet to the destination node device by referring to the location registering server;
wherein a message transmitted/received between the plurality of node devices designates, to the destination node device, at least a necessity of a response message and a response destination.

* * * * *